(12) United States Patent
Lo et al.

(10) Patent No.: US 6,877,044 B2
(45) Date of Patent: Apr. 5, 2005

(54) DISTRIBUTED STORAGE MANAGEMENT PLATFORM ARCHITECTURE

(75) Inventors: Horatio Lo, Milpitas, CA (US); Sam Tam, Belmont, CA (US); David Lee, San Jose, CA (US); Dietmar M. Kurpanek, Emerald Hills, CA (US)

(73) Assignee: Vicom Systems, Inc., Fremont, CA (US)

( * ) Notice: Subject to any disclaimer, the term of this patent is extended or adjusted under 35 U.S.C. 154(b) by 77 days.

(21) Appl. No.: 09/904,824

(22) Filed: Jul. 12, 2001

(65) Prior Publication Data

US 2002/0103943 A1 Aug. 1, 2002

Related U.S. Application Data

(63) Continuation-in-part of application No. 09/501,881, filed on Feb. 10, 2000, now Pat. No. 6,772,270.
(60) Provisional application No. 60/268,777, filed on Feb. 14, 2001, and provisional application No. 60/217,867, filed on Jul. 12, 2000.

(51) Int. Cl.[7] ............................................. G06F 13/00
(52) U.S. Cl. ............................. 710/2; 710/38; 710/313
(58) Field of Search ............................. 710/1–2, 8, 29, 710/36–38, 51, 62–64, 72–74, 305–317; 711/100, 114; 709/249; 714/7, 48; 716/2

(56) References Cited

U.S. PATENT DOCUMENTS

| | | | | |
|---|---|---|---|---|
| 5,745,701 A | * | 4/1998 | Nguyen-Thai et al. | 709/249 |
| 5,768,623 A | * | 6/1998 | Judd et al. | 710/37 |
| 6,128,750 A | * | 10/2000 | Espy et al. | 714/7 |
| 6,233,702 B1 | * | 5/2001 | Horst et al. | 714/48 |

* cited by examiner

*Primary Examiner*—Christopher B. Shin
(74) *Attorney, Agent, or Firm*—Campbell Stephenson Ascolese LLP; Samuel G. Campbell, III

(57) ABSTRACT

A distributed storage management platform (DSMP) architecture is disclosed. Such a DSMP architecture includes a number of storage routers. Each one of the storage routers comprises a number of interface controllers. One of the interface controllers of each one of the storage routers is communicatively coupled to one of the interface controllers of at least one other of the storage routers.

38 Claims, 18 Drawing Sheets

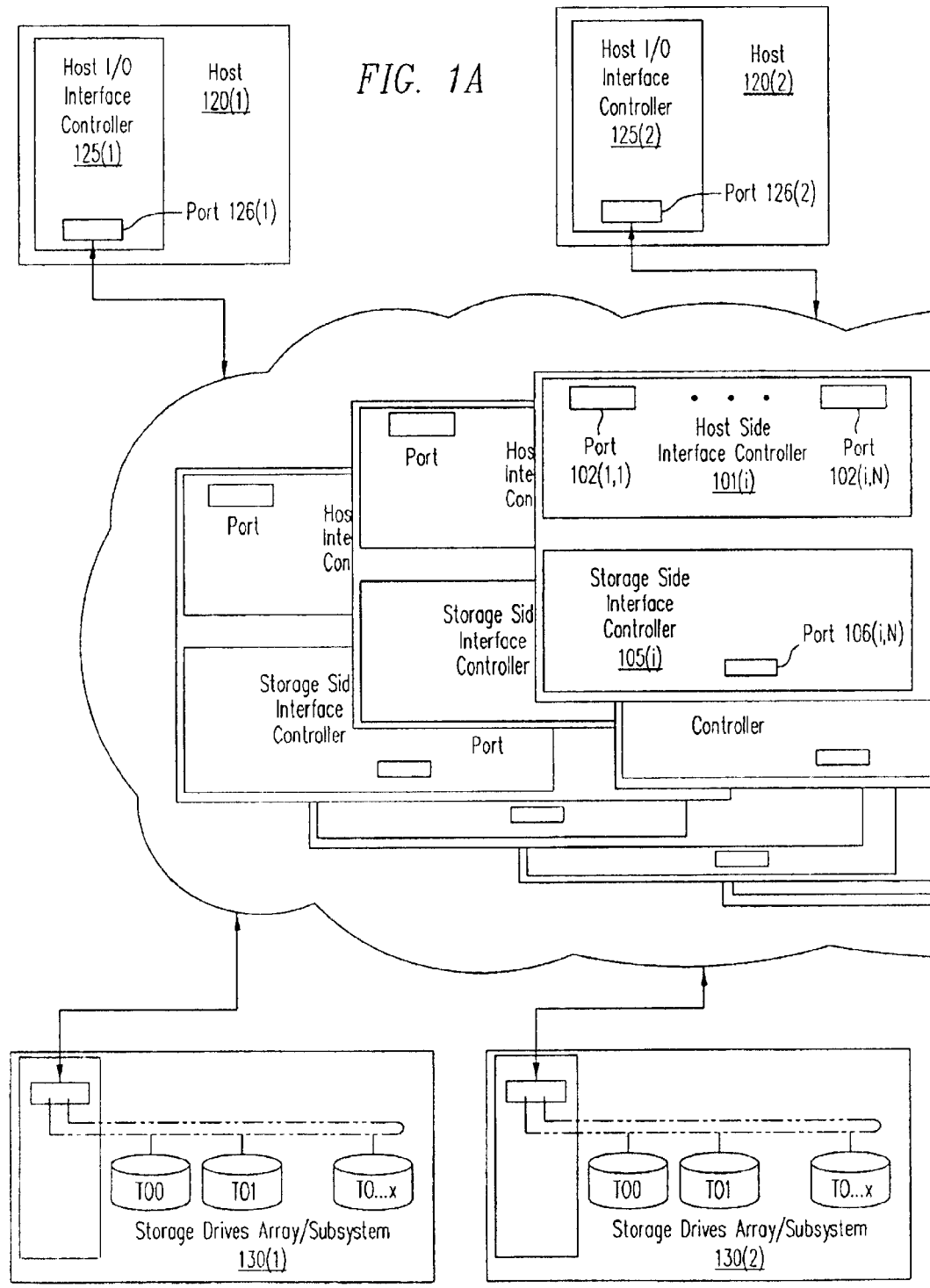

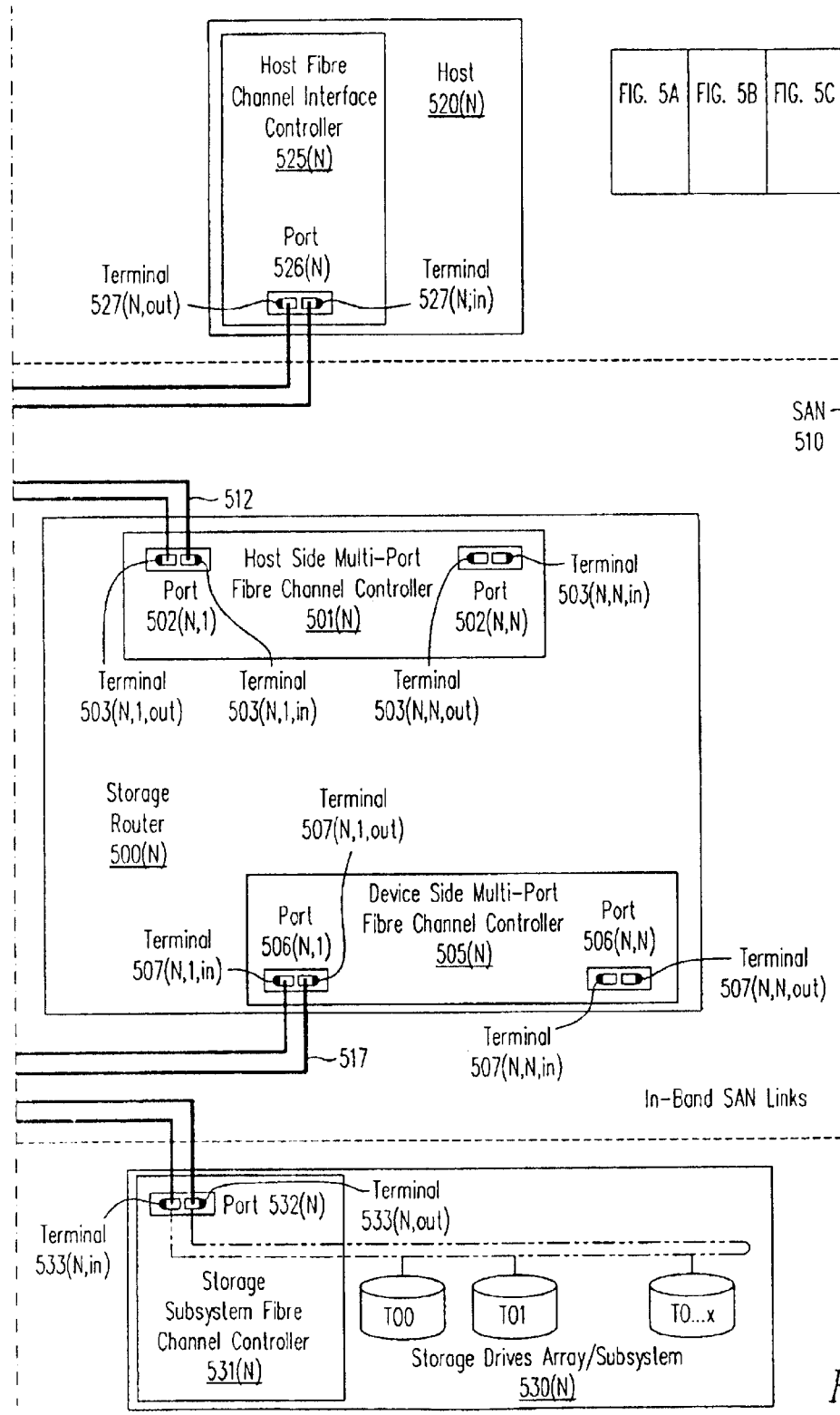
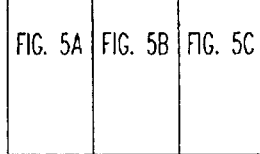
Key To
FIG. 5
FIG. 5C

DISTRIBUTED STORAGE MANAGEMENT PLATFORM ARCHITECTURE

CROSS-REFERENCE TO RELATED APPLICATIONS

This application is a continuation-in-part of patent application Ser. No. 09/501,881 filed on Feb. 10, 2000, now U.S. Pat. No. 6,772,270, entitled "A MULTI-PORT FIBRE CHANNEL CONTROLLER", referred to herein as MPFCC patent application, and having D. Kurpanek as the inventor, which is assigned to Vicom Systems, Inc., the assignee of the present invention, and which is hereby incorporated by reference herein, in its entirety and for all purposes.

This application also claims priority to Provisional Patent Application Ser. No. 60/217,867, filed on Jul. 12, 2000, entitled "A DISTRIBUTED STORAGE MANAGEMENT PLATFORM ARCHITECTURE," and having H. Lo and S. Tam as inventors; and to Provisional Patent Application Ser. No. 60/268,777, filed on Feb. 14, 2000, entitled "A DISTRIBUTED STORAGE MANAGEMENT PLATFORM ARCHITECTURE," also having H. Lo and S. Tam as inventors, which provisional patent applications are assigned to Vicom Systems, Inc., the assignee of the present application, and are hereby incorporated by reference herein, in their entirety and for all purposes.

BACKGROUND OF THE INVENTION

1. Field of the Art

The present invention relates to computer subsystem communications, and, more particularly, to a method and apparatus for creating an extensible storage area network (SAN) architecture by interconnecting multiple storage router type devices—which may be viewed as the nodes in a framework which is the SAN—providing coupling of host computers to storage drive arrays or subsystems.

2. Description of the Related Art

Although most of the concepts of networked storage are rooted in technology that has existed for several decades, there are recent developments in computing which have lead to drastically increased demands for storage space. This is due in a large part to the advent of massive unstructured data flows, observed to stem from the mass acceptance of the internet and its related methods of communications and dissemination of information, as opposed to those associated with structured data flows, typical examples of which are Enterprise Resource Planning (ERP) systems, and Electronic Document Interchange (EDI) systems. There is a growing need to effectively control and manage data storage activities related to the former, the latter being more easily able to be controlled and managed. As such, new challenges are brought forth related to facilitating server and storage consolidation, non-disruptive back-up procedures, and minimizing the distance limitations of technologies preceding storage area networking.

This need has led to the development of what is commonly referred to as a 'Storage Area Network' (SAN). Within a SAN, host computers provide access to arrays of storage devices that can be either local or remotely located, and can be either centralized in one location or distributed over many. This variability and the complexity of such storage subsystems mandates that the host computers be coupled to devices that can route storage requests to the storage devices and make their actual configuration transparent to the end-user (e.g., 'storage routers'). This added network (the SAN) between the hosts and the storage devices, when properly set up and configured by an administrator, releases the end-user from the need to be concerned with the actual physical layout of the storage.

Traditional approaches to storage and storage management emphasize the need to control expense and restrict access. Prior technology has generally only enabled a given storage device to be accessible to a single server, so the latter goal is managed with relative ease though apparently working against achieving the former where there is such a one-to-one ratio of dependency. While one cost factor, that of the physical hardware performing the storage role, has exponentially decreased over the time since the advent of computing as a viable business tool, the cost associated with management now has continued to increase at an increasing rate, offsetting any benefits the former brings.

The important function of managing storage in a networked environment has proven to be generally difficult, and when comparing the approaches of management through a server-provided interface with storage-specific direct connect-based management, a definite trend for success has been correlated with the latter. Just as data has been seen to come to be valued as an independent strategic asset from the computers that access it, storage networking products and architectures, as platforms for data protection and storage management are just now being elevated to the same level of concern.

To ensure reliability, redundant access is often supported, employing multiple routing devices, some of which may be distributed across geographically distant locations. Although a comparatively new technology, common existing implementations of SANs have to date been observed as failing in a critical area, that of not readily supporting extensibility. An essential characteristic for a SAN is that it must be scalable if it is to support the increasing rate of growth of demand for storage space.

It is therefore desirable to introduce greater simplicity into the hardware used to communicate between a host system and storage array, while meeting the prerequisites of redundancy and reliability (collectively termed as high availability). Preferably, a suitable SAN architecture also provides improved performance and reduces the running cost of the SAN, ideally maintaining transparency to the user. Also most preferably, such an architecture is extensible, allowing easy insertion to and removal from the SAN of hosts, storage drive arrays or subsystems, and any appliances that are introduced into the SAN to form part of that architecture.

SUMMARY OF THE INVENTION

In one embodiment of the present invention, a distributed storage management platform (DSMP) architecture is disclosed. Such a DSMP architecture includes a number of storage routers. Each one of the storage routers comprises a number of interface controllers. One of the interface controllers of each one of the storage routers is communicatively coupled to one of the interface controllers of at least one other of the storage routers.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 4, are now described as SVE devices, and are each shown to be connected to a sub-network, also to which the hosts are connected. Each element is linked to the network through a network interface card of a type specific to that element family. This is yet a further implementation of the invention which capitalizes on the ability that DSMP Architecture provides for inter-device communication across any of separate independent channels. Thus, this embodiment of the invention, which is a complete construct implementation of DSMP Architecture ion applied to a SAN, enables an extra level of management flexibility and redundancy beyond the one shown in FIG. 5.

Figure 1B:
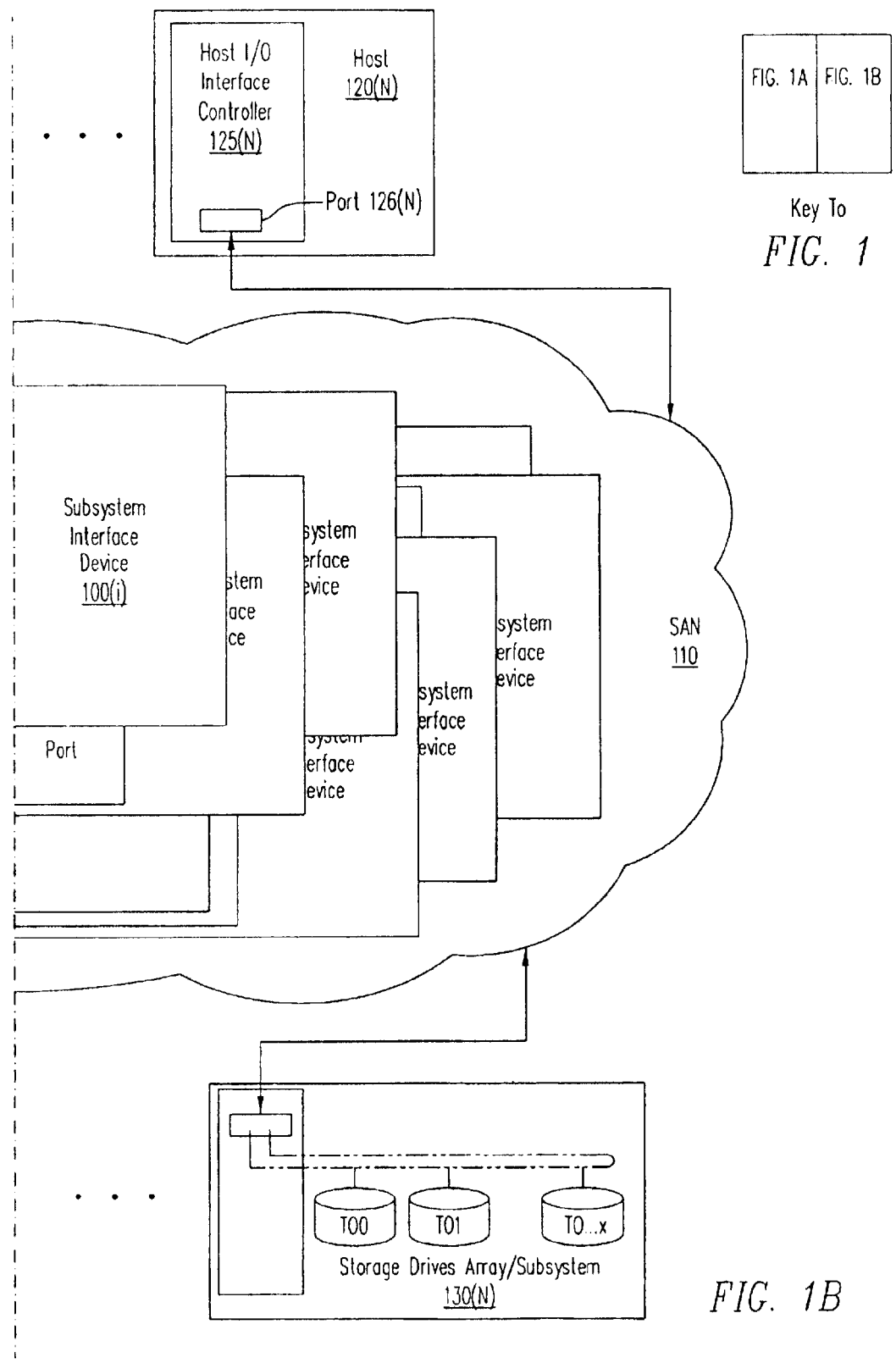
FIG. 1 is a schematic diagram illustrating the basic philosophy underlying a SAN employing a DSMP Architecture. The SAN is shown by a 'cloud' symbol (a common representation of the potentially complex coupling of links), which can for example incorporate storage networking devices that may exist in a storage area network. The implication is that the details of connectivity therein can be temporarily overlooked while examining the hosts and storage drives array/subsystems attached separately external to the SAN. Within the cloud is a collage of subsystem interface devices, each containing two different interface controllers, without specific manner of connectivity being shown. This indicates that a SAN employing a DSMP Architecture is dependent on such an architecture to couple the attached equipment, and the present invention will provide a specific means of achieving this, demonstrated by various embodiments disclosed subsequently.

The use of the same reference symbol in different drawings indicates similar or identical items. The use of the same label suffixes (i.e., digits beyond the first one that that coincides with FIG. #) in different drawings also indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

The present invention provides for a Distributed Storage Management Platform (DSMP) Architecture, a variety of embodiments of which provide a framework for an extensible storage area network (SAN). Such a DSMP Architecture has been conceived to be employed in a SAN to capably address the variety of problem issues confronting the technology, and provides a wealth of benefits, amongst them the most straight-forward being the easy attachment and de-attachment of hosts and storage equipment to and from a given SAN.

Each such embodiment typically includes a number of common elements throughout, and a number of hosts and a set of a storage drive arrays or subsystems, coupled together through interface devices (also referred to herein as storage router type devices, or simply, storage routers),—which themselves embody interface controllers—each a key building block element of the DSMPA.

Such a DSMPA includes a number of interface controllers, which reside in storage network router type devices, at least two interface controllers per storage network router type device. In a storage area network, employing such a DSMPA, each one of the storage network router type devices is communicatively coupled, through at least one of the interface controllers contained within, to at least one other neighboring storage network router type device, through at least one of the interface controllers contained within that neighboring storage network router type device, via at least one of a number of links. The storage network router type devices incorporating interface controllers, and links between them, enable the sharing of management information, and thus form a distributed management platform, which is the basis of an intelligent SAN.

In such a storage area network, each one of the interface controllers is communicatively coupled to at least one other of the interface controllers, as well as to the hosts and to the storage arrays/subsystems. The interconnection of these storage router type devices is a pre-eminent factor in the operation of a SAN employing the DSMP Architecture. This in-band connectivity is a key focus aspect of the invention and permits sharing of databases held in the memory of separate storage router type devices housing the controllers—databases to which these interface controllers have direct access. An absence of this feature would otherwise be an obstacle to obtaining any of the several advantages over the analogous situation, where similar functionality could be obtained without this distribution of such in-band-coupled devices, particularly with regards to performance and scalability of the entire installation.

A SAN designed using the DSMP Architecture consists of an arrangement of such storage routers in between a set of hosts and the available storage, to provide a number of advantages over the traditional set-up in which the hosts are directly connected to the storage elements without the storage routers being coupled there between.

The most critical of these benefits is the enabling of so-called "any-to-any" connectivity between hosts and routers, where hosts from vendors that were previously incompatible with particular types of storage units can now be employed. The architecture provides coding mechanisms which present the storage elements to a host in an orchestrated manner. This ensures that the signals transmitted to and from the host fibre channel interface controller are in a sequence and format which leads to proper interpretation by the host of the data I/O being exchanged.

This "any-to-any" concept also includes the ability to implement such connectivity over a variety of different network types, any one of which may already be in place handling communications between hosts and storage units prior to the introduction of the elements of the DSMP Architecture.

In several embodiments of the present invention, describing a specific loop configuration, each one of the interface controllers is a multi-port controller. Specifically, they can be multi-port fibre channel controllers, and in one such embodiment, each of these multi-port controllers is a dual-port fibre channel controller. Although fibre channel is the implied accepted standard transport layer at the present stage of technological development in this field, various other transport layers are commonly found as the means of connectivity between hosts and storage elements, including SCSI, SSA, TCP/IP and others, and so are contemplated by this disclosure. Elaboration upon this is subsequently provided.

Features and Framework of the DSMP Architecture

A DSMP Architecture can be configured to consist of differing storage router types each having one of a number of combinations of interface controller sub-elements which subscribe directly to the different transport layer technologies. Correspondingly, references made throughout this document to the fibre channel transport layer in the context of the host interface controller, or even that of the interface controller integral to the storage elements, may in general be substituted for by any of these other transport layer technologies. The suitability of such substitution may not necessarily be recommended due to the performance decrement in comparison to fibre channel that such a change may bring (as defined by the current governing standards for these areas of transport layer technology), but the invention nevertheless accommodates for this.

The process associated with providing these and other capabilities is referred to herein by "storage virtualization". A key concept to storage virtualization is that the physical elements of the storage are subsumed and represented to the hosts after several stages of mapping that take place within the router in a simple logical view, the routers themselves remaining transparent. This is achieved through manipulation under the control of software, some of which is embedded in the hardware, and some of which is resident in one or more hosts, specifically configured to be able to be applied in a management role.

Other features and advantages, which shall become part of what is termed herein as the DSMP Architecture paradigm set, include the following:

1) Ease of Reconfiguration

The basic drive units of the storage elements of the SAN can be configured in various ways involving any one or a combination of concatenation, mirroring and one of several instant-of-time copying processes, and this may be accomplished and retained as well as abandoned and re-configured with relative ease.

2) Extensibility of the SAN

The need to expand the amount of available storage is a fundamental requirement faced by any commercial enterprise, which inevitably occurs in the course of business, and is a capability which is poorly addressed by host/storage infrastructures architected via the existing technology. With the present invention, storage elements can be added to an extent limited only by parameters of the software, from either the same or a different vendor, or of a kind subscribing to the same, or a different transport layer technology, to that of the initially resident storage.

3) Ease of Replacing Failed Drives

The basic drive units of the storage elements of the SAN are prone to failure from time to time, and a DSMP Architecture according to the embodiments of the present invention provides mechanisms which insulate the host from the effects of failed storage components and allow for their replacement and for the regeneration of previously stored data, as well as the safe handling of I/O signals which are in transit at the time of drive failure.

4) Ease of Replacing Failed Storage Routers

The storage router units which comprise a suitably configured DSMP Architecture are themselves occasionally vulnerable to failure, and so mechanisms which isolate failed storage router units and allow for their replacement without disruption to the I/O exchange taking place between hosts and the storage elements. Again, of foremost concern is the safe handling of I/O signals which are in transit at the time of router failure, and a ready way of automatically reconfiguring the substitute router unit to present the storage elements to the hosts in the same virtualization configuration that the unit which failed was presenting those storage elements.

The present invention, namely a Distributed Storage Management Platform (DSMP) Architecture, can be employed as the framework of a Storage Area Network (SAN). An interface controller such as that described in the MPFCC patent application provides multi-port coupling capability to a storage router which plays becomes a key role as a node in a FC-backboned SAN, empowering the SAN with the DSMP Architecture paradigm set. Flexibility in the manner of connection allows the attached host and storage devices to be placed in a number of different configurations, supporting any of the various topologies which are permitted for the fibre channel (or other) transport layer, including most notably loop, but also point-to-point, and switched (also termed fabric) amongst others, as discussed in more detail subsequently herein.

When such storage routers are employed to interconnect hosts with storage subsystems and other such devices, such storage routers can consist of interface controllers configured, for example, in pairs (together also with other associated hardware). A specific embodiment is such that each member of an interface controller pair is dual-port fibre channel, and that there is only one such pair to be found in each router. One controller in each pair is assigned to be coupled to the host side, and the other is assigned to be coupled to the storage side. However, there is nothing to preclude controllers consisting each of a multiplicity of ports beyond two, and router units being built with several or many such pairs of controllers, with certain controllers assigned to be coupled to the host side, and others to be coupled to the device side. Note that a one-to-one correspondence of host side to device side allocation ratio need not necessarily be maintained.

A SAN architecture according to the present invention that employs dual-port fibre channel controller equipped storage area routers, such as those described previously, allows multiple hosts from an array of different vendor sources, running any one of a range of different operating systems (from the Open Systems—UNIX—genre, and several from the PC platform space) to be interconnected with multiple storage drive arrays/subsystems, for example, in fibre channel loop topologies, respectively, on each side.

DSMP Architecture in a Heterogeneous Environment

Such an architecture can provide coupling among multiple hosts and multiple storage media, employing multiple storage routers, where some of the hosts and storage media can be of varied constructs to that defined earlier (namely that of paired dual-port fibre channel controllers), in a heterogeneous environment. As opposed to a homogeneous coupling environment, consisting only of a single primarily chosen transport layer (or physical interconnect)—namely that fibre channel in this example, a heterogeneous coupling environment is comprised of different transport layers (other than that of primary choice) in portions which may be sub-loops (or branches) to the main loop (or other topology).

Routers of these variant kinds can include (amongst other supporting hardware) one dual-port fibre channel controller mating with another multi-port controller (or other type of interface controller) that subscribes directly to a different physical interconnect, such as SCSI or SSA. Examining these two commonly sought-after variant router constructs:

In the case of a multi-port SCSI controller, this may be assigned to either the host side or to the storage side, whilst the multi-port fibre channel controller is then assigned to whichever host or storage device side remains in this arrangement.

For the case of a multi-port SSA controller combined with a multi-port fibre channel controller, although in theory the SSA controller may be assigned to act within the particular topological coupling of either the host or storage device side, in practicality, a storage device side allocation is generally observed, so for this case, the MPFCC is usually relegated to the host side.

As described earlier, a SAN employing a DSMP in an arrangement of this kind inherits all of the advantages associated with the DSMP paradigm, whether the coupling on host or storage device sides is of a loop, or other topology. Within such a SAN, coupling and successful interaction is permitted amongst a wide heterogeneous variety of host and storage equipment elements, from an array of competing vendors running different host OS platforms, or in the case of the storage units, perhaps incorporating degrees of their own intelligent capability for I/O protection ranging from nothing to high-level RAID protection. The availability of such capabilities is unprecedented in the independent distributed routing space.

The benefits of a DSMP Architecture, according to embodiments of the present invention are many, and include:

the ability to perform the establish storage virtualization;

the ability to easily reconfigure the processes associated with virtualization including those related to maintaining redundancy levels either with regard to hosts or with regard to the storage media;

extensibility—of either hosts or the units of storage media—easily inserting/removing into/out of a SAN meet any needs for expansion;

maintainability—relating to any of the host computers, units of storage media, or even the router units themselves—easily allowing for removal/replacement of unserviceable elements while permitting the functioning of the remainder of the SAN to continue with minimal disruption, protecting stored data from loss, and providing a high degree of protection against loss of I/O signals in transit at the time of failure.

[Note that in the case of substituting for failed storage drive units, the prescribing of spare drives, and the way to invoke such spare drives, is one of the standard automated features supplementing the aforementioned storage virtualization functionality of the routers—provided that the storage drive array/subsystem supports such functionality—which is generally the case.]

The one common denominator in all of this heterogeneity is that each one of the elements should subscribe to understanding (receiving and sending) data I/Os via an upper-level protocol such as SCSI, or whatever other means/modes of data communications between host servers and storage is considered acceptable (or is an industry standard).

Relationship of DSMPA With Switching

The multi-port fibre channel controller described in the MPFCC patent application allows topologies such as loop, point-to-point, and fabric—the latter otherwise referred to as switched. Although the details of any one particular topology are not significant to the present invention, the concept of switching should be discussed, and, in particular, how a switched portion of a storage network facilitates the building of a SAN framework.

SAN devices which perform switching (i.e., switches) are able to route data traffic across multiple ports according to a predefined fixed table of connectivity and can be implemented within the framework of a SAN wherein a DSMPA is employed and effectively complement the functionality of the routers. It will be noted that switches are generally discussed in the context of fibre channel interconnects, and may not apply in other of the transport layer technologies.

Even if storage routers were to have a multiplicity of ports comprising one or more of their internally mounted controllers, the volume could be insufficient to be able to deal with:

an excessive number of different host components seeking to be interconnected with the storage, or alternatively, the multiplicity of separate storage media units available to be connected with.

In overcoming one of these problem situations if it occurs, it is important to note that the limiting factor in the degree of distributed routing independence and complexity is merely the port multiplicity in the storage routers, which define the extent of the DSMP Architecture. Although not strictly a router in the same sense as one acting in the context of data networks, (whereupon such a data router makes algorithm-governed decisions of determining the path rerouting of data packets, where the details of the source and destination are in a constant dynamic state), the storage router, in one embodiment, acts as an intelligent bridging conduit. Leaving the details of the processes which take place within such an architecture for subsequent discussion herein, it can be stated now that a storage router acts both as a SCSI initiator and as a SCSI target, as data is channeled through such a storage router between hosts and storage.

However, if a switch is implemented within the SAN framework, that switch merely acts as a director of data flow in both directions between nodes and devices, typically, without any capability of acting as an initiator or target. To give a simple analogy in terms of common household electrical supply for appliances and the like, the switch merely acts in much the same way that a plain power strip works in extending the number of AC power outlets available for distribution, though the power strip does nothing to the electricity in the way of metering, conditioning or amplifying.

The ratio of router units to host interface controller units is an over-riding parameter in determining the level of redundancy within the SAN. However, no such relationship exists between the number of router units and physical storage drive units, since the processes of storage virtualization are used to manipulate precisely that relationship. A switch may need to be implemented in a practical sense as a convenient and inexpensive means of providing sufficient paths for data channeling, though (theoretically), a DSMP Architecture, according to the embodiments of the present invention, embodied by a sufficient multiplicity of fibre channel ports on-board its integral controllers, obviates the role of the switch.

Example Interface Controller

A DSMP Architecture, according to embodiments of the present invention, preferably employs storage routers that provide the functionality and features necessary to support the full range of benefits that the architecture promotes. For example, while a SAN employing a DSMP Architecture according to embodiments of the present invention can use any one of several transport layer protocols suitable for SANs, an interface controller such as that described in the MPFCC patent application can be, and is most desirably, employed as the building block of such a SAN, thereby making fibre channel the lower level protocol of choice.

Each of the ports resident on a controller can provide access to its own bi-directional I/O data link. These I/O data links provide the mechanism by which host requests for access to the resources of the SAN can be received and passed on to the storage devices. Such communication is handled through the storage routers in a manner essentially transparent to elements both at source and destination, and with no significant detriment upon data throughput performance.

As mentioned, an important variable of such a multi-port controller is the very multiplicity of the ports available. Dual ports represents a minimum requirement for each controller to function effectively within the topology of the network on the particular side being considered—either the side closer to the hosts—or the side closer to the storage devices.

As explained earlier, the controllers may be paired in each router, one of each pair allocated to each such side. Consider one of the ports of one of these two controllers, say that controller which is allocated to coupling with the host side. One such port accepts the link between a router and the adjacent element (be it another router or a different device), located say counter-clockwise (for the case of a loop)—or left (for the case of point-to-point topology), while the other port continues the link to the subsequent next adjacent element, say clockwise, or, towards the right (respectively per whatever the topology).

Increasing the multiplicity of fibre channel ports mounted upon controllers is advantageous for a number of reasons, the most obvious one being an improved potential for scalability, and the related economy of such scalability reducing cost. The ability to circumvent a need for separate switch devices adds to this benefit.

There is, however, a cross-over point at which the value in multiplying the number of ports per controller begins to diminish, such as technical design limitations relating to:

provision of adequate electrical power supply components, both in terms of capacity, and providing for redundancy mechanisms to provide uninterrupted operation in the event of single line failure;

increasing complexity of circuit paths and design case contingencies, as well as heightened demands on individual component performance at very high frequencies, leading to increased chance for intermittent bugs and outright failure of electronic components, and then of the equipment itself in service;

as well as commercial disadvantages of:

excessive product entry-level price, and acceptance difficulties in marketing a product whose physical packaging size exceeds the bounds of equipment which can be conveniently mounted in conventional unitary computer equipment racking space.

Although these concerns relate to successful practical implementation of the invention, they really fall outside the scope of describing the technology, so they will not be used to define any particular parameter limits.

The use of interface controllers (an example being multiport controllers) simplifies the SAN architecture (e.g., a DSMP Architecture according to the present invention) and provides other economies. Moreover, a multiplicity of ports allows for a variety of topological options, allowing such a SAN to be architected in any number of ways, based on criteria such as throughput, reliability, fault-tolerance (both with regard to routers and other elements of the storage network) and similar criteria.

Basic SAN Employing DSMPA Architecture

FIG. 1 is a schematic diagram illustrating the basic philosophy underlying a SAN employing a DSMP Architecture. There exist a multiplicity of host systems which must have some external means of access, both by read and by write input/output operations to permanent data storage media. There is available a separate multiplicity of storage drive array/subsystems. According to embodiments of the present invention, the hosts may be coupled to the storage by attaching this equipment to a SAN, relying on that SAN to also lend itself as a distributed management platform and so additionally provide an array of desirable characteristics beyond that of mere connectivity.

The SAN is shown by a 'cloud' symbol, which is a common representation of the potentially complex coupling of links, perhaps incorporating storage networking devices that may exist in a storage area network. Within the 'cloud' are introduced a series of subsystem interface devices which are generic embodiments of storage networking devices containing one or more embodiments of an interface controller, one specific example being that described in the MPFCC patent application. The subsystem interface devices are simply shown in a 'heap'—their specific manner of connectivity amongst themselves and between these devices and the externally attached equipment is not detailed at this point in the discussion.

As will be apparent to one of skill in the art, one or more of the controllers in a SAN employing DSMP Architecture can be coupled to one or more such host systems. A subsystem interface device 100 is configured to operate in a DSMP Architecture such as that depicted herein. Subsystem interface device 100[i] includes an interface controller 101[i], through which connection is made to each of the host systems 120([1]–[N]), which are each machines that may comprise of a variety of computer components, some of which may be in additional to the minimal set defining a suitable host, as described in the subsequent section, and also shown schematically in FIG. 2.

Subsystem interface device 100 is also depicted as being coupled (indirectly) to a set of storage drive array/subsystems 130([1]–[N]). Storage drive array/subsystem 130[i] can be, for example, a storage subsystem such as a hard disk drive array, tape storage unit, or such other storage media as may be necessary and appropriate to the given storage application. This equipment employs an upper level protocol, such as SCSI or some variant protocol (based on a similarly complex structured data format), preferably an accepted industry standard in host-to-storage communications. This enables participation in receiving and being able to send the I/O data signals (which may or may not be in a packetized format) being transmitted amongst the SAN elements coupled together by the network topology. Variation of protocol in the lower transport layer (from that of FC as the preferred means) is widely anticipated, and a DSMP Architecture according to embodiments of the present invention provide for this.

Having been presented an explanation in the preceding discussion, those skilled in the art will understand now that the next most immediate portions of this coupling are internal to a subsystem interface device containing, amongst various other necessary components, at least one other interface controller, and then further, this coupling may be along a path passing through other elements of the SAN. However, the details relating to these intermediate portions of the SAN element coupling between subsystem interface devices 100([1]–[N]) and storage drive array/subsystems 130([1]–[N]) are immaterial for the purposes of this initial discussion, and so are not shown in FIG. 1.

In the SAN architecture depicted in FIG. 1, port 102[i,1] of interface controller 101[i] couples subsystem interface device 100[i] to host system 120[i] via one of a series of host I/O interface controllers 125([1]–[N]) installed in host systems 120([1]–[N]). The other I/O ports (ports 102([i,2]–[i, N])) on interface controller 101[i] can then be coupled to other elements of the DSMP Architecture, including, but not necessarily limited to, other host systems and even other storage routers. Aligned with the earlier discussion the implication is that this controller is coupled to a host side loop (or other) topology, On the other hand, each storage interface device 100[i] may also be seen to contain an interface controller 105[i] on the storage device side (simply referred to subsequently as device side), which may or may not resemble the interface controller 101[i] on the host side. Each has at least one of a port 106[i,1] which is employed to coupling subsystem interface device 100[i] to one of a set of storage drive arrays/subsystems 130[i], via one of a series of port interfaces that might be integral to such third party storage equipment. Any other I/O ports (ports 106([i,2]–[i,N])) on the storage side of on interface controller 101[i] can then be coupled to other elements of the DSMP Architecture, including, but not necessarily limited to, other storage drive arrays/subsystems and even other storage routers. Aligned with the earlier discussion, the implication is that this interface controller 105[i] is coupled to a storage side loop (or other topology).

It is more common for neighboring subsystem interface devices 100[i] (later referred to, as storage routers) to be communicatively coupled via their respective storage device-side interface controllers 105[i], rather than via those interface controllers 101[i] on their host sides. There are certain circumstances of SAN 110 configurations which will be considered to consist of more than a single SAN, if the latter means of host side controller inter-linking of subsystem interface devices 100[i] is applied.

In any case, this implication is that a SAN 110 employing DSMP Architecture will somehow be dependent on such an architecture to couple the attached equipment, and the invention will provide a specific means of achieving this, demonstrated by various embodiments which remain to be disclosed, as the description progresses throughout this document.

Moreover, regarding the signals transmission described herein, those skilled in the art will recognize that a signal may be directly transmitted from a first element to a second element, or a signal may be modified (e.g., amplified, attenuated, delayed, latched, buffered, inverted, filtered or otherwise modified) between the elements shown in the diagram by interstitial elements whose details are omitted for brevity. Although the signals of the above described embodiment are characterized as transmitted from one element to the next, other embodiments of the present invention may include modified signals in place of such directly transmitted signals as long as the informational and/or functional aspect of the signal is successfully transmitted between elements.

To some extent, a signal input at a second element may be conceptualized as a second signal derived from a first signal output from a first element due to physical limitations of the circuitry involved (e.g., there is inevitably be some attenuation and delay). Therefore, as used herein, a second signal derived from a first signal includes the first signal or any modifications to the first signal, whether due to circuit limitations, or due to passage through other circuit elements which do not change the informational and/or final functional aspect of the first signal.

With the foregoing described embodiment wherein the different components are contained within different other components (e.g., the various elements shown as components of host 220), it is to be understood that such depicted architectures are merely examples, and that in fact, there may be other architectures that can be implemented which achieve the same functionality. This statement will also apply to subsequent descriptions.

In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Example Host System

Figure 2:
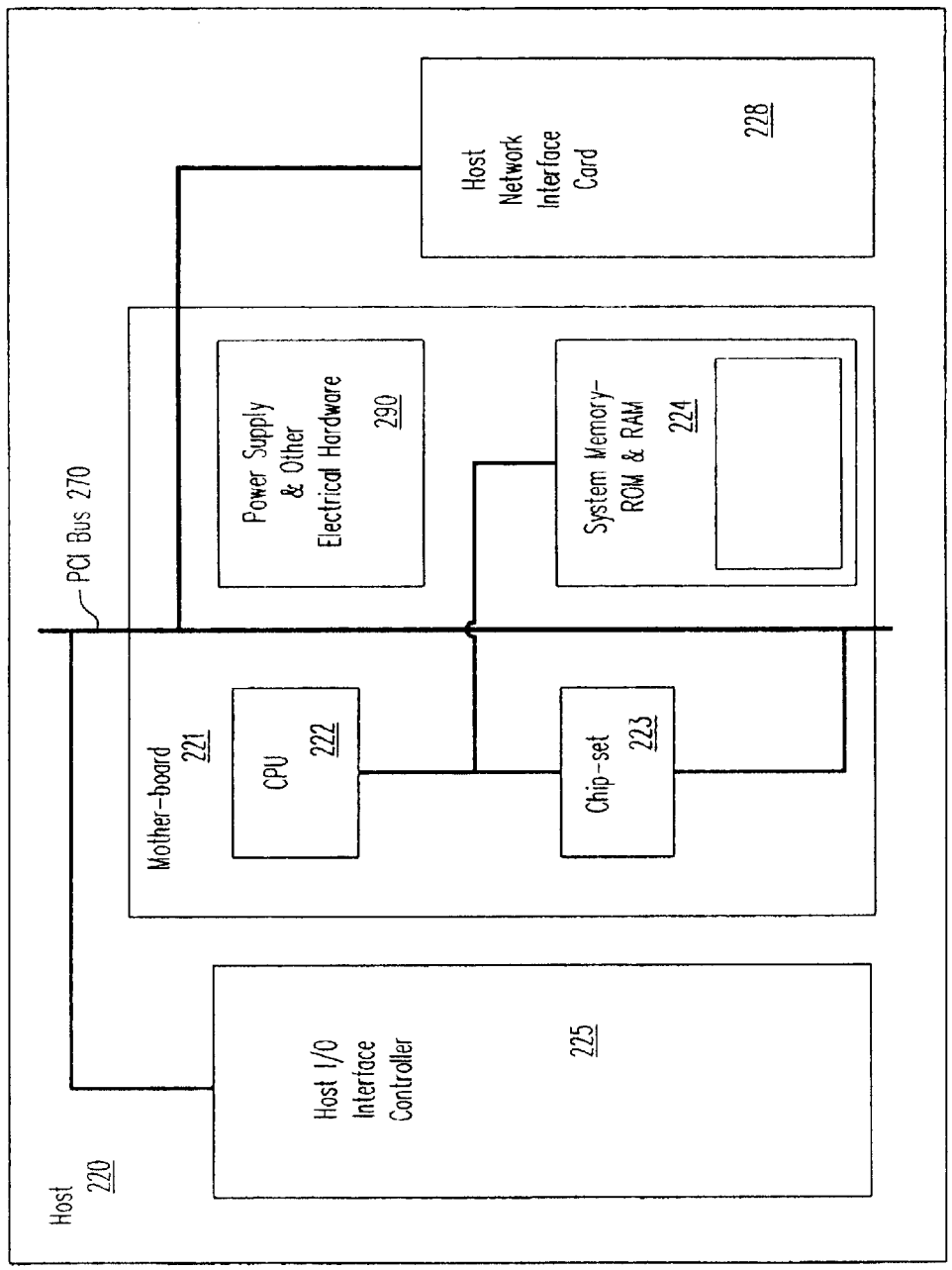
FIG. 2 is a block diagram illustrating the essentials of a host (i.e., host computer) in the context of this DSMPA invention.

As has been noted, a computer system such as host system 120 may be one of a variety of types, in general, though most commonly, will find these to fall into the categories of machines used as personal workstations, ranging to those used as network servers. Suitable host systems, designed to provide computing power to one or more users, either locally or remotely, will however be identifiable in that they comprise of a certain common set of essential elements, as listed below, motherboard;

PCI bus;

central processor unit (CPU) & chipset system read-only memory (ROM) and random access memory (RAM);

input/output (I/O) interface controller;

network interface controller;

power supply and associated electrical hardware;

FIG. 2 depicts a schematic diagram of a host server 220 suitable for attachment to embodiments of the present invention, and is an example of a computer that can serve as host in FIG. 1, as well as subsequent figures where a host is involved. Host computer 210 includes a PCI bus 270, which interconnects major components of host server 210 mounted on a motherboard 221, such as a CPU 222, a chipset 223. Also there is a system memory—ROM and RAM chipset 224, as well as an input/output interface controller 225, and a network interface controller 228 (the latter peripherals often being coupled to CPU 222 and chipset 223 via a PCI bus.

There may however be variations to this where, for example, input/output interface controller 225, and network interface controller 228 can instead be coupled via a separate expansion bus (not shown). Network interface 228 may provide a direct connection to a remote server via a direct network link to the Internet. All of these discrete components are powered by electrical signals provided through a power supply and other electrical hardware 290. Within such a host, there is not necessarily contained any component of storage media, as the purpose of a SAN is to provide coupling between hosts of any kind to such storage media.

Depending on the processor (CPU) type powering the host, if, for example, it's an Intel x86® or a competitively similar CPU chip, the operating system (OS) provided on such a system 210, may be a suitable form of one of MS-DOS®, MS-Windows NT® or 2000, though this same host may also run any of the Intel x86® UNIX® family OS such as Linux®. Alternatively, if the CPU is one of Sun Sparc®, or HP PA-RISC®, or DEC Alpha®, or Motorola-IBM Power PC® based (or similar), these will be almost exclusively be a platform employing only one of the UNIX® variants, including Solarist and Linux®, or one of any other known open systems type OS.

It will be noted that the variable identifier "N" is used in several instances throughout, particularly in the discussions which follow, to more simply designate the final element. Consider for example, the ports 110([1]–[N]) of a series of related or similar elements (e.g., ports 110). Furthermore, these N ports can be seen to be mounted on a series of MPFC Controllers (100[1]–[N]). The repeated use of such variable identifiers is not meant to imply a correlation between the sizes of such separate series of different elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Constructs of a Storage Area Network Employing a DSMP Architecture

Figure 3A:
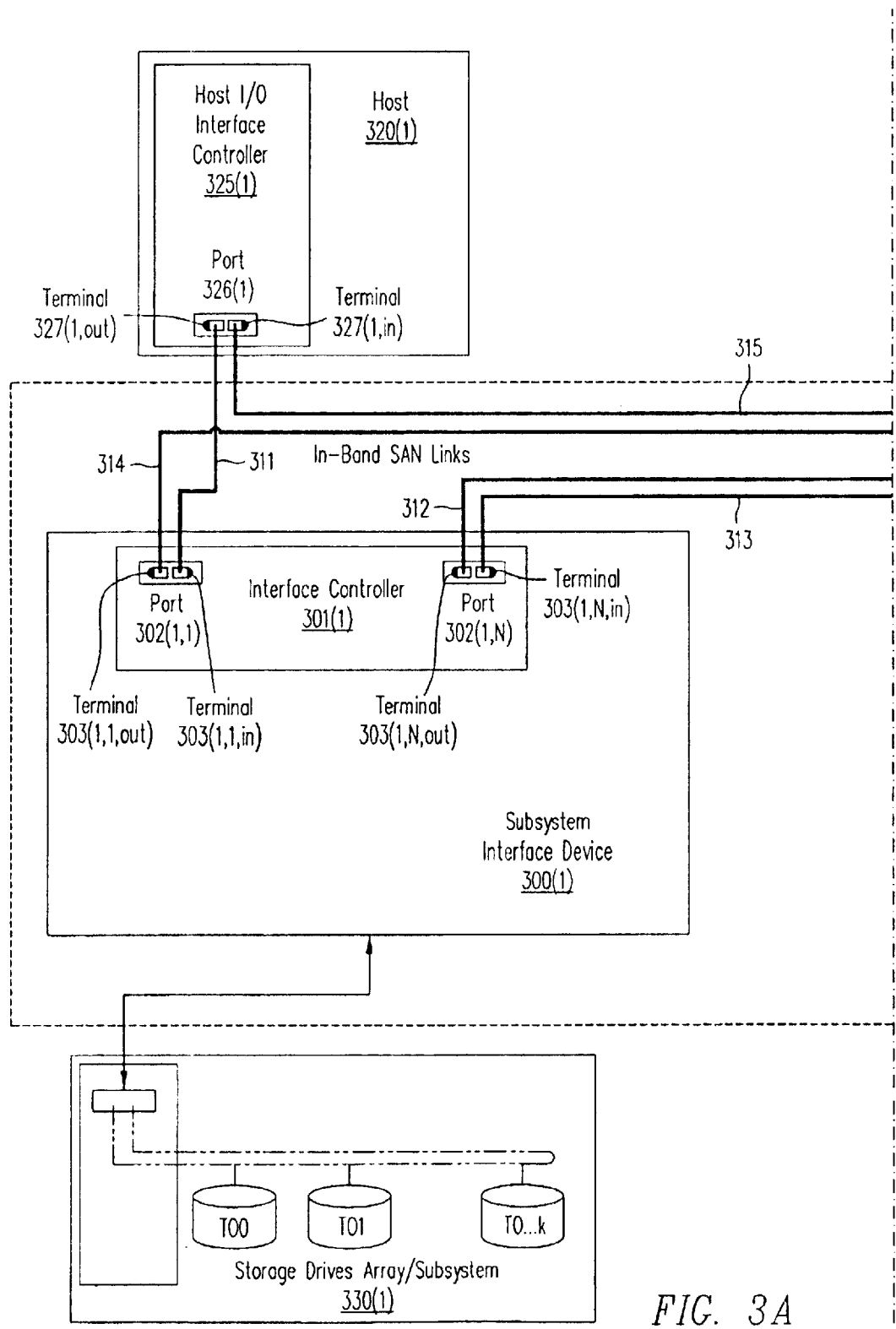
FIG. 3 is a block diagram illustrating an example of connectivity between hosts and storage drives array/subsystems through subsystem interface devices, each containing at least one embodiment of an interface controller, a derivative of the multi-port controller invention referred to in the MPFCC patent application. In an embodiment, each such subsystem interface device connects one host to a storage array/subsystem, and these devices are shown coupled in a loop on the host side. The hosts are also connected into this loop, each through a host I/O interface controller. Details of connections between the subsystem interface devices and the storage drive array/subsystem are not raised at this intermediate point of developing the explanation, this being the simplest open construct implementation of the DSMP Architecture (i.e. subsystem interface device consisting of, amongst other non-specific components, at least a single interface controller).
Figure 3B:
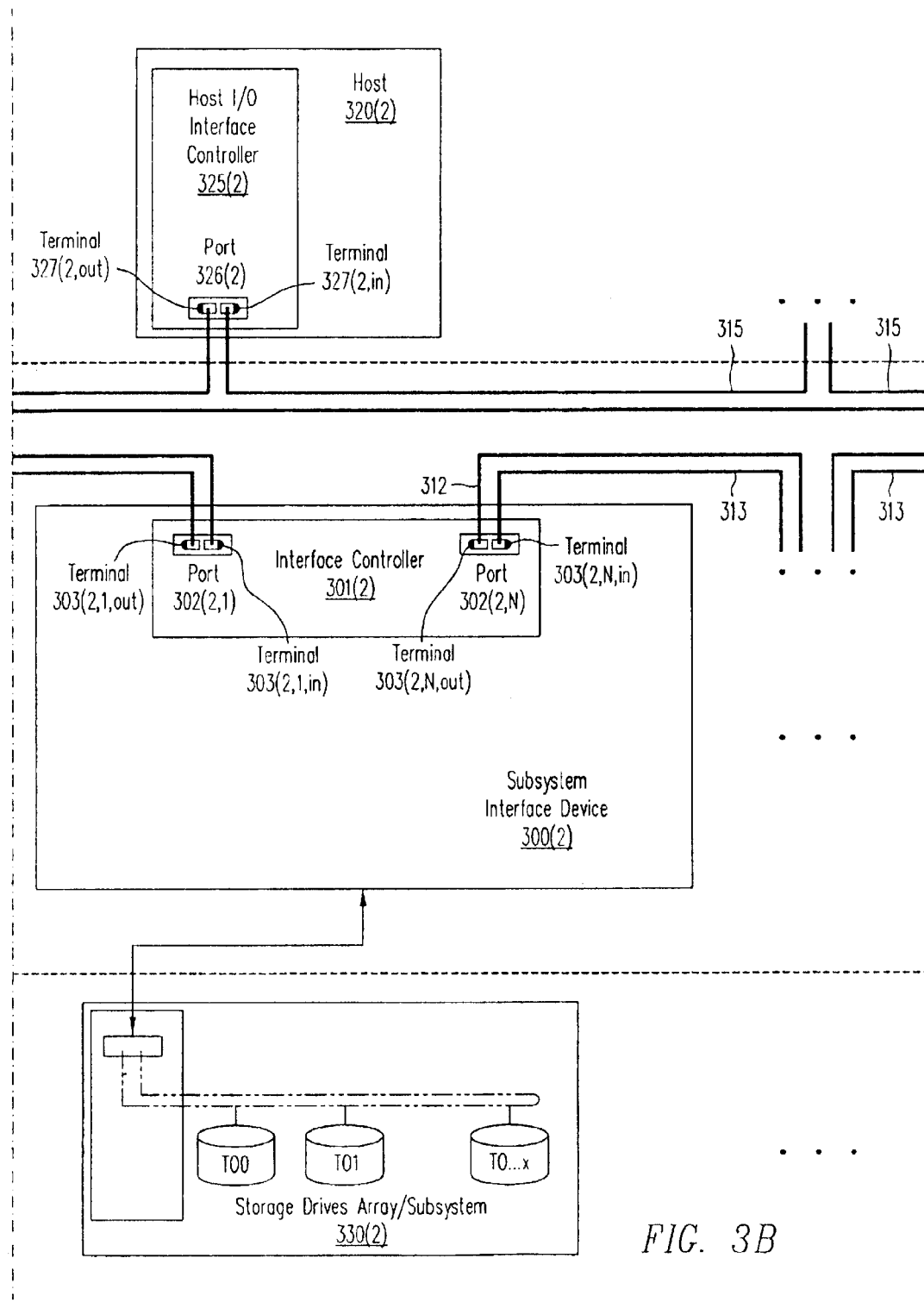
Figure 3C:
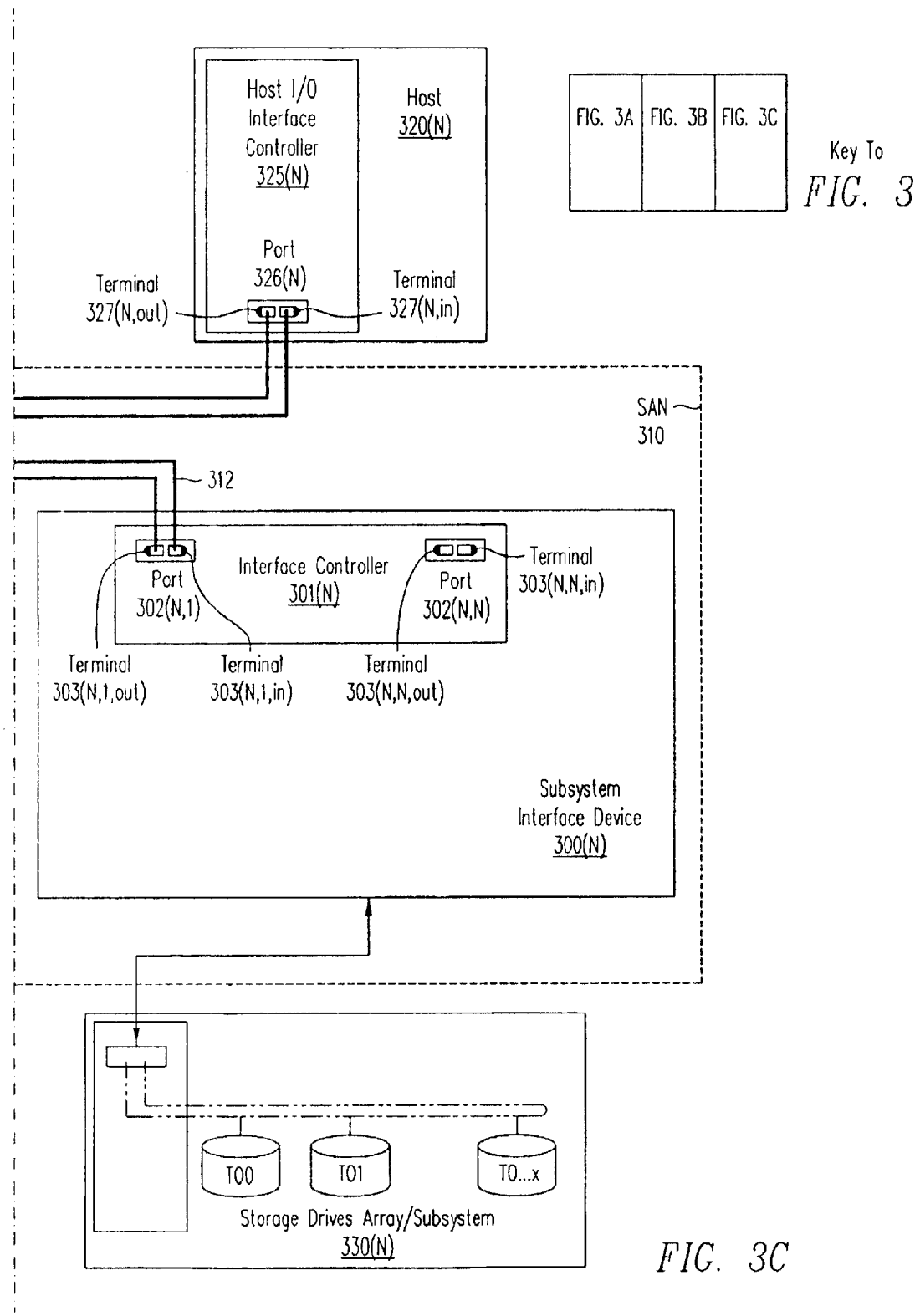

FIG. 3 is a schematic diagram illustrating some specific details of one side of a basic implementation of a DSMP Architecture, according to embodiments of the present invention. Depicted is an example of connectivity between a number of hosts 320([1]–[N]) and a number of storage drives array/subsystems 330([1]–[N]) through certain devices (subsystem interface devices ([1]–[N]), each containing a generic embodiment of the interface controller 301([1]–[N]). A number of these devices, each generically described as subsystem interface device 300([1]–[N]) are coupled to a path set (preferably a loop) coupling hosts 320([1]–[N]) to a storage array/sub-system 330([1]–[N]). Such subsystem interface devices are shown coupled via ports 302([1,1]–[N,N]) mounted on interface controllers 301([1]–[N]) in the loop, which is associated with the host side. Hosts 320([1]–[N]) (each notably a simplified version of the collective group of elements defined to comprise a host 220 in FIG. 2), are each connected into this loop through one of host I/O storage network interface controllers 325([1]–[N]).

The resulting SAN (SAN 310) based upon this open construct of the DSMPA invention, is, in general terms, includes three distinguishable types of physical elements, namely:

ports, networking devices, and link cabling.

Thus, clearly defined within its bounds are subsystem interface devices 300[i] containing interface controllers 301[i], and mounted thereon ports 302[i]. It should be understood that storage drive array/subsystem media 330[i] elements, and hosts 320[i], are not part of SAN 310, but rather are connected to SAN 310. This is in accordance with the understanding of those of skill in the art that a SAN is the total sum of all of the components located between the host I/O controllers and the subsystems.

Each subsystem interface device 300[i] is only shown to consist of, among other components, a single interface controller 301[i], depicted as being coupled with the host-side topology of SAN 310, (though as discussed subsequently, a minimal practical requirement should be two such controllers, the other being for coupling to the device side). From this perspective, details of the connection between subsystem interface devices 300([1]–[N]) and storage drive array/subsystems 330([1]–[N]) will, for FIG. 3 and FIG. 4, be apparent to one of skill in the art. In other words, details of varying connectivities for the storage device side coupling the storage elements to the SAN 310, are discussed subsequently.

Figure 5A:
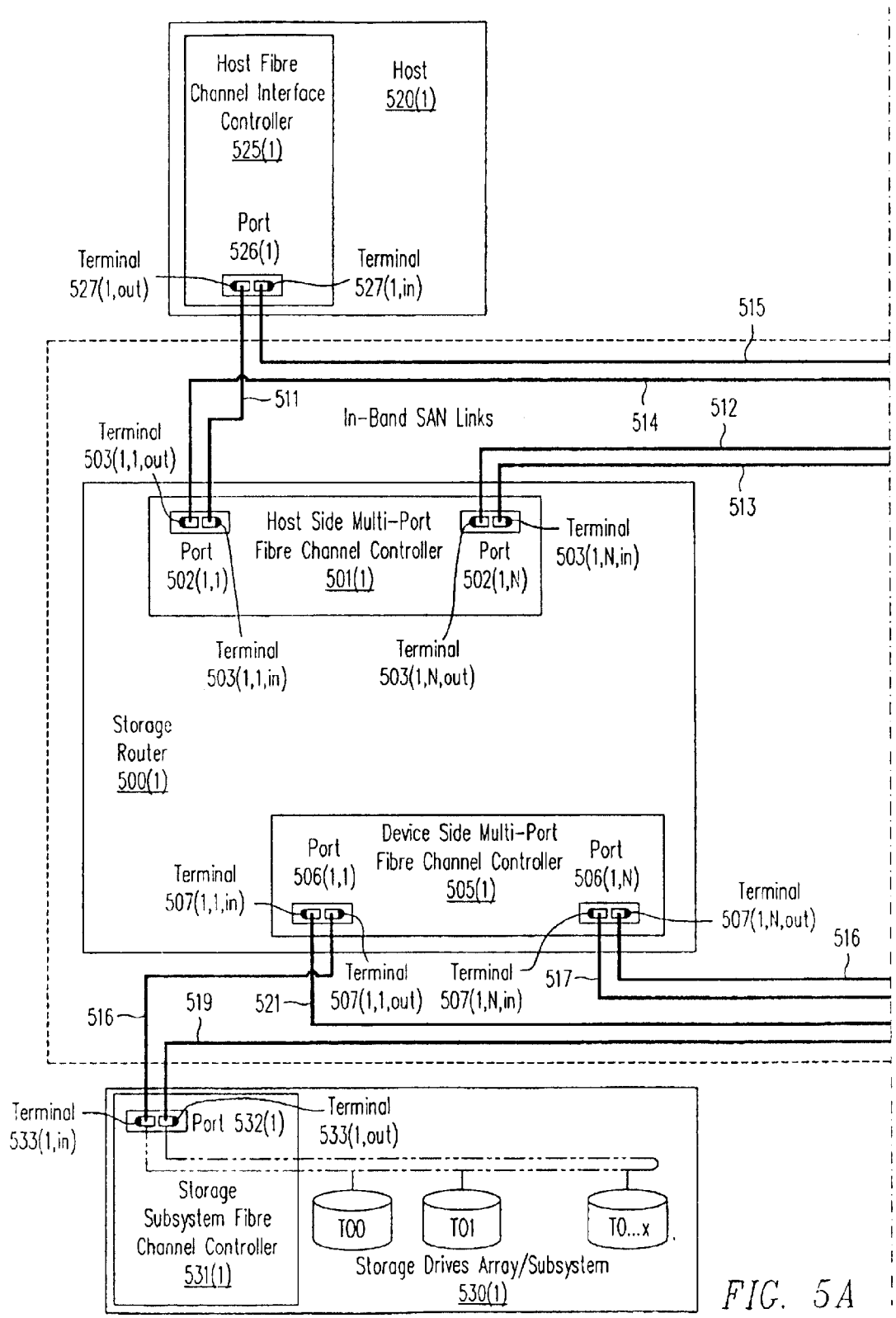
FIG. 5 is a block diagram illustrating an example of connectivity between hosts and storage drives array/subsystems through storage router type devices, each containing a two stage embodiment of the multi-port fibre channel controller invention (per MPFCC patent application). This embodiment is a developed construct implementation of the most basic open construct of DSMP Architecture shown in FIG. 3. Each such device, described in earlier figures as a subsystem interface device, now becomes a storage router type device (or storage router). Each storage router connects one host to a storage array/subsystem, and these storage router devices are shown coupled in two separate loops, one each on the host side and the device side. The hosts are connected into the former loop, each through a fibre channel interface controller (mounted internally to each), whilst the storage array/subsystem elements are connected into the latter loop, each through a non-specific but nevertheless compatible interface means. From the perspective of the storage router device, each storage router is connected to each one of these two loops separately, through a host side multi-port fibre channel controller, and a device side multi-port fibre channel controller respectively.
Figure 5B:
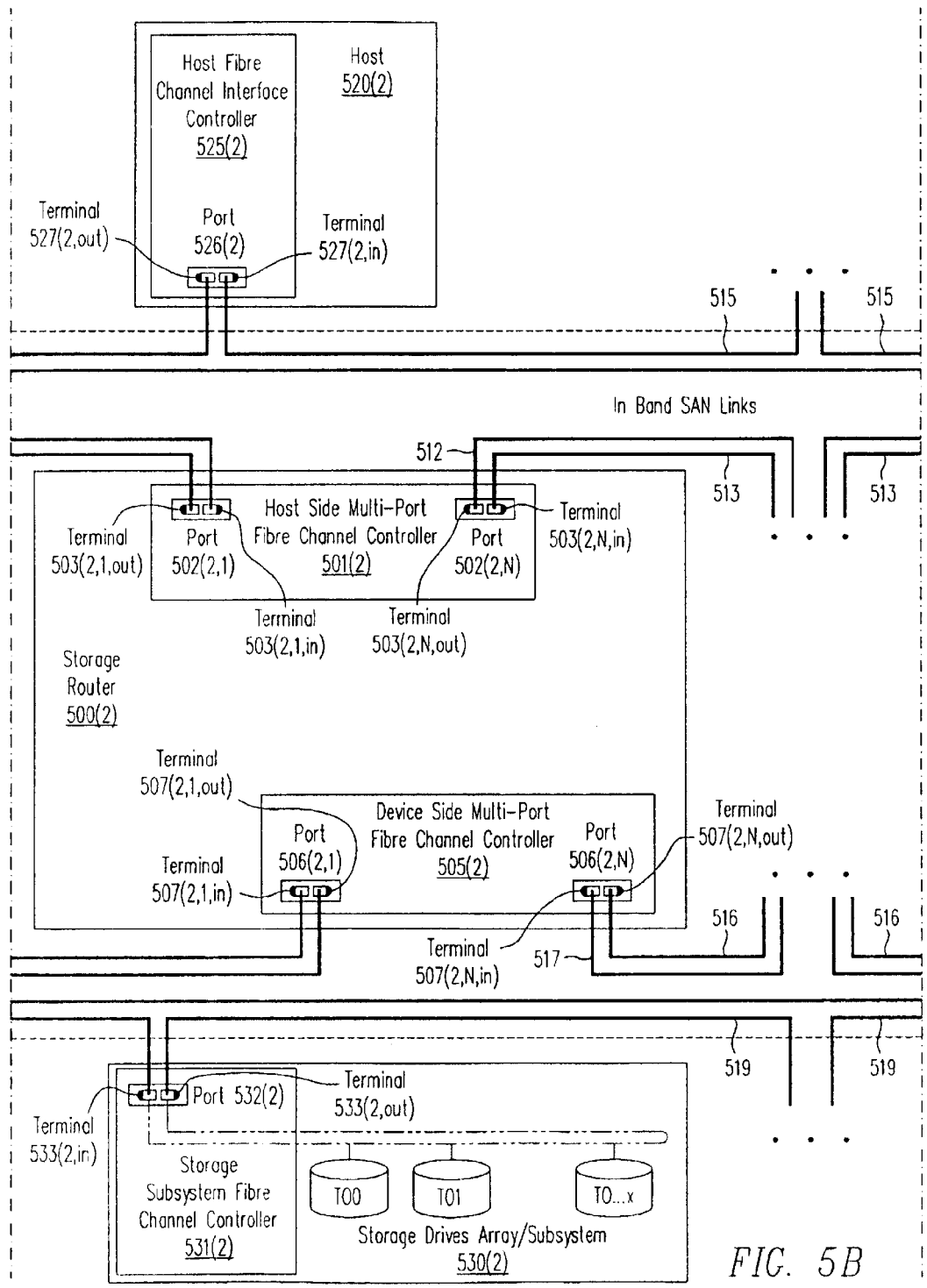
Figure 6A:
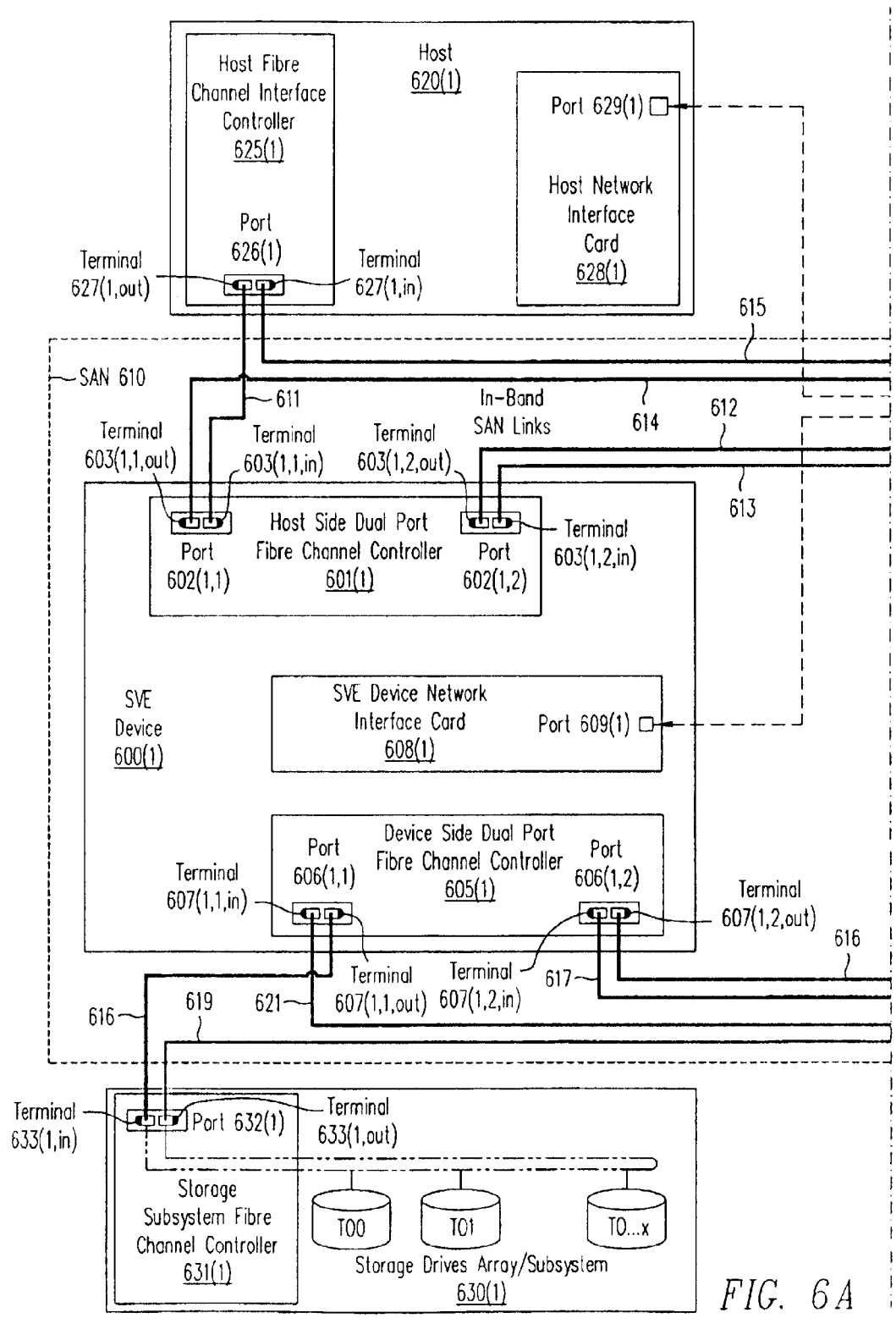
FIG. 6 is a block diagram illustrating an example of connectivity which is an extension of that shown in FIG. 5. Additional to the elements described there, the items equivalent to those subsystem interface devices as per
Figure 6B:
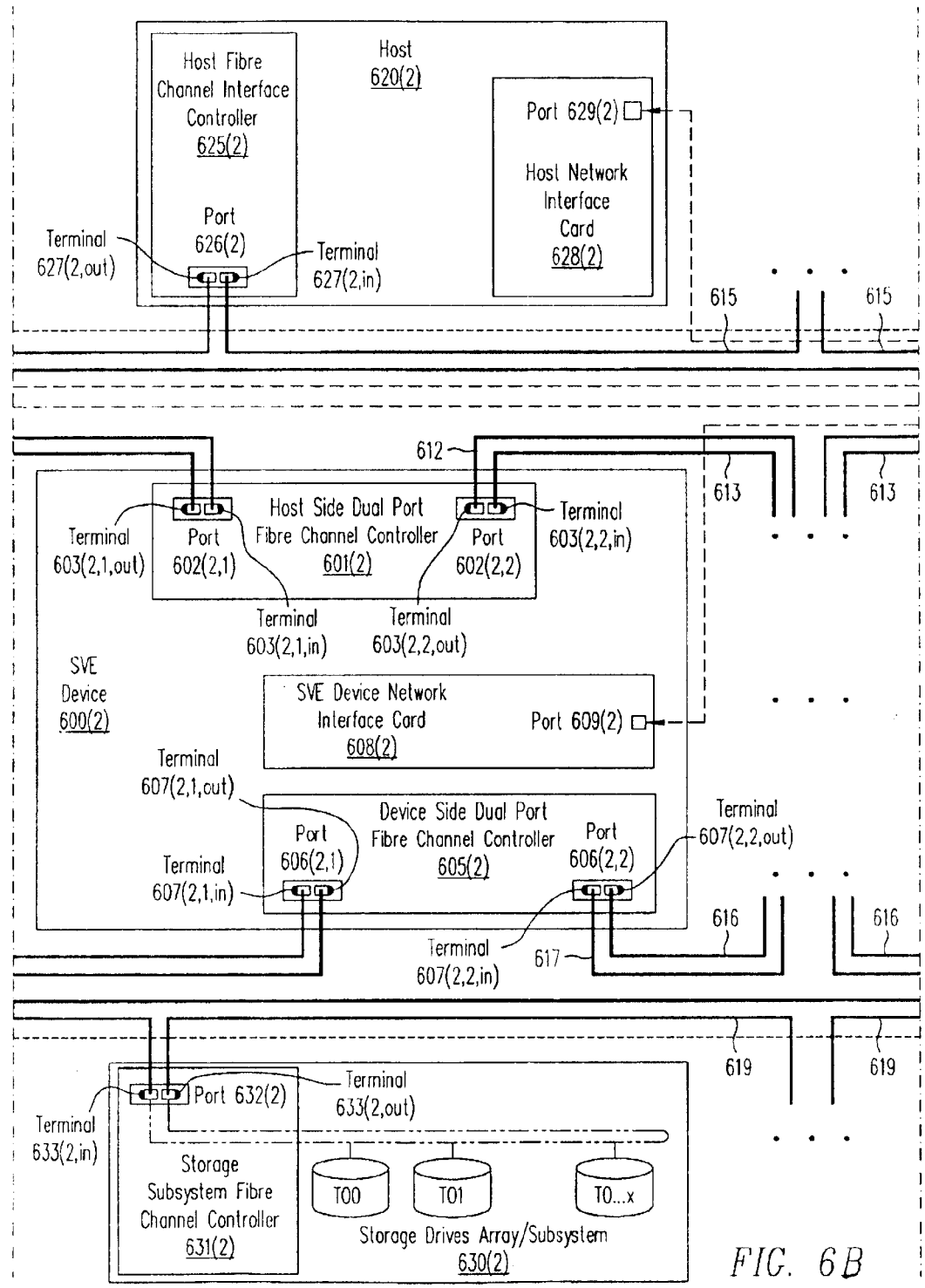
Figure 6C:
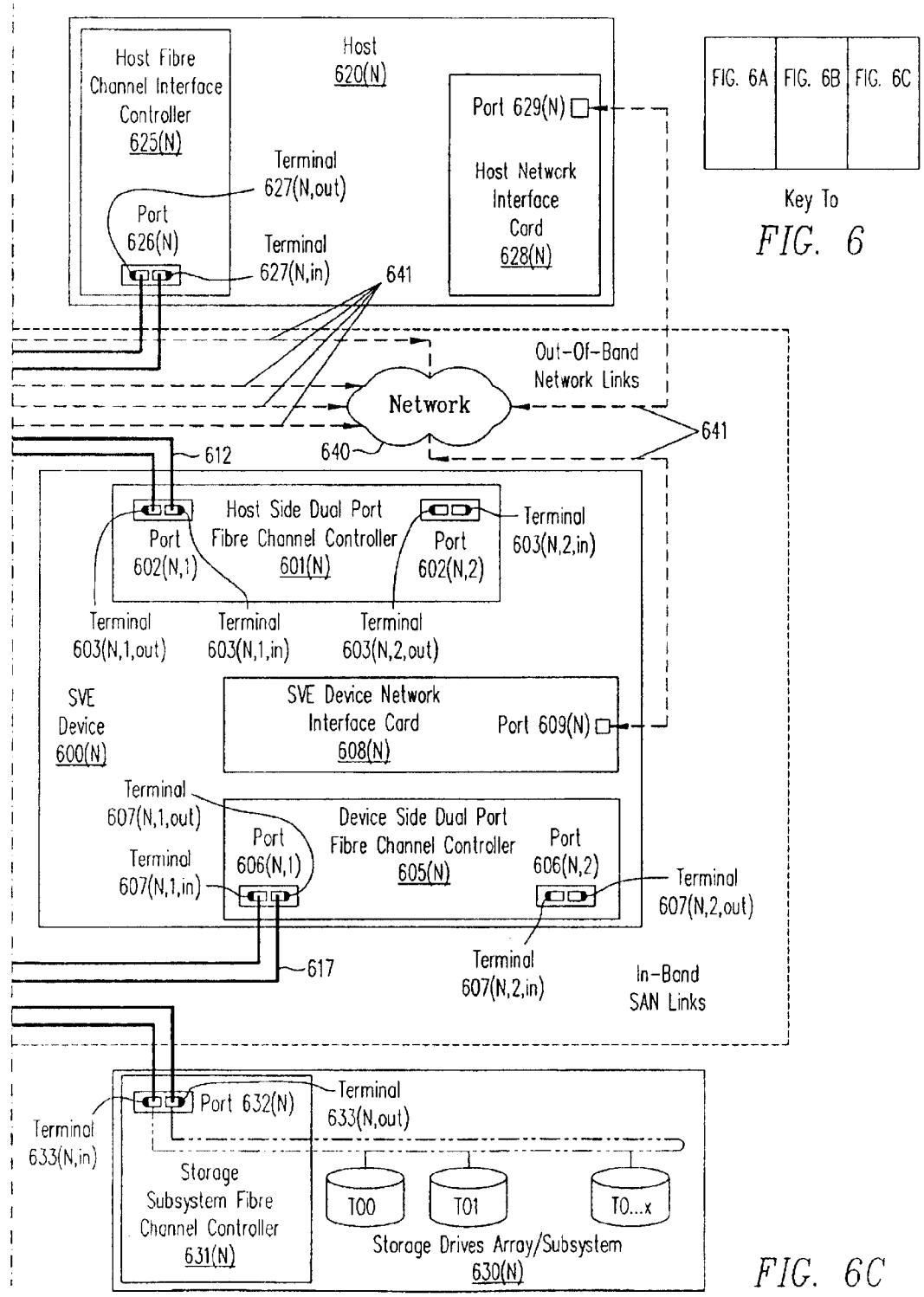

The flexible nature of the DSMPA in accommodating host systems which have a different protocol/topology from that of the storage arrays/subsystems is a powerful advantage over preceding efforts in related technology. Using this open construct where, the storage media connectivity is decoupled in this manner, the significance of not requiring any one kind of protocol/topology to match that of the hosts, which is considered as the SAN backbone, is emphasized. In the embodiments of FIGS. 5 and 6 that follow, examples are given of the more common practical applications, where FC protocol in a loop topology is the backbone, which transmits through to the storage media. The practicability of the DSMPA readily accommodates, at the transport layer, SCSI protocol (as opposed to SCSI upper-layer protocol), and so too, the proprietary SSA protocol, as examples, each of which may not be obvious, and may otherwise go unrecognized.

Moreover, it will also be noted that any appropriate transport layer and upper-layer protocol combinations may be employed in the backbone, exemplified by SAN 310, (although SCSI upper-layer protocol over fibre channel is preferred), including any of a variety of existing alternatives, examples being:
- TCP/IP over 10base-T/100base-TX Ethernet, as pertaining to
  - a LAN,
  - a proprietary WAN, or
  - the Internet;
- modified TCP/IP (or other similar protocol) over Gigabit Ethernet transport layer;
- Infiniband transport protocol compatible with IP routing, over Ethernet based networks;
- iSCSI (SCSI upper-layer protocol over internet protocol), over Gigabit Ethernet based networks;
- token-passing in a proprietary or other protocol—over a suitable medium.

Further, the topology of this SAN 310 can be one of a variety of topologies, including, but not limited to:
- ring,
- mesh,
- bus,
- tree.

Thus, while certain of the discussions herein are accented towards in a loop topology employing a fibre channel protocol, a DSMP Architecture according to embodiments of the present invention may be discussed in terms of other topologies and protocols without loss of generality. It will be noted that, for the sake of simplicity, the term protocol, as used herein, encompasses all layers of communication protocols, implicating both hardware and software.

An important facet of the invention is the links path connecting hosts 320([1]–[N]) to interface controllers. The organization of hosts and subsystem interface devices depicted herein as being connected generically in a path set (preferably a loop) is a defining feature of the DSMPA (where the transport layer carries data in a unidirectional manner, as will be seen in more complete embodiments which follow that of FIG. 3). Note that for the case of a transport layer where there is bi-directional data carriage, a similar connection strategy will apply, although the direction of data flow can invert dynamically.

Commencing with link 311, which begins at terminal 327[1,out] of port 326[1] of the host I/O interface controller 325[1] for host 320[1], signals carrying data I/O (or similar) go to terminal 303[1,1,in] of the first port (port 302[1,1]), contained as part of interface controller 301[1] of subsystem interface device 300[1]. From there, the signal can be followed by tracing the links sequentially numbered 311-315, several of which consist of multiple segments. Signals are internally routed across the interface controller 301[N] and emerge at terminal 303[1,N,out], where the first segment of multiple segment link 312 commences. This link 312 segment joins with terminal 303[2,1,in] of port 302[2,1] of interface controller 301[2] of the next subsystem interface device (subsystem interface device 300[2]), being re-routed internally within interface controller 301[2], then emerging via terminal 303[2,N,out] of last port (port 302[2,N]) of interface controller 301[2].

Signals continue along subsequent segments of multiple segment link 312 passing through each of any interstitial interface controllers between that of 301[2] of second subsystem interface device (subsystem interface device 300[2]), and that of 301[N] of the last subsystem interface device (subsystem interface device 300[N]) in the same fashion as just described. Coming in through one terminal of the first port of the interface controller of each subsystem interface device, the signals are then internally re-routed to emerge via the out terminal of the last port of the same controller, and so on, until the final interface controller 301[N] is encountered. There, the signals pass along the final segment of link 312 into terminal 303[N,1,in] of the first port (port 302[N,1]) of interface controller 301[N]. Instead of being internally routed within interface controller 301[N] through to the last port (port 302[N,N]) (as per the foregoing pattern), the signals never reach the last port (port 302[N, N]), but are instead diverted to exit via terminal 303[N,1, out] of port 302[N,1], to then begin a return journey across the array of subsystem interface devices (subsystem interface devices 300([N]–[1]), along a path made up of various segments of multiple segment link 313.

The signals follow a path which is a loop-back traversing each of the same ports encountered by link segments 312, though in the reverse order, and in each case, via the terminal of each port respectively not listed thus far in the description regarding FIG. 3.

Typically, as shown for the subsystem interface device 300[2], the signals pass via a link segment 313 into terminal 303[2,N,in] of the last port (port 302[2,N]) of interface controller 301[2], whereupon they are re-routed internally within interface controller 301[2] to emerge at terminal 303[2,1,out] of the first port (port 302[2,1]) of this same controller.

Next, the signals reach the first subsystem interface device (subsystem interface device 300[1]), thus making this segment of incoming link 313 its final segment. Entering via terminal 303[1,N,in] of the last port (port 302[1,N]) of interface controller 301[1], the signals are internally routed within interface controller 301[1] to exit via terminal 303[1,1,out] of its first port (port 302[1,1]). The signals then cross over via link 314 where the loop continues in segments of a multiple segment link 315, sequentially coupling hosts 320([N]–[2]), eventually having the circuit completed at host 320[1].

Incoming via terminal 327[N,in] of port 326[N] of host I/O interface controller of the final host (host 320[N]), the signals re-emerge via terminal 327[N,out], whereupon the signals continue along a path made up of series of successive link segments 315 which will sequentially traverse each I/O interface controller 325([N]–[2]) of the array of hosts 320 ([N]–[2]), finally reaching I/O interface controller 325[1] of the first host (host 320[1]), corresponding to that from which tracing of the signal path commenced.

Typically, as shown for host 320[2], the signals being carried along segments of multiple segment link 315 enter host I/O interface controller (e.g., host I/O interface controller 325[2]) via a terminal (e.g., terminal 327[2,in] of port 326[2]), and are then passed out via a terminal (e.g., terminal 327[2,out] of that same port). From here, the signals are returned to host interface controller (e.g., host interface controller 325[1] contained in the first host 320[1]), entering via a terminal (e.g., terminal 327[1,in] of port 326[1]), thus making this incoming segment of link 315 its final segment, and also completing the host-side network loop.

As will be apparent to one of skill in the art, each one of the multiple segments of link 312 through to 313 as well as link 311, is typically substantially similar, if not identical, to other of multiple segments of link 315, as well as link 314. As coupled in FIG. 3, subsystem interface devices 300([1]–[N]), containing the interface controllers 301([1]–[N]), and their associated links, form a SAN in a loop configuration (i.e., SAN 310).

Figure 4A:
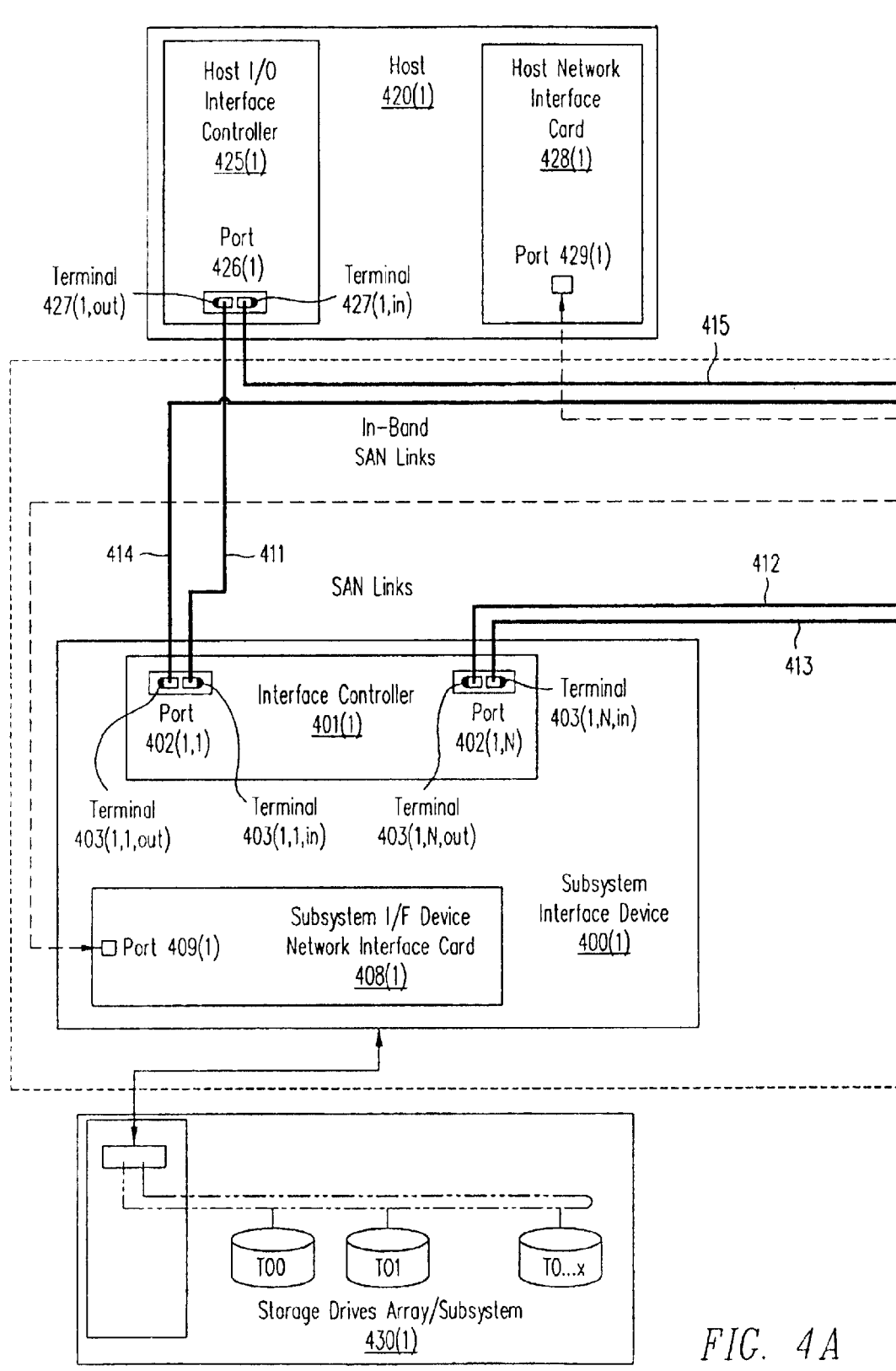
FIG. 4 is a block diagram illustrating an example of connectivity which is an extension of that shown in FIG. 3. In addition to the elements described there, the subsystem interface devices are each also shown to be connected to a sub-network, also to which the hosts are connected. Each element is linked to the sub-network through a network interface card of a type specific to that element family. This is an implementation of the invention which capitalizes on the ability that DSMP Architecture provides for inter-device communication across either of separate independent channels. Thus, this embodiment of the invention being a next stage open construct implementation (i.e., subsystem interface device consisting of, amongst other non-specific components, a single interface controller plus one network interface card), enables an extra level of management flexibility and redundancy beyond the one shown in FIG. 3.
Figure 4B:
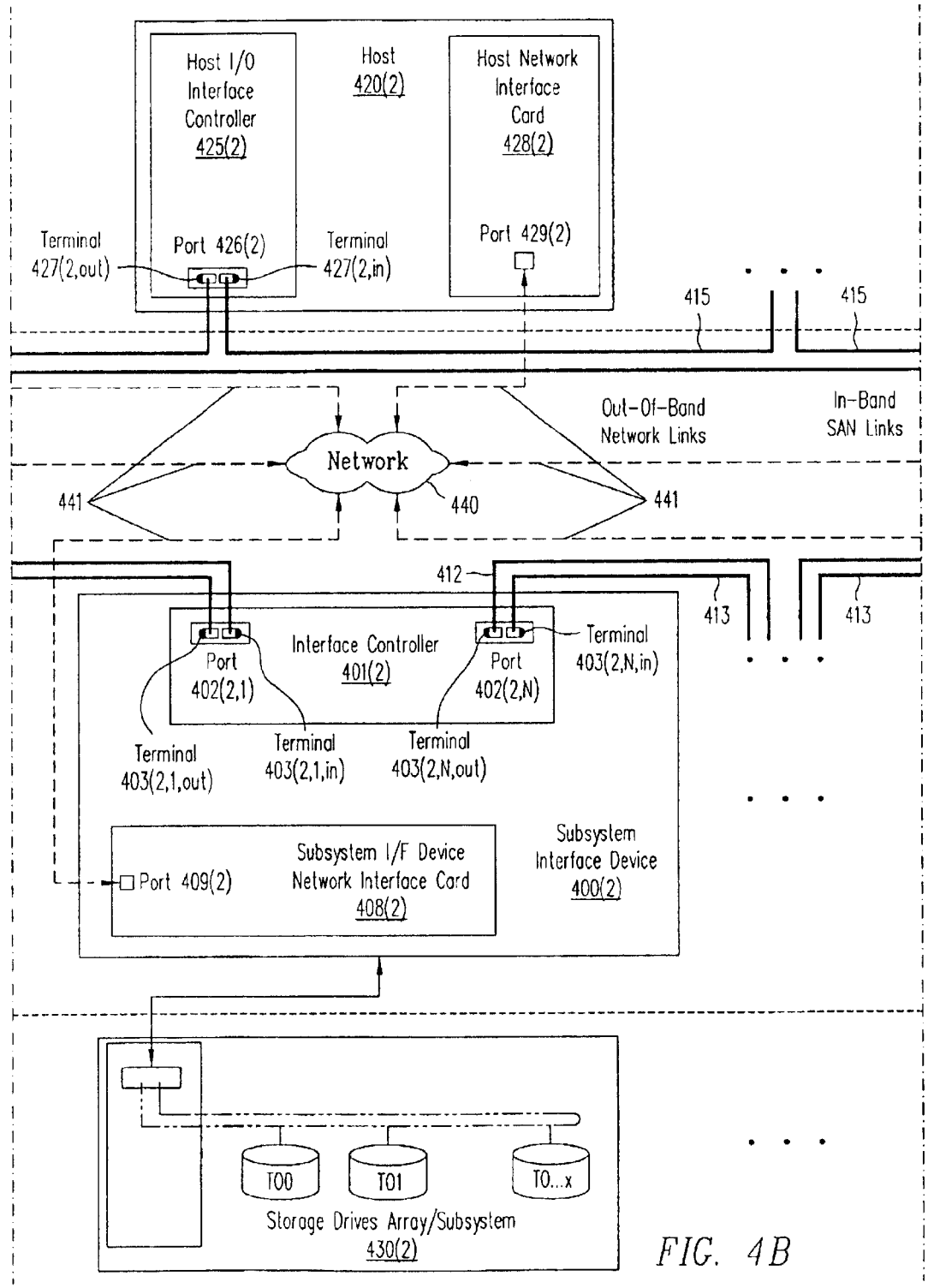
Figure 4C:
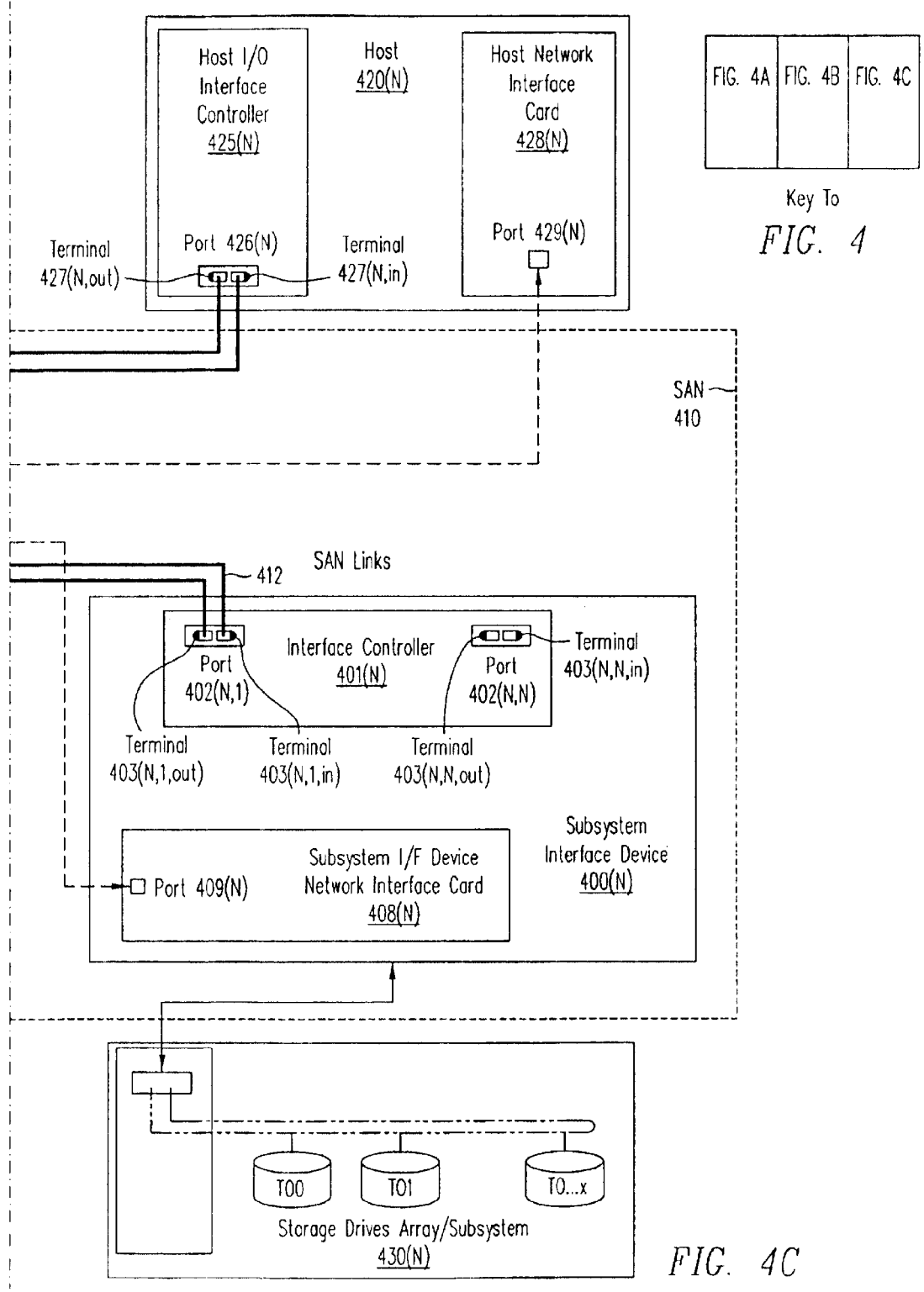

FIG. 4 is a schematic diagram illustrating an example of connectivity which is an extension of that shown in FIG. 3.

Depicted is another example of connectivity between a number of host computers and a number of storage drives array/subsystems through certain devices. Simultaneously, a number of these devices, each generically described as a subsystem interface device 400[i] of a SAN 410 can be joined in the following ways.

a) By links 411 to 415 in a loop forming part of the primary network backbone of SAN 410, the purpose of which is to provide for coupling of hosts 420([1]–[N]) to one of storage array/subsystems 430([1]–[N]). Subsystem interface devices 400([1]–[N]) are shown coupled in this loop, which is associated with the host side, via ports 402([1,1]–[N,N]) mounted on interface controllers 401([1]–[N]), an embodiment of which subsystem interface devices 400([1]–[N]) contain. The hosts 420([1]–[N]) are coupled into this loop, each through one of host I/O storage network interface controllers 425([1]–[N]).

b) Via links 441 within SAN 410, to allow independent coupling of the elements with a separate secondary (not necessarily loop topology) or sub-network (a network 440). Each one of hosts 420([1]–[N]), and the subsystem interface devices 400([1]–[N]) is coupled via links 441 to a separate independent network (again, network 440), each respectively through a particular type of network interface card (NIC), with NICs 428 ([1]–[N]) selected for compatibility with particular hosts 420([1]–[N]), and NICs 408([1]–[N]) integrally designed and installed to match with subsystem interface devices 400([1]–[N]).

In the case of the primary network backbone coupling, employment of fibre channel as the lower-layer protocol of the SAN 410 is suggested as a particular embodiment, although the invention is not limited to such a configuration.

An example of the kind of network which may be implied in the latter case is that of TCP-IP over a local area network (LAN), although a different kind of network protocol could easily be employed instead to provide for this alternative secondary network connectivity.

This implementation capitalizes on the abilities of the DSMP Architecture that provide for inter-device communication across any of several separate independent channels. Thus, in such embodiment of the invention as drawn (i.e., subsystem interface device consisting of, amongst other non-specific components, the first of a minimum of two interface controllers, plus one or more NICs), an extra level of management flexibility and operational redundancy beyond the one shown in FIG. 3 is enabled.

As established in regard to FIG. 3, the generic pattern of the looped path set of links continues in FIG. 4, connecting an array of hosts 420([1]–[N]) to an array of subsystem interface devices 400([1]–[N]), each containing one of interface controllers 401 ([1]–[N]) reappears, being a defining feature of the DSMPA involving the transport layer carrying data either in a unidirectional or bi-directional manner.

Commencing with link 411, which begins at terminal 427[1,out] of port 426[1] of host I/O interface controller 425[1] for host 420[1], the signals go to terminal 403[1,1,in] of the first port (port 402[2,1]), contained as part of interface controller 401[1] of subsystem interface device 400[1]. From there, the signals can be followed by tracing the links 411-415 sequentially. Signals are internally routed across interface controller 401[N] to emerge at terminal 403[1,N, out] of port 402 [1,N], where the first segment of multiple segment link 412 commences. This segment of link 412 joins with terminal 403[2,1,in] of the first port (port 402[2,1]) of interface controller 401[2] of the next subsystem interface device (subsystem interface device 400[2]), being re-routed internally within interface controller 401[2], then emerging via terminal 403[2,N,out] of the last port (port 402[2,N]) of interface controller 401[2].

Signals continue along subsequent segments of link 412 by passing through each of any intermediate interface controllers 401([3]–[N–1]) between that of 401[2] mounted in the second subsystem interface device (subsystem interface device 400[2]), and that of interface controller 401[N] mounted in the last subsystem interface device (subsystem interface device 400[N]) in the same fashion as just described. Coming in through one terminal of the first port of the given interface controller of each subsystem interface device, the signals are then internally re-routed to emerge via the out terminal of the last port of the same controller, and so on, until the final interface controller (interface controller 401[N]) is encountered. There, the signals will pass along the final segment of link 412 into terminal 403[N,1,in] of the first port (port 402[N,1]) of interface controller 401[N]. Instead of being internally routed within interface controller 401[N], through to the last port therein 402[N,N] (as per the foregoing pattern), the signals never reach the last port (port 402[N,N]), but are instead diverted to exit via terminal 403[N,1,out] of the same port (port 402[N,1]), to then begin a return journey across the array of subsystem interface devices (subsystem interface devices 400([N]–[1]), along a path made up of various segments of multiple segment link 413.

The signals follow a path which is a loop-back traversing each of the same ports encountered by link segments 412, though in the reverse order, and in each case, via the terminal of each port respectively not listed thus far in the description regarding FIG. 4.

Typically, as shown for the subsystem interface device 400[2], the signals pass via a link segment 413 into terminal 403[2,N,in] of the last port (port 402[2,N]) of interface controller 401[2], whereupon they are re-routed internally within interface controller 401[2] to emerge at terminal 403[2,1,out] of the first port (port 402[2,1]) of this same controller.

Next, the signals reach the first subsystem interface device (subsystem interface device 400[1]), thus making this segment of incoming link 413 its final segment. Entering via terminal 403[1,N,in] of the last port (port 402[1,N]) of interface controller 401[1], the signals are internally routed within interface controller 401[1] to exit via terminal 403 [1,1,out] of its first port (port 402[1,1]). The signals then cross over via link 414 where the loop continues in segments of a multiple segment link 415, sequentially coupling hosts 420([N]–[2]), eventually having the circuit completed at host 420[1].

Incoming via terminal 427[N,in] of port 426[N] of host I/O interface controller 425[N] of the final host (host 420 [N]), the signals re-emerge via terminal 427[N,out], whereupon the signals continue along a path made up of series of successive link segments 415 which will sequentially traverse each I/O interface controller 425([N]–[2]) of the array of hosts 420([N]–[2]), finally reaching I/O interface controller 425[1] of the first host (host 420[1]), corresponding to that from which tracing of the signal path commenced.

Typically, as shown for host 420[2], the signals being carried along segments of multiple segment link 415 enter host I/O interface controller (e.g., host I/O interface controller 425[2]) via a terminal (e.g., terminal 427[2,in] of port 426[2]), and are then passed out via a terminal (e.g., terminal 427[2,out] of that same port). From here, the signals are returned to host interface controller (e.g., host interface controller 425[1] contained in the first host 420[1]), entering via a terminal (e.g., terminal 427[1,in] of port 426[1]), thus making this incoming segment of link 415 its final segment, and also completing the host-side network loop.

As will be apparent to one of skill in the art, each one of the multiple segments of link 412 through to 413 as well as link 411, is typically substantially similar, if not identical, to other of multiple segments of link 415, as well as link 414. As coupled in FIG. 4, subsystem interface devices 400([1]–[N]), containing the interface controllers 401([1]–[N]), and their associated links form a SAN with a primary loop configuration (i.e., SAN 410). As mentioned earlier, while employment of the fibre channel transport layer protocol is implied here, the invention should not be considered to be limited only to such an embodiment. In any case, these links could be collectively considered to be an in-band channel of communications, specifically between the subsystem interface devices, as any communications data shares the available bandwidth with the distinct I/O signals data traveling in both directions between the hosts and the storage arrays/subsystems.

Meanwhile, the set of link branches 411, being of a different type than links 411–415, maintain a coupling between elements on the host side within a sub-network, a network 440 of the SAN 410. Any one of link branches 441 joining network 440 to a host element 420([1]–[N]) can be seen to pass via one of ports 429([1]–[N])), that reside on one of host NICs 428([1]–[N]). In the case of joining the network 440 to subsystem interface devices 400([1]–[N]), any link can be seen to pass in via one of ports 409([1]–[N]) residing on one of subsystem interface device NICs 408([1]–[N]).

In this embodiment, the set of link branches 441 of this sub-network, network 440 exist simultaneously and independently to the coupling of the primary loop carrying the in-band channel. This set of sub-network link branches (i.e., set of links 441) of network 440 within SAN 410 can be collectively considered the out-of-band communications channel between subsystem interface devices 400([1]–[N]). Other embodiments, however, exist in which two different sets of links (links 411–415 compared with link branches 441) could have their roles transposed. Alternatively, a loss of connectivity across the links of one network type being substituted for by the links of the other network, transparently usurping the role of the former.

FIG. 5 is a schematic diagram illustrating an example SAN that elaborates on the implementation of single primary network connectivity beyond that open construct shown in FIG. 3. Links (preferably of fibre channel type) are used to create an extensible SAN, described in terms of two separate path set configurations, one on the host side, and another on the device side.

Depicted is another example of a DSMP Architecture that is the basis of the SAN 510 infrastructure, establishing connectivity between a number of host computers through to a number of storage drives array/subsystems via certain devices.

As established in FIG. 3, now similarly in FIG. 5 there appears a generic pattern of a path set of links coupling an array of hosts 520([1]–[N]) to an array of subsystem interface devices 500([1]–[N])—this being a defining feature of a DSMPA according to embodiments of the present invention—involving the transport layer carrying data in both a uni-directional or bi-directional manner. However, each such device is now shown to contain interface controllers which can specifically be multi-port controllers, thus, in addition to a first multi-port controller 501[i], there is a second multi-port controller 506[i],. Now the remainder of the connectivity is revealed in detail—that of another path set of links—coupling each of the subsystem interface devices 500([1]–[N]), each via one of the second multi-port controllers 506([1]–[N]) of subsystem interface devices 500 ([1]–[N]), through to the storage arrays/subsystems 530([1]–[N]).

Each of such subsystem interface devices is now referred to herein as a storage router type device (or simply storage router), this being a key aspect generic embodiment of the embodiments of the present invention. However to maintain generality and not limit the scope of the invention, it should be understood that this device is one type of storage router, so there may be other combinations of numbers of controllers, supporting other protocols, which are equally well able to be successfully implemented in practice.

Simultaneously, a number of these storage router type devices (e.g., storage routers 500([1]–[N])) may be joined in the following ways.

a) On the host side, by links 511 through to 515, in a path set forming part of the primary network backbone of SAN 510, whose purpose is to provide for one portion of the coupling of hosts 520([1]–[N]) to a storage array/subsystem 530([1]–[N]). Storage router type devices 500([1]–[N]) are shown coupled in this path set (preferably a loop), which is associated with the host side, via ports 502([1,1]–[N,N]) of multi-port controllers 501([1]–[N]) contained therein. The hosts 520([1]–[N]) are coupled into this loop, each through one of the host I/O storage network interface controllers 525([1]–[N]).

b) On the device side, via links 516-519 as well as link 521, in a path set forming the second part of the primary network backbone of SAN 510, the purpose of which is to provide the remaining portion of the coupling of hosts 520([1]–[N]) to storage array/subsystems 530([1]–[N]). Storage router type devices 500([1]–[N]) are shown coupled in this path set (preferably a loop), which is associated with the device side, via ports 506([1,1]–[N,N]) of multi-port controllers 505([1]–[N]) contained therein. Storage drive arrays/subsystems 530([1]–[N]) are coupled into this loop, each through storage subsystem controllers 531([1]–[N])—these latter items however, as obvious to one of skill in the art, not being a part of the invention.

For this type of primary network coupling backbone, employment of SCSI upper-layer protocol over fibre channel transport layer of SAN 510 is suggested as a one preferred embodiment, although the invention is not limited to such a configuration. Moreover, it will be noted that any appropriate transport layer and upper-layer protocol combinations may conceivably be employed for the SAN, and any of a variety of existing and potentially suitable alternatives (as listed earlier regarding FIG. 3, but restated here):

TCP/IP over 10base-T/100base-TX Ethernet, as pertaining to
a LAN,
a proprietary WAN, or
the Internet;
modified TCP/IP (or other similar protocol) over Gigabit Ethernet transport layer;
Infiniband transport protocol compatible with IP routing, over Ethernet based networks;
iSCSI (SCSI upper-layer protocol over internet protocol), over Gigabit Ethernet based networks;
token-passing in a proprietary or other protocol—over a suitable medium.

Further, the topology of this SAN 510 can be one of a variety of topologies, including, but not limited to:
ring,
mesh,
bus,
tree.

Thus, while certain of the discussions herein are accented towards in a loop topology employing a fibre channel protocol, a DSMP Architecture according to embodiments of the present invention may be discussed in terms of other topologies and protocols without loss of generality. It will be noted that, for the sake of simplicity, the term protocol, as used herein, encompasses all layers of communication protocols, implicating both hardware and software.

Commencing with link 511, which begins at terminal 527[1,out] of port 526[1] of host I/O interface controller 525[1] for host 520[1], the signals go to terminal 503[1,1,in] of the first port (port 502[1,1]), which is part of multi-port controller 501[1] of storage router type device 500[1].

From there, the signal can be followed by tracing links 511–515 sequentially. Signals are internally routed across multi-port controller 501[N], and emerge at terminal 503[1,N,out] of port 502[1,N], where the first segment of multiple segment link 512 commences. This segment of link 512 joins with terminal 503[2,1,in] of the first port (port 502[2,1]) of the multi-port controller 501[2] of the next storage router type device (storage router type device 500[2]), being re-routed internally within multi port controller 501[2], then emerging via terminal 503[2,N,out] of last port 502[2,N].

Signals continue along subsequent segments of multiple segment link 512 by passing through each of any intermediate multi-port controllers 501([3]–[N–1]) between that of 501[2] mounted in the second storage router type device (storage router type device 500[2]), and that of multi-port controller 501[N] of the last storage router type device (storage router type device 500[N]) in the same fashion as just described. Coming in through one terminal of the first port of the given multi-port controller of each storage router type device, the signals are then internally re-routed to emerge via the out terminal of the last port of the same controller, and so on, until the final multi-port controller (multi-port controller) is encountered. There, the signals will pass along the final segment of link 512 into terminal 503[N,1,in] of the first port (port 502[N,1]) of multi-port controller 501[N]. Instead of being internally routed within multi-port controller 501[N], through to the last port therein 502[N,N] (as per the foregoing pattern), the signals never reach the last port (port 502[N,N]), but are instead diverted to exit via terminal 503[N,1,out] of the same port (port 502[N,1]), to then begin a return journey across the array of storage router type devices (storage router type devices 500([N]–[1])), along a path made up of various segments of multiple segment link 513.

The signals follow a path which is a loop-back traversing each of the same ports encountered by link segments 512, though in the reverse order, and in each case, via the terminal of each port respectively not listed thus far in the description regarding FIG. 5.

Typically, as shown for storage router type device 500[2], the signals pass via a link segment 513 into terminal 503[2,N,in] of the last port (port 502[2,N]) of multi-port controller 501[2], whereupon they are re-routed internally within multi-port controller 501[2] to emerge at terminal 503[2,1,out] of the first port (port 502[2,1]) of this same controller.

Next, the signals reach the first storage router type device (storage router type device 500[1]), thus making this segment of incoming link 513 its final segment. Entering via terminal 503[1,N,in] of the last port (port 502[1,N]) of multi-port controller 501[1], the signals are internally routed within multi-port controller 501[1] to exit via terminal 503[1,1,out] of its first port (port 502[1,1]). The signals then cross over via link 514 where the loop continues in segments of a multiple segment link 515, sequentially coupling hosts 520([N]–[2]), eventually having the circuit completed at host 520[1].

Incoming via terminal 527[N,in] of port 526[N] of host I/O interface controller 525[N] of the final host (host 520[N]), the signals re-emerge via terminal 527[N,out], whereupon the signals continue along a path made up of series of successive link segments 515 which will sequentially traverse each I/O interface controller 525([N]–[2]) of the array of hosts 520([N]–[2]), finally reaching I/O interface controller 525[1] of the first host (host 520[1]), corresponding to that from which tracing of the signal path commenced.

Typically, as shown for host 520[2], the signals being carried along segments of multiple segment link 515 enter host I/O interface controller (e.g., host I/O interface controller 525[2]) via a terminal (e.g., terminal 527[2,in] of port 526[2]), and are then passed out via a terminal (e.g., terminal 527[2,out] of that same port). From here, the signals are returned to host interface controller (e.g., host interface controller 525[1] contained in the first host 520[1]), entering via a terminal (e.g., terminal 527[1,in] of port 526[1]), thus making this incoming segment of link 515 its final segment, and also completing the host-side network loop.

As will be apparent to one of skill in the art, each one of the multiple segments of backbone links 512–513 as well as link 511, is typically substantially similar, if not identical, to other of multiple segments of link 515, as well as link 514. In this particular embodiment, the identity may be extended to cover each and all of the links 516 to 519 and then 521 also. (However, as discussed in several paragraphs subsequent, such is not necessarily the case in a heterogeneous environment.) As coupled in FIG. 5, storage router type devices 500([1]–[N]), containing multi-port controllers 501([1]–[N]) and 505([1]–[N]), and their associated links, form a SAN with a primary loop configuration (i.e., SAN 510).

As mentioned earlier, while employment of the fibre channel transport layer protocol is implied here, the invention should not be considered to be limited only to such an embodiment. In any case, these links could be collectively considered to be an in-band channel of communications, specifically between the storage router type devices, as any communications data shares the available bandwidth with the distinct I/O signals data traveling in both directions between the hosts and the storage arrays/subsystems.

Not mentioned thus far however, but readily supported by a DSMP Architecture of a kind similar to that depicted in FIG. 5, is the provision for accommodating hosts and storage equipment subscribing to mixed protocols, and connecting them into the same SAN. By having storage router type devices with interchangeable multi-port controller modules, these devices may be fitted with different combinations of modules designed with any one of several common types of port hardware (also implementing appropriately matching embedded firmware).

Demonstrating a need for such embodiments of DSMPA are several common heterogeneous commercial/industrial IT configuration requirements, among them being:
  a combination of a dual-port FC controller on the host side, with dual-port SSA controller on the storage side, to support the IBM proprietary ring-based Serial Storage Architecture;
  a combination of a dual-port FC controller, with a dual terminal SCSI controller, which can be used in either host-side versus storage-side orientation; namely linking SCSI-based hosts to an FC-based SAN, or alternatively, coupling SCSI-based JBOD style storage equipment to an FC-based SAN.

The implementation of such equipment resolves some previously untenable problems. Not only capably fulfilling a critical storage support role—that of providing essential bridging functionality across otherwise incompatible transport protocols—but also providing the wide range of extra advantages for a SAN associated with employing the DSMP Architecture, as discussed in prior sections of this document.

By arranging appropriate coupling of the storage router type devices, the interconnection of environments of heterogeneous storage array/subsystems, or of heterogeneous host, or a mixture of all is supported. Ensuring that adjacent storage router type devices are coupled by controllers of matching transport layer protocol (port interconnect hardware), such storage router type devices can be interconnected in cascade, or alternatively daisy chain, configurations with other storage router type devices, as necessary to establish a common loop (or other topology) coupling, which will form the backbone of the SAN overall. As implied by the discussion regarding FIGS. 3 to 5, the preferable, though not exclusive, protocol for this purpose is SCSI upper layer over fibre channel transport (lower) layer.

Despite preference for employing the fibre channel transport layer protocol, the invention should not be considered as being limited thereto. In any case, these links can be collectively considered to comprise the in-band channel of communications, specifically amongst the storage router type devices, as any communications data is sharing the available bandwidth with the distinct I/O signals data traveling in both directions between the hosts and the storage arrays/subsystems.

It will be noted that coupling to network 510 provides more generic flexibility in this configuration, when compared to that depicted in FIG. 3, because each host and subsystem is coupled into the network by one of the multi-port controllers contained within the storage router type device. Thus, addition or removal of any type of element, in relation to the SAN, becomes a relatively straight-forward task, with predictable results, thus eliminating uncertainties from the sphere of concern for administrative tasks via the management platform. These tasks are associated with prescribed repeatable methods, depending upon whether such an element is a host, or a storage array/subsystem, or even some other device.

Each storage router type device thus becomes a stand-alone building block, from which SANs of various topologies can easily be configured. This extensibility is desirable, for example, because such extensibility simplifies tasks associated with building, maintaining and administering a storage network, providing powerful capabilities with regard to structuring a SAN for optimal performance, reliability, ease of maintenance, and other such advantages.

FIG. 6 is a schematic diagram which cumulatively combines various DSMPA facets introduced progressively in prior figures, that might make up a SAN 610. The storage router type device is referred to herein as a Storage Virtualization Engine (SVE) device, this being a key aspect of a preferable embodiment of a DSMP Architecture according to the present invention. Furthermore, another feature of this embodiment is that the controllers, rather than having a non-specific multiplicity of ports, are shown as dual-port fibre channel controllers. However with an intent not to limit the scope of the invention, it should be understood that this device is essentially a type of storage router, so there may be other combinations of numbers of controllers, and ports per controller, supporting other protocols, which are equally well able to be successfully implemented in practice, to which the SVE term may be transferred.

Depicted is another example of connectivity between a number of host computers and a number of storage drives array/subsystems through SVE devices 600([1]–[N]) of a SAN 610, which may be coupled in the following ways.
  a) On the host side, by links 611-615, in a path set forming part of the primary network backbone of SAN 610, the purpose of which is to provide for one portion of the coupling of hosts 620([1]–[N]) to a storage array/subsystem 630([1]–[N]). These SVE devices are shown coupled in this path set (preferably a loop), which is associated with the host side, via ports 602([1,1]–[N,2]) of dual-port controllers 601([1]–[N]), contained therein. Hosts 620([1]–[N]) are coupled into this loop each through one of host I/O storage network interface controllers 625([1]–[N]), which may be otherwise referred to as host bus adapters (HBAs).
  b) On the device side, via links 616-619 as well as link 621, in a path set forming the second part of the primary network backbone of SAN 610, the purpose of which is to provide the remaining portion of the coupling of hosts 620([1]–[N]) to a storage array/subsystem 630([1]–[N]). These SVE devices are shown coupled in this path set (preferably a loop), which is associated with the device side, via ports 606([1,1]–[N,2]) of multi-port controllers 605([1]–[N]), contained therein. The storage drive arrays/subsystems are coupled into this loop each through storage subsystem controllers 631([1]–[N])—this latter item however, as obvious to one of skill in the art, not being a part of the DSMPA invention.

c) Via links 641 within SAN 610, to allow independent coupling of the elements with a separate secondary (not necessarily loop topology) or sub-network (a network 640). Each one of hosts 620([1]–[N]), and the sub-system interface devices 600([1]–[N]) is coupled via links 641 to a separate independent network (again, network 640), each respectively through a particular type of network I/F card (NIC), with NICs 628([1]–[N]) selected for compatibility with particular hosts 620([1]–[N]), and NICs 608([1]–[N]) integrally designed and installed to match with SVE devices 600([1]–[N]).

In the case of the primary network backbone coupling regime, employment of fibre channel as the lower-layer protocol of SAN 610 is suggested as a particular embodiment, although the invention is not limited to such configurations. An example of a network that can be implied in the latter case is that of TCP-IP via a LAN, although a different kind of network protocol could easily be employed instead to provide for this alternative secondary network connectivity.

This embodiment of the invention capitalizes on the ability provided by the DSMP Architecture for inter-device communication across separate, independent channels (and elaborates on the scheme of FIG. 4 which shows an intermediate construct embodiment used to assist with preliminarily explaining the DSMP Architecture concept). Hence, this embodiment of the invention as shown in FIG. 6 (i.e., an SVE device consisting of, amongst other non-specific components, a single dual-port fibre channel controller plus a network I/F card) enables an extra level of management flexibility and operational redundancy beyond the one shown in FIG. 5.

As established in FIG. 5, the generic pattern of the looped path of links connecting an array of hosts 620([1]–[N]) to an array of SVE devices 600([1]–[N]) reappears, though now each specifically contains a dual-port controller 601([1]–[N]), these various facets being a defining features of the DSMP Architecture utilizing a fibre channel transport layer carrying data both in a uni-directional or bi-directional manner.

Commencing with link 611, which begins at terminal 627[1,out] of port 626[1] of host I/O interface controller 625[1] for host 620[1], the signals go to terminal 603[1,1,in] of the first port (port 602[1,1]), contained as part of dual-port controller 601[1] of SVE device 600[1]. From there, the signal can be followed by tracing the links 611–615 sequentially. Signals are internally routed across dual-port controller 601[N] to emerge at terminal 603[1,2,out] of port 602[1,2], where the first segment of a link 612 commences. This segment of multiple segment link 612 joins with terminal 603[2,1,in] of the first port (port 602[2,1]) of the dual-port controller 601[2] of the next SVE device (SVE device 600[2]), being re-routed internally within dual-port controller 601[2], then emerging via terminal 603[2,2,out] of second port 602[2,2].

Signals continue along subsequent segments of multiple segment link 612 by passing through each of any intermediate dual-port controllers 601([3]–[N–1]) between that of 601[2] mounted in the second SVE device (SVE device 600[2]), and that of dual-port controller 601[N] of the last SVE device (SVE device 600[N]) in the fashion just described. Coming in through one terminal of the first port of the given dual-port controller of each SVE device, the signals are then internally re-routed to emerge via the out terminal of the second port of the same controller, and so on, until the final dual-port controller (dual-port controller) is encountered. There, the signals will pass along the final segment of link 612 into terminal 603[N,1,in] of the first port (port 602[N,1]) of dual-port controller 601[N]. Instead of being internally routed within dual-port controller 601[N], through to the last port (port 602[N,N]) therein (as per the foregoing pattern), the signals never reach the last port (port 602[N,N]), but are instead diverted to exit via terminal 603[N,1,out] of the same port (port 602[N,1]), to then begin a return journey across the array of SVE devices (SVE devices 600([N]–[1])), along a path made up of various segments of multiple segment link 613.

The signals follow a path which is a loop-back traversing each of the same ports encountered by link segments 612, though in the reverse order, and in each case, via the terminal of each port respectively not listed thus far in the description regarding FIG. 6.

Typically, as shown for SVE device 600[2], the signals pass via a link segment 613 into terminal 603[2,N,in] of the second port (port 602[2,N]) of dual-port controller 601[2], whereupon they are re-routed internally within dual-port controller 601[2] to emerge at terminal 603[2,1,out] of the first port (port 602[2,1]) of this same controller.

Next, the signals reach the first SVE device (SVE device 600[1]), thus making this segment of incoming link 613 its final segment. Entering via terminal 603[1,N,in] of the last port (port 602[1,N]) of dual-port controller 601[1], the signals are internally routed within dual-port controller 601[1] to exit via terminal 603[1,1,out] of its first port (port 602[1,1]). The signals then cross over via link 614 where the loop continues in segments of a multiple segment link 615, sequentially coupling hosts 620([N]–[2]), eventually having the circuit completed at host 620[1].

Incoming via terminal 627[N,in] of port 626[N] of host I/O interface controller 625[N] of the final host (host 620[N]), the signals re-emerge via terminal 627[N,out], whereupon the signals continue along a path made up of series of successive link segments 615 which will sequentially traverse each I/O interface controller 625([N]–[2]) of the array of hosts 620([N]–[2]), finally reaching I/O interface controller 625[1] of the first host (host 620[1]), corresponding to that from which tracing of the signal path commenced.

Typically, as shown for host 620[2], the signals being carried along segments of multiple segment link 615 enter host I/O interface controller (e.g., host I/O interface controller 625[2]) via a terminal (e.g., terminal 627[2,in] of port 626[2]), and are then passed out via a terminal (e.g., terminal 627[2,out] of that same port). From there, signals are returned to host interface controller (e.g., host interface controller 625[1] contained in the first host 620[1]), entering via a terminal (e.g., terminal 627[1,in] of port 626[1]), thus making this incoming segment of link 615 its final segment, and also completing the host-side network loop.

As will be apparent to one of skill in the art, each one of the multiple segments of backbone links 612–613, as well as link 611, is typically substantially similar, if not identical, to other of multiple segments of link 615, as well as link 614. In this particular embodiment, the identity can be extended to cover links 616 to 619, as well as 621. (However, as discussed with regard to FIG. 5, such is not necessarily the case in a heterogeneous environment, where there may be other protocols employed in various controller module combinations within SV devices, and SV devices can be coupled in cascade type or daisy chain type arrangements as necessary to successfully establish complete backbone loop (or other topology) connectivity).

As coupled in FIG. 6, SVE devices 600([1]–[N]), containing the dual-port controllers 601([1]–[N]) and 605([1]–[N]), and their associated links, form a SAN with a primary loop configuration (i.e., SAN 610). As mentioned earlier, employment of the fibre channel transport layer protocol is implied here, though the invention should not be considered to be limited to such a protocol only. In any case, these links could be collectively considered to be the in-band channel of communications, specifically between the SVE devices, as any communications data is sharing the available bandwidth with the distinct I/O signals data traveling in both directions between the hosts and the storage arrays/subsystems.

Meanwhile, the set of link branches 641, being a different type than links 611–621, maintain a coupling between elements on the host side within a sub-network, a network 640 of SAN 610. Any one of link branches 641 joining network 640 to a host element 620([1]–[N]) can be seen to pass via one of ports 629([1]–[N]) that reside on one of host NICs 628([1]–[N]). In the case of joining the network 640 to SVE devices 600([1]–[N]), any link can be seen to pass in via one of ports 609([1]–[N]) residing on one of subsystem interface device NICs 608([1]–[N]).

In this embodiment, the set of link branches of this sub-network, network 640 exist simultaneously and independently to the coupling of the primary loop carrying the in-band channel. This set of sub-network link branches (i.e., set of links 641) of network 640 within SAN 610 could be collectively considered to be the out-of-band channel of communications between the SVE devices. However, other embodiments exist in which the two different sets of links (links 611–621 compared with link branches 641) could have their roles transposed. Alternatively, a loss of connectivity across the links of one network type is substituted for by the links of the other network, transparently usurping the role of the former.

It will be noted the combined network couplings within SAN 610 provide complete generic flexibility in this configuration, fully developed upon that of SAN 410 depicted in FIG. 4. Each host and storage array/subsystem is coupled into the network by one of the dual-port controllers contained within the SVE device. Addition to or removal from the SAN of any type of element (a basic facet of SAN scalability/extensibilty), becomes a relatively straight-forward task, the associated network interruption being well-managed (results predictable—seamless and with rapid ramp-up or system restoration). Thus uncertainties are eliminated from the sphere of concern for administrative tasks via this management platform. These tasks are associated with prescribed repeatable methods, depending upon whether such an element is a host, or a storage array/subsystem, or can even be some other device that resides within or outside the SAN boundary.

Each SVE device thus becomes a stand-alone building block, from which SANs of various topologies can easily be configured. This extensibility is desirable, for example, because such extensibility simplifies tasks associated with building and maintaining and administering a storage network, providing powerful capabilities with regard to structuring a SAN for optimal performance, reliability, ease of maintenance and other such advantages.

Component Level Detail of a Multi-Port Fibre Channel Controller Embodiment

In discussing these links, between controllers, ports and ultimately the terminals, it is necessary to elaborate further discussing some of the internal electronic mechanisms. Amongst other benefits, this will clarify some fundamental issues, which are a potential source of confusion, due to common variations in nomenclature usage disseminated by, and amongst, those skilled in the art. An issue central to the invention being properly understood is in recognition of the distinction between what is a port in the physical sense, when discussing a connector consisting of a terminal pair, and what is a port in the logical context, when discussing SCSI upper protocol over a fibre channel transport layer.

Figure 7:
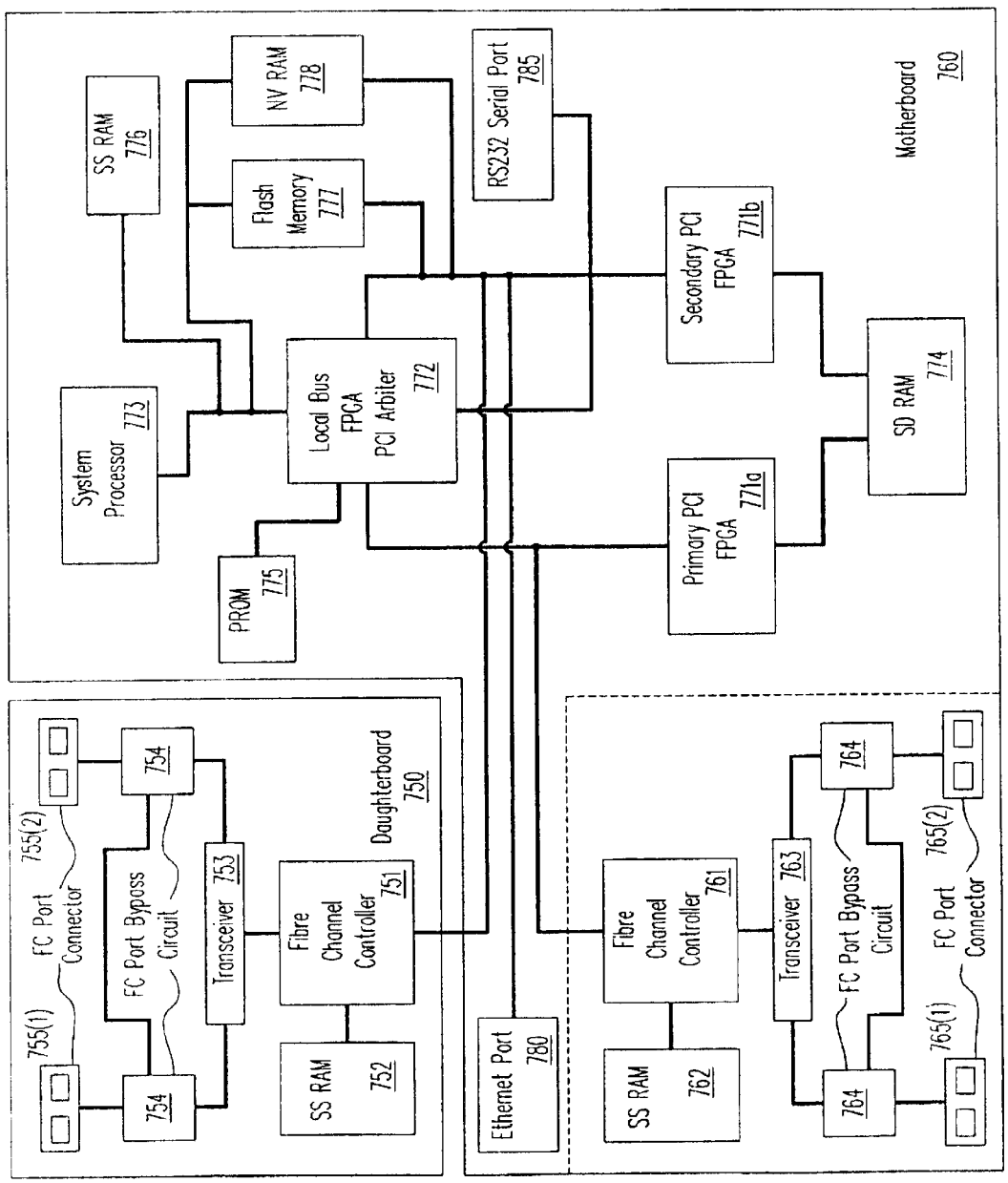
FIG. 7 is a block diagram illustrating what constitutes an SVE device, a daughtercard and a motherboard, the first embracing a collective of components that make up a dual port fibre channel controller, the second encompassing an identical group of components but also accompanied by various others fundamental to the processing operations that must take place to permit the DSMPA to function.

Useful for these purposes is FIG. 7, which is a block diagram outlining what hardware comprises a SVE device, (being a type of storage router), which plays an important role as a building block in a SAN which employs DSMP Architecture.

Typically an SVE device of the form described in the embodiments of FIG. 6, may consist of several circuit boards, with perhaps one being subservient to the governing or processing functionality of the other. Given this relationship, the former might be considered to be a daughterboard, and the latter a motherboard. In those earlier illustrated embodiments, the daughterboard may be dedicated to connectivity with the host-side topology of the SAN, for example, while the motherboard may be associated with the links to elements in the storage side of the SAN. However, it may be common for some versions of such an SVE device to be installed in an opposite case manner,— such that the motherboard is coupled with the host side, and the daughterboard with the device side.

Turning to FIG. 7, a daughterboard 750 embodies the hardware essential to a multi-port fibre channel controller (MPFCC), in a basic dual-port form embodiment. Such an MPFCC consists of a fibre channel controller chip 751 (of which a typically preferable commercial example is an IC referred to as a Tachyon—manufactured by HP/Agilent Technologies of Palo Alto, Calif., as part no.: TL5000D), adjoined by a synchronous static random access memory (SS RAM) chip 752, coupled through to a pair of FC port connectors 755[1] and 755[2], each via a FC port bypass circuit chip 754 (one to each connector 755[1] and 755[2] respectively), through a transceiver chip 753. It will be noted that these two FC port connectors can correspond to any of the pairs of ports 602[i,1] and 602[i,2], as shown in each of the host side dual port fibre channel controllers of FIG. 6.

These components are found repeated collectively as a subset portion of a motherboard 760. Here, the principal component, being a second fibre channel controller chip 761 (indistinguishable from chip 751 found on daughterboard 750), is adjoined by another SS RAM chip 762, and coupled through to another pair of FC port connectors 765[1] and 765[2], each via a FC port bypass circuit chip 764 (one to each of connectors 765[1] and 765[2], respectively), through another transceiver chip 763. It will be noted that these two FC port connectors can correspond to any of the pairs of ports 606[i,1] and 606[i,2], as shown in each of the storage side dual port fibre channel controllers of FIG. 6.

The intelligent decision-making characteristics of the DSMPA emanate from these and several other components shown here, the critical ones being a local bus field programmable gate array (LB FPGA) peripheral component interconnect (PCI) arbiter 772, and a central processor unit (CPU) 773. Motherboard 760 supports two PCI buses—a primary PCI bus 770a, and a secondary PCI bus 770b, allowing electronic signals to pass between the various components.

There is a noteworthy distinction between components 750–754 of the daughterboard (supporting the FC port connector pair 755[i]), and those of the collective components group 760–764 (feeding FC connector port pair 765 [i]). Those components residing on daughterboard 750 are coupled through fibre channel controller chip 751 via secondary PCI bus 770b and a corresponding secondary PCI FPGA 771b, whilst the latter group mounted on motherboard 760 are coupled through fibre channel controller chip 761 via primary PCI bus 770a, and a corresponding primary PCI FPGA 771a.

Both PCI buses feed out from the LBFPGA PCI arbiter and terminate in a synchronous dynamic memory (SD RAM) chip 774. The other noteworthy elements are a programmable read only memory (PROM) chip 775 through which instructions for LB FPGA PCI arbiter 772 are set, several other memory components—an SS RAM chip 776, branching off the link between LB PCI FPGA arbiter772 and CPU 773, as well as a flash memory chip 777, and a non-volatile memory (NV RAM) chip 778, both of these connected in parallel to the path through LB FPGA PCI arbiter 772, bridging secondary PCI bus 770b to CPU 773.

Finally, there are also two different ports separate from those of the fibre channel (or which ever other primary in-band channel of communications is established between hosts and storage), each providing an independent facility for management or maintenance functions of the SVE device. One of these is an Ethernet port 790, the participation of which has already been discussed in each of FIG. 4 and FIG. 6 (this being embodied respectively therein by port 409[i] and port 609[i], respectively). The other is a serial port 780, the role of which is important in initially establishing some aspects of configuration in a SAN. However, the serial port 780 has a less significant role in the ongoing operations of the SVE device in a SAN employing a DSMPA, and so, lacking inventive novelty in the present invention context, does not warrant specific discussion beyond this mention.

As can be seen, motherboard 760 and daughterboard 750 each consists of a variety of interconnected elements of electronic hardware, the focus (from the perspective of defining the multi-port fibre channel controller being a key element of the SVE device which is a key device of the DSMP Architecture) is nevertheless the manner of harnessing the powerful functionality of each of single fibre channel controller chips 751 and 761 on each board respectively, and their possible means of facilitating capable interaction with the other components mounted thereon.

There is software—which may be more precisely referred to as firmware, (to distinguish it from the code which usually resides on read/write storage media on a computer)—embedded in flash memory chip 777. This firmware prescribes instructions for the manner in which signals are processed by controllers 761 and 751, also describing how the signals may be transmitted and/or distributed amongst other components residing on motherboard 760, and on daughterboard 750. These instructions provide the underlying basis for defining the operation of the DSMP Architecture.

Hosts and storage connected to a SAN employing a DSMP Architecture according to embodiments of the present invention, with SVE devices as the nodes of its framework, may only observed to behave and display the inherently intelligent, powerful and flexible characteristics associated with a DSMPA when the electronic components supporting each FC controller, (the controller in a collective sense, including either those components on the daughterboard 750 (items 751–755), or the group of components on the motherboard 760 (items 761–765) as per FIG. 7), work together as prescribed by the firmware.

Flowing from host to storage along the fibre channel path through any one SVE device is signal data, which may or may not be in a packetized form. This data, which can flow at rates of the order of 100 megabytes per second or more, is received and, with minimal latency, retransmitted onwards, perhaps even redirected along multiple duplicated streams. In the mean-time, though, a copy of certain bit portions of the data packet may need to be collected and saved to one of the memory chips (for example SD RAM chip 774, SS RAM chip 776, or NV RAM chip 778), the governing decision for which is made by a component such as the LB FPGA PCI arbiter 772, based on deciphering of certain other bit portions of a data packet, and comparing those deciphered bit portions with information stored in primary PCI FPGA 771a, or in secondary PCI FPGA 77 1b.

This storage router type device-based intelligent data handling and decision making processes depend on communications signals flowing between adjacent FC controllers coupled in loop (or other topology) link paths described earlier, which share the link bandwidth simultaneously and in an uninhibiting manner with the I/O data also passing along this channel. Alternatively, if links of the secondary (or sub-network are additionally established), then the management communications signals can proceed exclusively, or concurrently via these links, a regime with the potential to provide complete redundancy to protect against equipment or individual channel failure.

An important feature of the invention is the manner in which adjacent fibre channel controllers (residing within neighboring SVE devices), interact with each other, not only acting as conduit nodes for the unrestricted passage of I/O flowing from servers to storage media, but also sharing between them the storage virtualization information stored within databases on the memory chips internal to each of them. Such information, relating to management of the storage media and management of the SVE devices themselves, can be termed meta-data, describing customized configurations defined by an administrative user, including mapping and SCSI states. This characteristic is mentioned again subsequently in a comparison between various forms of architecture which may be employed in a SAN, distinguishing how DSMP Architecture differs from those existing.

Within the regime of optical signal connectivity, there are two separate fibre channel connector ports mounted on each controller board (enveloping either ports 755[i] or ports 765[i]—corresponding to either daughterboard 750 or motherboard 760 respectively), each of these itself having a terminal pair—one an incoming (RX) optical terminal, and the other an outgoing (TX) optical terminal. While such components are shown drawn by outline in FIG. 7, they are not identified by label therein, though from FIG. 5, for example, they may be recognized in order as terminal 503[i,j,in] with terminal 503[i,j,out] (both mounted upon daughterboard 750), and terminal 507[i,j,in] with terminal 507[i,j,out] (both mounted upon motherboard 760). Although the detail of these component—board relationships relates to the preceding discussion of the link paths for the embodiments presented in FIGS. 3–6, any manner of other relationships between boards and components mounted thereon could exist, which this invention also encompasses.

However, from a perspective of the fibre channel arbitrated loop (FC-AL) process, the whole controller itself is regarded as a single FC port, even though it has mounted upon it these two physical connector ports. The firmware presiding over each such controller port, further converts this port into a node, which is a necessary step in the processing of data—packetizing and transmitting via SCSI upper-layer protocol.

Thus, in describing a multi-port fibre channel controller residing within a SVE device being a critical component of a SAN employing DSMP Architecture, there is a need to be aware of this significant potential for confusion. Different elements may share the same name, dependent on the context level within the technology, making careful recital necessary from either of the two specific perspectives—logical or physical.

Within the circuitry associated with the controller (that already discussed), the hardware takes the incoming optical signal from one of these connectors accepts the electrical signal (which is the result of a conversion from the optical signal at the connector's GBIC) and can enable a direct connect re-transmission of that signal back to the outgoing terminal of the other connector port (where it is translated back into optical signal by the GBIC there). This corresponds to one of the connector ports of either controller being active, i.e., having a GBIC with FC cabling connected and signal being carried, and an associated request is made for sensing information to determine if the other connector port residing on that same controller is similarly active; if so, an internal link connection is made, as described above.

Since there is bi-directional data transmission happening at each connector port, a corresponding process to that described for signals that might be proceeding in one direction (for example, from host to storage) takes place for signals traveling in the opposing direction (e.g., from storage towards the hosts), on the same FC-AL under consideration, though involving those remaining optical terminals which have not yet been mentioned in this description here thus far, one from each of the two connector ports.

As already mentioned, decisions on the manipulation of signals are determined by the firmware instruction set held within the SVE device. This memory chip-embedded software is comprised of different role-specific software driver components, (e.g., initiator, target or central engine drivers), the combined workings of which process the data signals based upon input from several factors. Foremost is the content of certain bits of the data being transmitted—the signals are redirected according to interpretation by these firmware components of bit-wise instructions encoded into the packets at the source of the transmission (usually the host bus adapter). Another principal factor is contributed by the meta-data contained in one of several databases held in memory of each SVE device which is referenced for processing algorithms' variable input.

A major external influence upon signal handling—varied by the way in which the equipment is physically set up—is what other couplings are detected by the internal sensing mechanisms of the SVE device as existing, linking to other elements, either other devices making up the SAN framework, or hosts as well as storage equipment connected via the SAN. When there are links extending out via the connector ports mounted on the other controller—that associated with the opposing side SAN topology (often loop) of the SVE device (i.e., if the host side is the subject here, then the storage side is the opposite object)—cross links internal to the SVE device, between the different controllers lead the SVE device to behave as a kind of mini-hub.

However, this multi-port controller-governed behavior, being storage network router-based, rather than being housed in the hosts, or in the storage arrays/subsystems, affords an intelligence several degrees above that normally associated with the operation of a conventional hub. This 'geographical' factor enables the flexibility of operation which permits SAN operation not excluding any one kind of host connection, that might otherwise be observed if this management functionality were host-based instead of being distributed down stream upon storage router type devices which are part of the SAN itself. Accordingly also, there is no tying in with any one particular type of storage media, which would be attributable if such management were to be located integral to the storage equipment. It is here, in a device such as the SVE, that responsibility stems for these and many other valuable characteristics attributable to a SAN employing the DSMPA.

As mentioned previously, it is important to restate that the flexible nature of the DSMPA in accommodating host systems which have a different backbone protocol/topology from that of the storage arrays/subsystems is a powerful advantage over preceding efforts in related technology. In particular, the invention is not limited to the SVE device embodiment of FIG. 7, where only the preferred fibre channel transport layer protocol is depicted, the embodied multi-port controllers showing only boards having FC port connectors as the physical interconnect. The practicability of the DSMPA readily accommodates interface controllers supporting other protocols at the transport layer, SCSI protocol (as opposed to SCSI upper-layer protocol), and so too, the proprietary SSA protocol, being examples.

In either of these cases, one or other of motherboard 760, or daughterboard 750, has port connectors with associated internal electronic hardware (items 761–765 or 751–755, respectively) and perhaps some of main circuitry (items 770–778) re-specified, and/or re-designed, to match the physical and logical compatibility requirements for supporting the alternative protocol.

Also, particular components of the firmware prescribing how to interpret the incoming data, and how these components work together to process and re-transmit that data, are re-written accordingly for either case. Reformating of the in-band communications signals among the coupled storage router type devices themselves is correspondingly necessary also, to match the substitution of fibre channel by one of these other transport layer protocols, particularly if that substitution occurs on the storage device-side topology of a SAN employing DSMP Architecture, according to embodiments of the present invention.

Implementation of DSMPA in Network With Other SAN Components

Figure 8:
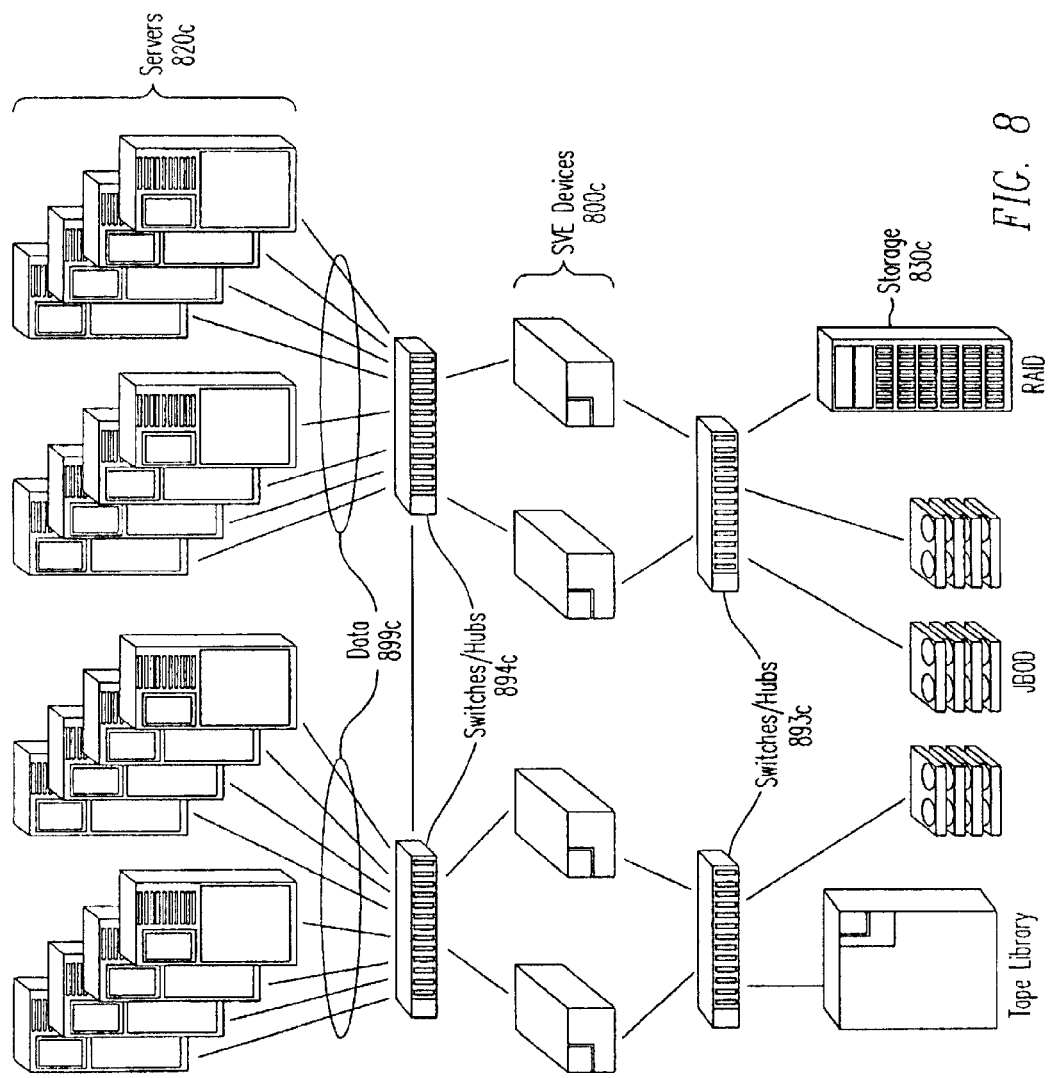
FIG. 8 is a schematic diagram which demonstrates how a DSMP Architecture may be employed in a SAN which is constructed using other components in addition to storage router devices and their links, such as switches and hubs.

FIG. 8 is a schematic diagram which demonstrates one embodiment in which a DSMP Architecture according to the present invention may be employed in a SAN which is constructed using other components, such as switches and hubs. The preferable embodiment would be involve fibre channel protocol, but any transport layer as discussed prior could be applicable.

The details of the actual connections between components are maintained non-specific. A multiplicity of host servers 820c (of heterogeneous types), in two groups are shown coupled, each group to one of a pair of switch/hub 894c units. I/O streams of data 899c flow simultaneously from these host servers 820c through link branches which provide the coupling. Each switch/hub unit is shown coupled to two SVE devices 800c. The internal circuitry of these switch/hub 894c units provides the coupling links on the host side of the SVE devices 800c, as described in prior figures, in a fashion defined as a standard part of the configuration process available when setting up such third-party proprietary equipment in a SAN. This will be a familiar process to those skilled in the art.

Similarly, each pair of SVE devices 800c is shown coupled to another switch/hub 893c unit, one corresponding to each group of host servers 820c. The internal circuitry of these switch/hub 893c units provides the coupling links on the device side of the SVE devices 800c, as described in prior figures, in a fashion defined as a standard part of the configuration process available when setting up such third-party proprietary equipment in a SAN. Again this will be a familiar process to those skilled in the art.

Switch/hub units 893c are coupled through to a variety of different (heterogeneous) storage 830c units, preferably using a similar topology and protocol as on the host side of the SVE devices 800c, though other topologies and protocols may be employed as necessary to match the protocol of particular storage equipment. The different components shown may be closely located together, or they may be physically separated from one another by distances limited only by restrictions of the link protocol/topology.

A distributed storage management platform exists, where the SVE devices 800c (storage routers) communicate with each other sharing management information, thereby providing an intelligent distributed platform of control for a SAN which is readily extensible and can have redundancy schemes flexibly employed as desired. The extent of such configurations is limited only by the multiplicity of port connectors available in the either group of switch/hub units (switch/hub 894c or 893c). Such capability is not possible with the prior art technology.

Data Management Distinction/Comparision—Different SAN Architecture Styles

Figure 9A:
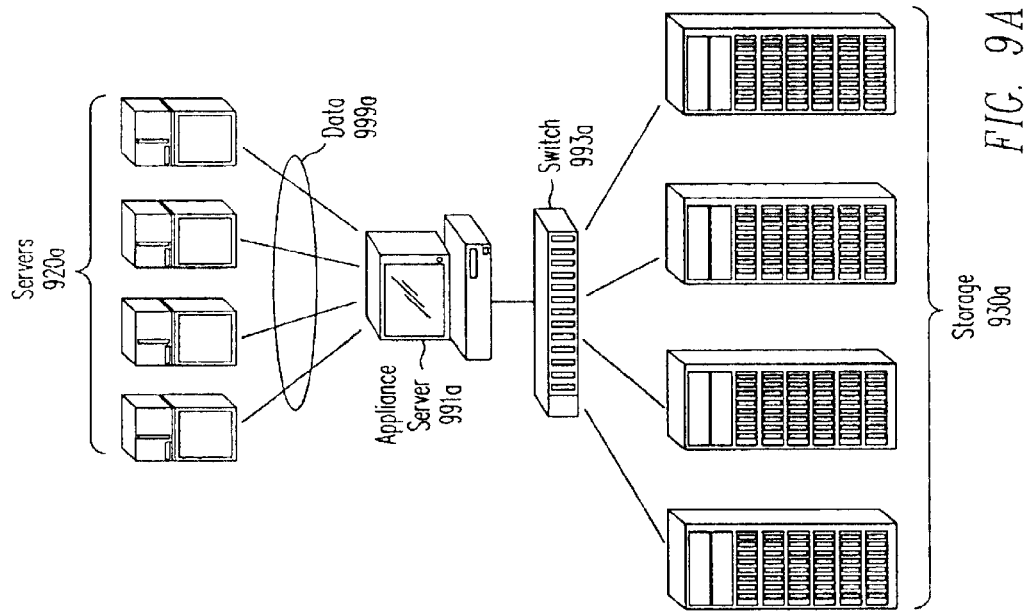
FIG. 9 is a schematic diagram illustrating a comparison between three different types of architecture which can be employed in a SAN, in such a way that their contrasting aspects are emphasized. The first two represent existing art, the third shows the DSMP Architecture.
Figure 9B:
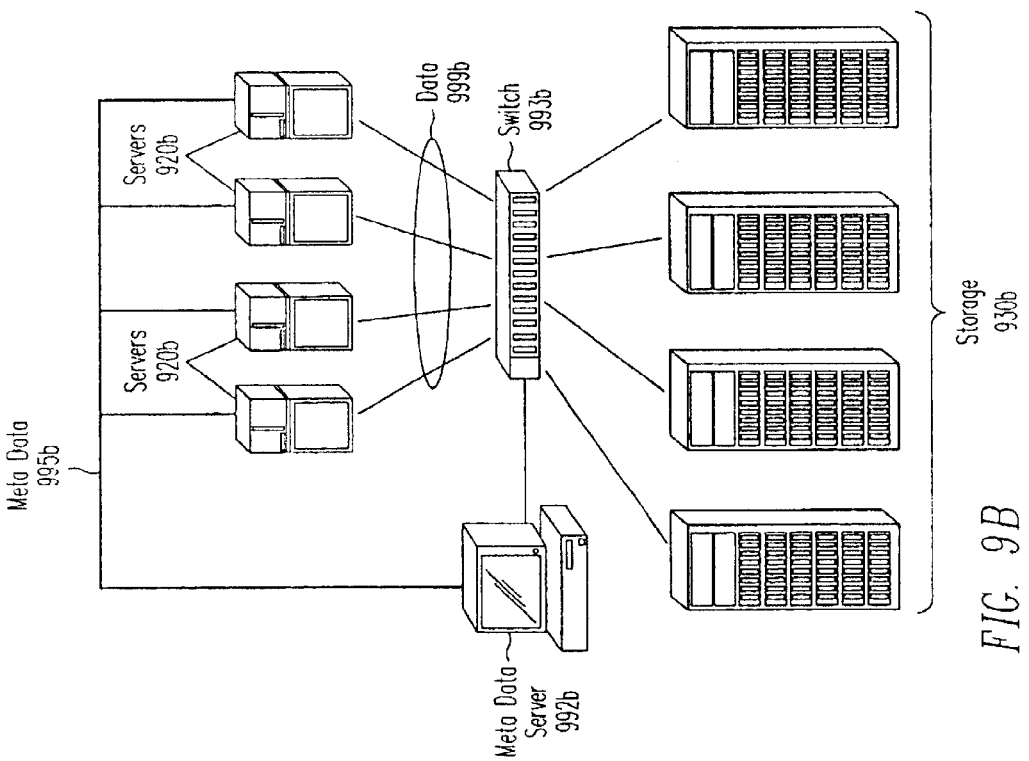

FIG. 9 is a schematic diagram which illustrates two different styles of architecture of the prior art technology which may be employed in SANs where virtualization can be employed for the management of data, these being (a), (b). Components of each are identified by a letter suffix corresponding to the architecture style; those which are common can be recognized by the same number portion of the labels. The similar format of each of the following descriptions aligns their features readily enabling comparison. Apparently subtle differences amongst them nevertheless lead to significantly different results in quantitative characteristics such as throughput performance, and qualitative behavior such as scalability.

(a) Symmetric (Appliance Server+Switch)-based centralized architecture.

There are four recognizably distinctive characteristics associated with this:

data manager functionality, which defines the storage configuration is contained in a software module which resides in a dedicated appliance server 991a, located directly in the data 999a flow path;

data director functionality, which determines the mapping is a different module also residing on dedicated appliance server 991a, usually as a part of the software driving an input/output controller, working beneath the data manager;

a symmetry, which refers to fact that both data I/O and control signals are transmitted via this same central path from servers 920a connected through to storage 930a;

a switch 993a distributes the connectivity of the data 999a flow path.

(b) Asymmetric (Appliance Server+Switch)-based architecture.

There are four recognizably distinctive characteristics associated with this:

data manager functionality, conveyed in terms of meta data 995b, defining the storage configuration and contained in a software module, which resides in the dedicated meta data server 992b, located off the data 999b flow path;

data director functionality, which determines the mapping is a different module residing separately on each of the host data servers, usually as a part of the software driving each of the input/output controllers, working in response to the remote data manager;

an asymmetry, which refers to fact that data 999b I/Os are transmitted via the centrally located switch hardware, whilst the control signals are transmitted over a separate offset path, from servers 920b connected through to storage 930b;

a switch 993b distributes the connectivity of the data 999b flow path.

The DSMPA invention describes a third different kind of storage network-based architecture for management of data in a SAN incorporating virtualization—that of Symmetric (Router Appliance)-based distributed architecture. There are four identifiably distinctive characteristics associated with the DSMP Architecture to which can be attributed its advantages over the previous two architecture styles, particularly with regards to performance and scalability. Contrasts can be drawn with reference again to FIG. 8:

data manager functionality, which defines the storage configuration is contained in a firmware module which resides in each of multiple SVE devices 800c, located directly in the data 899c path;

data director functionality, which determines the mapping is a different module also residing in each of multiple SVE devices 800c, located directly in the data 899c flow path;

a symmetry, which refers to fact that both data I/O and control signals are transmitted via this same path, from servers 820c through to storage 830c, but rather than being centralized in one unit, this functionality is distributed amongst the set of SVE devices 800c;

groups of switches 893c and switches/hubs 894c play no role in the context of virtualization—again they merely physically distribute the connectivity.

Detailed Description of Operation

An individual storage router device employed in the present invention, can be technically categorized by its most rudimentary function, that of a one-to-one layer-3 switch, performing a network layer conversion between storage protocols such as small-computer systems interface (SCSI), fibre channel (FC), Serial Storage Architecture (SSA) and the like. A group of such storage routers in the same domain can be configured to collaborate as a Distributed Storage Management Platform (DSMP). Logically, a DSMP can be conceptualized as a multi-port layer-4 enterprise storage switch.

Operation of an Example SAN Employing a DSMP Architecture

DSMP Architecture can be readily employed in a SAN configured in a FC loop topology. The remaining sections of this document describe the firmware-related mechanisms that support such a preferred embodiment, facilitating the vital communications that take place between storage routers, each housing dual-port FC controllers.

In such an architecture, the firmware of an individual router is divided into three major functional blocks: target driver, router engine, and initiator driver. Typically, in such an architecture, initiator and target drivers are qualified as either being related to the host-side or the device-side (e.g., a "device-side initiator driver"). Preferably, initiator functionality is provided on the host-side interface for most, if not all, interface types. Also preferably, target functionality is provided on the device-side interface in support of router-to-router communications (e.g., an SSA initiator driver).

It will be noted that the following discussion is, in part, dedicated to defining interfaces between a router engine and each of the four hardware interface drivers. Unlike interfaces defined largely in terms of queues, interfaces in a DSMP Architecture according to embodiments of the present invention are defined primarily in terms of function calls. While a similar number of queues with the same (or similar) functions typically still exist in such an architecture, the queues are local to a single functional block rather than serving as the formal block-to-block interface mechanism. In fact, in some cases, a function serving the function of a queue-based interface mechanism simply places its parameters into a queue. In addition to functions, simple state variables are also part of the formal interface mechanism. State variables are used in situations where they improve efficiency (as compared to a function call) without significantly compromising the structure of the interface. It will be noted that inter-block communication preferably occurs during background (non-ISR) processing, which helps to prevent race conditions. Alternatively, interrupts may be enabled only during "safe" windows between background tasks.

Fundamentals of Driver Interactions

Direct communication between a device-side driver and a host-side driver is typically prohibited. Any such communications should be indirect (e.g., via a service provided by the given router engine). Preferably, however, an initiator and target driver on the same side (which are sharing the same physical interface hardware) are able to communicate directly, at least for the efficiency engendered by such an arrangement. Moreover, because a router with a particular type of interface hardware on one side typically includes the same target and initiator drivers for that interface, these two drivers can be considered as a single, combined driver. Also, the nature of the direct interaction between the two same-side drivers depends on the characteristics of the specific interface and interface controller being shared.

It will be noted that the provision of two initiator/target drivers (device-side and host-side) with symmetrical requirements and interfaces to the router engine allows the sharing of significant amounts of source code, and in some cases, even executable code.

A single SCSI command received by the host-side target driver may result in zero, one or more than one SCSI commands being issued by one or both of the initiator drivers. Each interface driver has an array of input/output (I/O) Control Block (IOCB) structures which are used to manage individual SCSI I/O processes. These IOCB structures are, functionally, local to the driver in question and contain information that is relevant to that driver. In fact, such IOCBs preferably contain only such information.

The driver chooses which element of the driver's array of IOCB structures to assign to a particular SCSI command. This selection is based on considerations that are private to the driver. Typically, no attempt is made to cause IOCB indices assigned by the initiator driver to be related to the IOCB indices assigned by the target driver. Preferably, the IOCB indices assigned by the target driver are not related in any way to the IOCB indices assigned by the initiator driver. This is true even in a simple drive situation where the SCSI command being sent by an initiator driver is the direct result of a SCSI command received by a target driver. Only the router engine is aware of this cause-and-effect relationship, and it is responsible for maintaining the logical link between the two (or more) SCSI commands.

Every SCSI command that is received by a target driver and successfully passed to the router engine for execution causes the router engine to allocate a router engine IOCB (i.e., the router engine's own IOCB structure). As with initiator and target driver IOCBs, router engine IOCBs are functionally local to the router engine and contain only information that is relevant to the router engine.

The router engine selects which element of the router engine's array of IOCB structures to assign to a particular received command. This selection made by the router engine is based on considerations which are private to the router engine. The function used to pass SCSI commands from a target driver to the router engine passes the target driver's IOCB index to the router engine as a function argument. The router engine's IOCB index is passed to the target driver as a returned parameter of the same function call. The router engine stores the index of the target driver's corresponding IOCB in the router engine's IOCB. The target driver also stores the index of the router engine's corresponding IOCB in the target driver's IOCB.

Each block, when initiating any further communication with the other regarding this received SCSI command, references the other block's IOCB index. In the same way, the router engine and an initiator driver exchanges IOCB indexes when the router engine calls the interface function that requests the initiator driver to send a SCSI or vendor unique protocol (VUP) command. Each of these blocks then references the other's IOCB index when initiating further communication regarding this initiated command.

Storage routers, according to embodiments of the present invention, and their attached target devices, must look to host computers like simple, well-behaved target devices. In particular, this includes a requirement that command reordering which would violate 'restricted queue reordering' rules must not be permitted to occur. In practice this means that such routers should not change the order of commands, since the overhead to recognize when reordering restrictions would be violated can be prohibitive.

Normal Operation—Router Engine

The actions disclosed herein are carried out based upon instructions which are embodied in the structure of circuitry that implements such functionality, such as the micro-code of firmware programmed into programmable or erasable/programmable devices, the configuration of a field-programmable gate array (FPGA), the design of a gate array or full-custom application-specific integrated circuit (ASIC), or the like, perhaps involving nonvolatile memory storage memory including semiconductor-based memory units such as FLASH memory, EEPROM, EPROM, ROM or application specific integrated circuits; volatile storage media including registers, buffers or caches, main memory, RAM, and so on.

The following is a description of a router engine structure that can be used in a DSMP Architecture according to embodiments of the present invention. Also described are examples that demonstrate the operation of such an architecture. Such a router engine structure solves reordering prevention problems, and also supports arbitrary layering of complex drive structures.

Arbitrary layering of complex drive structures can best be defined using an example in which a write is performed on a complex drive (consisting of a two-way mirror between a simple, local drive and a remote copy drive). In certain scenarios, a further complication can exist: the buffer drive for the remote copy drive itself can be a two-way mirror of simple, local drives. This complex drive can be described as having a first layer of mirror structure, a second layer of remote copy structure, and a third layer of mirror structure. This is an example of an arbitrary layering of complex drive structures.

IOCB Allocation Example: 2 Way Mirror: Local & Remote Copy Drive

The example given here can be used to illustrate the router engine structure introduced above. When a target driver receives a write command to this complex drive, the target driver allocates an IOCB ($T_1$). The target driver calls a function to inform the router engine of the received command. This causes the router engine to allocate an IOCB ($R_1$), and place IOCB $R_1$ into the level one command FIFO. It will be noted that, in this example, $T_1$ and IOCB $R_1$ are cross-linked.

Eventually, a router engine background task removes IOCB $R_1$ from the level one FIFO, analyzes IOCB $R_1$, and determines that IOCB $R_1$ is a write to a two-way mirror. IOCBs $R_2$ and $R_3$ are allocated, logically linked to IOCB $R_1$, and placed in the level two FIFO. IOCBs $R_2$ and $R_3$ each control the write operation for one logical drive of the two-way mirror. Suppose, for purposes of this discussion, that IOCB $R_2$ corresponds to the simple drive, and IOCB $R_3$ to the remote copy drive.

A router engine background task eventually removes IOCB $R_2$ from the level two FIFO, analyzes IOCB $R_2$, and determines that IOCB $R_2$ is a write to a simple drive. The router engine calls a function to request an initiator driver to send a write command. This causes the initiator driver to allocate IOCB $I_1$. It will be noted that, in this example, IOCBs $R_2$ and $I_1$ are cross-linked.

When the initiator driver determines that the SCSI command controlled by IOCB $I_1$ is complete, the initiator driver frees IOCB $I_1$ and returns status for IOCB $R_2$ to the router engine. The router engine determines that IOCB $R_2$ is a spawned child process of IOCB $R_1$, notes the successful completion of IOCB $R_2$ in IOCB $R_1$ (IOCBs for writes to mirror groups can include fields for such information), and frees IOCB $R_2$. The router engine determines that IOCB $R_1$ is still waiting on the completion of IOCB $R_3$, so no further action occurs as a result of the completion of IOCB $R_2$'s.

In parallel with the processing of IOCB $R_2$ (and IOCB $I_1$), the router engine background task removes IOCB $R_3$ from the level two FIFO, analyzes IOCB $R_3$, and determines that IOCB $R_3$ is a write to a remote copy drive. IOCB $R_4$ is allocated, logically linked to IOCB $R_3$, and placed in the level three FIFO. IOCB $R_4$ controls the VUP handshake with the remote copy management process to obtain permission to write to the remote copy buffer.

Eventually, a router engine background task removes IOCB $R_4$ from the level three FIFO, analyzes IOCB $R_4$, and determines that IOCB $R_4$ is a remote copy write permission request. The router engine calls a function to request an initiator driver to send this VUP message, which causes the initiator driver to allocate IOCB $I_2$. When the initiator driver receives a response from the remote copy management process, the initiator driver frees IOCB $I_2$ and returns status for IOCB $R_4$ to the router engine. The router engine determines that IOCB $R_4$ was a spawned child process of IOCB $R_3$, notes the successful completion of IOCB $R_4$ in IOCB $R_3$, and frees IOCB $R_4$.

The router engine then determines that IOCB $R_3$ is to write to the remote copy buffer. IOCB $R_5$ is allocated to perform this function and placed in the level three FIFO. Eventually, IOCB $R_5$ is removed from the level three FIFO and determined to be a write to a two-way mirror. IOCBs $R_6$ and $R_7$ are allocated, linked to IOCB $R_5$, and placed in the level four FIFO. When IOCBs $R_6$ and $R_7$ have completed successfully and been freed, IOCB $R_5$ is determined to have completed successfully and is also freed.

Further processing of IOCB $R_3$ continues with the allocation of IOCB $R_8$, which manages the sharing of remote copy buffer pointer information with other routers on the backbone. IOCB $R_8$ is placed in the level three FIFO. When IOCB $R_8$ is processed, an additional IOCB is allocated for each router to be notified. These IOCBs are placed in the level four FIFO. When these IOCBs have completed successfully and been freed, IOCB $R_8$ is determined to have completed successfully and is freed as well.

Further processing of IOCB $R_3$ continues with the allocation of an IOCB to manage reporting to the remote copy management process that the write to the remote copy buffer is complete. Upon successful completion of this operation, IOCB $R_3$ is determined to be complete and is freed. This causes IOCB $R_1$ to be complete and it is freed.

Upon the completion of IOCB $R_1$ the router engine calls the target driver to report completion status for $T_1$. After reporting status to the host computer (or the upstream router), the target driver frees $T_1$.

IOCB Manipulation Through FIFO Levels

It will be noted that, in one embodiment, with regard to IOCB processing that requires the spawning of one or more child processes, the spawned IOCBs use a FIFO one level higher than that used by their parent IOCB. Multiple FIFOs are employed in order to allow the reordering of commands. If command reordering is not required, however, a single FIFO can be used in a recursive fashion. Most command ordering issues are, in fact, addressed by giving higher precedence to the processing of IOCBs from higher-level FIFOs than that given to lower-level FIFOs. The ability to process any type of IOCB, out of any level of FIFO supports arbitrary layering of complex drive functions. The number of layers of processing that can be managed is a function of the number of router engine FIFOs defined. An additional benefit of this structure is that such a structure creates natural processing boundaries, which ensures that background processing in the router engine does not require excessive CPU time. Preferably, each router engine background process instance is responsible for the removal of an IOCB from a FIFO and processing of that IOCB, at most.

Each I/O type process that is distinguishable by a router engine should be a different type of IOCB. Preferably, IOCBs are defined as a union of structures, with one type of structure for each type of IOCB. The IOCB type with the largest storage requirement dictates the size of the union. This applies for target driver and initiator driver IOCBs as well, although a significantly smaller number of different IOCB types is typical.

While any one of a variety of programming techniques can be used to implement the router engine's IOCB FIFOs, a singly linked list structure is preferable because such a structure has approximately the same CPU bandwidth requirements as a ring buffer structure, and much less RAM overhead. This is because each IOCB can be in at most one of a relatively large number of different FIFOs at any given moment, so the same linkage pointers can be shared by the other the FIFOs.

Preferably, IOCBs not currently in use are managed by storing those IOCBs in a FIFO. Storage of unused IOCBs in a FIFO is preferred, at least in part, because of such a technique's advantages over "pool" type methods. These advantages include:

1. Fixed rather than variable time to find a free IOCB to allocate
2. The order in which IOCBs are freed following their last usage is preserved while they are waiting to be reused
3. The time between freeing an IOCB and reusing it is maximized The latter two of these advantages have no benefit for normal operation, but can be very helpful when analyzing a serial port or hardware interface trace, or the state of a router following halting due to an error.

When a call is made to an initiator driver requesting that the initiator driver send a command, an IOCB should be allocated and placed into a queue of pending commands to be actually sent by the initiator driver at the next appropriate time. One reason for this queue is to have a way to deal with the initiator driver being in a state (such as SSA web walk) where it is temporarily unable to issue commands.

Maintaining Restricted Re-Ordering Through Blocking

Certain special cases can require additional logic to avoid violating restricted reordering rules. These special cases involve accesses to logical drives that are performed using a series of sequential operations. An example is a read, followed by a write to a composite drive that spans a physical drive boundary. Another example is a long read that is broken into two (or more) smaller reads (i.e., multiple read commands are used to perform the requisite reading of data). The potential problem is that other commands can be sent to the drive in question between the two original commands. In other words, the combination of operations is not atomic. Thus, it is preferable to provide some protective blocking mechanism in order to make such combination operations atomic.

An example set of rules detailing the manner in which a router engine processes IOCBs from its FIFOs are as follows:

1. An IOCB in a FIFO is blocked if the logical drive to which the IOCB is directed is blocked and the blocking IOCB is not the parent of the IOCB in question. (this rule can be extended to include older ancestors (grandparents, great-grandparents and so on))
2. Blocked IOCBs in a FIFO have no priority and are effectively invisible until the blocking condition is cleared.
3. Within a given FIFO level (e.g., FIFO level N), unblocked IOCBs closer to the "front" of the FIFO have priority over unblocked IOCBs closer to the "end" of the FIFO.
4. Every unblocked IOCB in a given FIFO level (e.g., FIFO level N) has priority over every unblocked IOCB in the FIFO level below (e.g., FIFO level N-1).
5. Of the IOCBs in the various FIFO levels, only the unblocked IOCB with the highest priority may be removed for the purpose of normal (non-exception) processing.

Once an IOCB has been removed from a router engine FIFO and identified as a type of process that requires protective blocking, an entry is made in the database for the logical drive to which the IOCB is directed. The entry indicates that the logical drive is blocked by that specific IOCB. The blocking entry in the logical drive's database is cleared upon return of the blocking IOCB to the free IOCB FIFO. It will be noted that nested protected processes are possible (for example, one half of a spanning read to a composite drive is itself a very long read). However, no additional logic is required to handle such cases.

Target Driver Role In IOCB Manipulation

When a SCSI command is received by a target driver, the target driver allocates an IOCB and then calls the router engine to inform the router engine of the new command. Parameters passed to the router engine can include, for example, the target driver's IOCB number, the target device number, the initiator number, the type of queue tag, the Command Descriptor Block (CDB; a SCSI command format) and other such information. The router engine parses the command, typically before returning. This is because the router engine is responsible for providing the command type (read/write/no-data), the expected transfer length, the router engine's IOCB number and other such information as returned parameters.

In the case of a read-type command, a target driver typically performs no further actions until the router engine calls a function that passes read data to the target driver. The parameters of this function can include, for example, the target driver's IOCB number, the buffer block number, the amount of valid read data in the buffer block and other such information. For read commands, whether or how the target driver uses the expected transfer length information depends on the specific characteristics of the hardware interface protocol. At some point, the router engine calls a function requesting that the target driver deliver status to the host. The parameters of this function can include, for example, the target driver's IOCB number, the status information (including sense data in the case of Check Condition status) and other such information.

No-data-type commands are normally treated as read commands with zero bytes of expected transfer length. In fact, not identifying such commands as a separate type of command from read commands can be simpler and more efficient than identifying such commands separately.

In the case of a write-type command, a target driver periodically calls a function requesting that the router engine of the storage router allocate a buffer block into which write data can be placed. Parameters of this function can include, for example, router engine's IOCB number and the target driver's IOCB number for the given command, among others. With regard to the router engine's IOCB number for the command, the router engine's IOCB number is recorded in the master owner field of the buffer block control structure. With regard to the target driver's IOCB number for the command, the target driver's IOCB number is recorded in the current owner field of the buffer block control structure. The returned parameter is the buffer block index when a buffer is allocated, or some reserved index if no buffer is allocated (e.g., 0xFFFF).

While there is no specification for a minimum time interval between a rejected request and a repetition of the request, it is preferable that this function be optimized. For example, a busy router should not spend a large portion of its CPU bandwidth deciding to refuse requests for write data buffers. The target driver is responsible for maintaining information describing when sufficient buffers have been allocated to hold the expected data, and then ceasing to make further requests.

Router Engine Role In IOCB Manipulation

The router engine is given responsibility for write data buffer allocation because the router engine typically has access to the greatest amount of information and is therefore in a position to make the best-informed decisions on this issue, which is important to maintaining acceptable performance. As buffer blocks are filled, the target driver passes the buffer blocks to the router engine. The parameters of this function can include, for example, the target driver's IOCB number, the buffer block index, the amount of valid data in the buffer block, and other such information. It will be noted that, except for the last buffer block, the buffer blocks should be filled to capacity. At some point, the router engine calls the function requesting the target driver to deliver status to the host. The parameters of this function were described final previously. Normally, status is not reported before the expected write data has been transferred in its entirety. However, the target driver is preferably capable of handling such information at any time.

Initiator Driver Role In IOCB Manipulation

Initiator drivers, due to differences in their hardware interfaces, can have different requirements regarding the point in the command initiation process at which full or empty buffers are required. For example, one implementation requires that the buffers for a read-type command be allocated prior to the point in time the command is sent. SSA and parallel SCSI initiator drivers can allocate read buffers on an as-needed basis. One example of a parallel SCSI initiator driver can experience significant performance problems as a result of not having all write data available at the time such an initiator driver issues a write-type command. SSA or fibre channel typically do not suffer from this sort of infirmity. This problem is ameliorated to some extent by the use of direct communication with the target driver in informing the driver as to which of the driver's I/O processes should be given highest priority. As previously noted, this type of direct coupling of initiator and target drivers is eschewed in a DSMP Architecture according to embodiments of the present invention. For parallel SCSI initiator drivers, a good solution is to have the write data in memory before issuing a write-type command. This sort of variation in initiator driver behavior need not be visible to the router engine. A fibre channel initiator driver in such an architecture, for example, can accept a read command request from the router engine and hold the request pending (unsent) until the driver has successfully obtained the necessary buffers.

The requirement that an initiator driver allocate all read buffers or obtain all write data prior to sending a command implies that very long commands must be broken into two or more smaller ones. While a router engine according to the present invention can be configured to gather information regarding the size of the command and whether it should be divided, it is simpler if the router engine always breaks very long commands. The appropriate lengths at which to break commands should be chosen to optimize performance.

Requests to send SCSI commands are passed from the router engine to an initiator driver using a family of functions. The selection of the specific function used depends on the type of SCSI command being sent (read, write, or no data). SCSI command sending functions have in common that the router engine's IOCB number, the initiator device number, and the CDB are passed to the initiator driver as parameters. For read- and write-type commands, the expected transfer length is an additional parameter. The initiator driver's IOCB number is also returned to the router engine by the given function.

Buffer Allocation Dependent on Command Data Type

For no-data-type commands, the router engine does nothing further until the initiator driver calls a function passing completion status to the router engine. The parameters of this function are, for example, the router engine's IOCB number and the status information (including sense data in the case of Check Condition status).

For read-type commands, as the initiator driver determines the need for buffers to receive read data, the initiator driver calls a function requesting the router engine to allocate these buffers. The parameters of this function are, for example, the router engine's IOCB number for the command, the initiator driver's IOCB number for the command, and the number of buffer blocks desired. The router engine determines whether the requested buffers are available, and if so, whether the router engine wishes to allocate the requested buffers for this purpose, at this time. If the router engine allocates the buffer(s), the return parameter of the function is the buffer block index of the first buffer allocated. Any additional buffers allocated are linked to this one as a singly-linked list. Otherwise, the router engine returns a specific reserved buffer block index (e.g., 0xFFFF) as a flag to indicate that no buffers have been allocated.

Preferably, the router engine either allocates all of the requested buffers, or none. This is so that initiator drivers which require all of the read buffers prior to issuing the command are not left holding only part of the required buffer space. (This would serve no purpose, while depleting the buffer pool needed for other processes.) Drivers desiring more than one buffer, but which can proceed with only one, preferably make a series of requests for one buffer at a time. There is no specification for a minimum time interval between a rejected request and a repetition of the request, so it is important that this function be carefully optimized.

The router engine's IOCB number is recorded in the buffer block control structure as the master owner, while the initiator driver's IOCB is recorded as the current owner. The router engine is given responsibility for read data buffer allocation because the router engine has access to the most information and is therefore in a position to make the best-informed decisions on this performance-critical issue. As buffer blocks are filled, the initiator driver passes them to the router engine. The parameters of this function are, for example, the router engine's IOCB number, the buffer block index, and the amount of valid data in the buffer block. It will be noted that, except for the last buffer block, the buffer blocks should be filled to capacity.

At some point, the initiator driver calls the function reporting completion status to the router engine. The parameters of this function are the same parameters described above. Normally, status is not reported before the expected read data has been completely transferred. However, the router engine must be able to handle the need for status information at any time.

For write-type commands, as each buffer of write data becomes available to the router engine, a function is called to pass the buffer to the initiator driver. The parameters of this function are, for example, the initiator driver's IOCB number, the buffer block index, and the amount of valid data in the buffer block. At some point following passing of the last buffer block, the initiator driver calls a function reporting completion status to the router engine. The parameters of this function are described above. The initiator driver receiving status from the target device prior to delivering all of the write data is an exception condition that requires a complex recovery procedure, a detailed description of which appears below.

The manner in which the router engine manages buffer blocks of write data that are received from a target driver is now described. In the case of a mirror group, "shadow buffers" of the original buffer are created so that the same data can be sent, in parallel, to two or more drives without the need to physically copy the data. In the case of a composite drive, the data in the buffer block may span a physical drive boundary, requiring that part be sent to one drive, and part to another. These and other issues lead to the need for a FIFO in which the router engine stores write buffers that are received from the target driver.

A router engine background task is responsible for servicing this FIFO. Stated simply, such a router engine background task is tasked with taking a buffer from the FIFO, identifying which initiator driver and IOCB to which the data belongs, and passing the data to that initiator driver along with the initiator driver's IOCB number. Complexity can be encountered in the cases where the router engine IOCB number with which the buffer is tagged points to a complex drive, and the IOCB has spawned one or more child processes. As a general rule, the IOCB number of the child process that needs the data is identified, and after changing the ownership to that IOCB, the buffer is returned to the end of the same FIFO to be processed again. The details of this transaction can vary considerably depending on the type and state of the complex drive, as the examples below illustrate.

Different Buffer FIFO Manipulations—Illustrated By Case

A first case requires repeated use of the write buffer FIFO. A non-spanning write to a composite drive requires the use of two router engine IOCBs. IOCB $R_1$ is created first and is directed at the composite drive. IOCB $R_1$ spawns a child IOCB, IOCB $R_2$, that is directed at the appropriate simple drive member of the composite drive and an adjusted LBA. When the buffer is first removed from the FIFO, that buffer belongs to IOCB $R_1$, which is directed at a complex drive. Analysis of IOCB $R_1$ results in the conclusion that the ownership of the buffer needs to be changed to IOCB $R_2$. After this is done, processing of the buffer could simply continue under the ownership of the new IOCB. However, any time a buffer block is allocated from the free FIFO or has experienced a change of ownership, the buffer block is preferably passed through the write buffer FIFO. The buffer block is therefore returned to the end of the FIFO. In due course, the buffer is removed from the FIFO again, seen to belong to IOCB $R_2$ (which is directed at a simple drive), and passed to an initiator driver.

Another case is that of a mirror made up of two simple drives. The original IOCB, IOCB $R_1$ (which is directed at the mirror group) has spawned two child IOCBs, IOCBs $R_2$ and $R_3$, each of which is directed at a simple drive. The original buffer block is converted into a two member shadow buffer set. One shadow buffer is tagged as belonging to IOCB $R_2$ and the other to IOCB $R_3$, and both are placed at the end of the FIFO. Nothing further is done with the original buffer block until the original buffer block is freed. In due course, both of these shadow buffer blocks are removed from the FIFO, seen to belong to IOCBs directed at simple drives, and passed to an initiator driver.

Yet another case is a spanning write to a composite drive where the span point happens to fall in the middle of a buffer block:

The original IOCB, IOCB $R_1$ (which is directed at the composite drive) has spawned one child IOCB, IOCB $R_2$, which is directed at the appropriate simple drive member of the composite drive to receive the first part of the spanning write. Once IOCB $R_2$ has completed, IOCB $R_1$ spawns IOCB $R_3$ to perform the second half of the spanning write. However, this will not have occurred yet. When the buffer is removed from the FIFO and IOCB $R_1$ is analyzed, it is determined that the first part of the buffer needs to belong to IOCB $R_2$, and that the owner of the second part does not exist yet.

A second buffer block is obtained from the free FIFO, and the second part of the original data is physically copied into the front of the new buffer. The count of valid data in the original buffer is reduced, the owner changed to IOCB $R_2$, and the buffer returned to the end of the FIFO. The count of valid data in the new buffer is initialized to the appropriate value, ownership is assigned to IOCB $R_1$, and this buffer is placed at the front of the FIFO. The state of IOCB $R_1$ is updated to indicate that further buffers belonging to IOCB $R_1$ may not be removed from the FIFO until IOCB $R_2$ completes and IOCB $R_3$ is spawned. Having the blocked buffer for IOCB $R_1$ at the front of the FIFO does not prevent other unblocked buffers in the FIFO from being processed.

In due course, the modified buffer for IOCB $R_2$ is removed from the FIFO and seen to belong to IOCB $R_2$. Since IOCB $R_2$ is directed to a simple drive the buffer is passed to an initiator driver. IOCB $R_2$ eventually completes and reports its completion to IOCB $R_1$. IOCB $R_1$ spawns IOCB $R_3$ and changes the state information such that buffers belonging to IOCB $R_1$ are no longer blocked. The buffer belonging to IOCB $R_1$ at the front of the FIFO can now be processed as well as any others in the FIFO that belong to IOCB $R_1$. Analysis of IOCB $R_1$ now shows that its buffers should be redirected to IOCB $R_3$, a simple drive, and after one more pass through the FIFO they are sent to an initiator driver.

This scenario is simplified slightly in the event that the span point happens to fall exactly at the end of a buffer block. No new buffer needs to be obtained from the free FIFO, have data transferred, and be returned to the front of the write buffer FIFO. The size of the original buffer does not need to be adjusted. However, processing of additional buffers for IOCB $R_1$ must still be blocked until IOCB $R_2$ completes and IOCB $R_3$ is spawned.

A standard set of tag type codes is preferably mandated, and communications between a router engine and an interface driver should employ these codes. If a particular interface standard uses a different set of code values, the driver is responsible for performing a translation between the standard codes and the different codes. Although the various SCSI interface standards employ the same set of status code values, the same principle applies in that situation as well.

Exception Handling

Significance of Exception/Error Handling

Management of Check Condition status is an important function. Reporting of Check Condition status and management of the subsequent Contingent Allegiance (CA) or Auto Contingent Allegiance (ACA) condition (if any) has been implemented as a cooperative effort between the target driver and the interface logic block. It is not necessary nor appropriate for the router engine to determine whether a target driver's SCSI implementation uses Contingent Allegiance, ACA, auto-sense reporting, or other mechanism. Thus, a target driver should be made sufficiently intelligent to manage this issue on its own.

Target Driver Error Handling Intelligence

Auto-sense reporting methods can be used between router logic blocks to transfer sense data with Check Condition status as a single object. Sense data can, in certain embodiments, be viewed simply as extended status information.

Check condition status is not typically passed from an initiator driver to the router engine, nor from the router engine to a target driver, without also passing the associated sense data as a further parameter of the same function. Sense data can be stored, for example, in a global array of buffers, with the array index being passed along with the SCSI status byte. In certain embodiments of a DSMP Architecture according to the present invention, commonly used sense data values are enumerated such that there at least two methods available for storing sense data—either in a buffer or as an encoded value. Although this method works, the use of sense data buffers is preferable, unless the RAM requirements of such an approach become prohibitive.

Initiator drivers are responsible for performing the necessary actions following receipt of a Check Condition status to obtain the associated sense data from the target device. In addition, the initiator driver is tasked with preparing the device to receive new commands (e.g., clear ACA). It is also the initiator driver's responsibility to determine whether any other SCSI commands were aborted due to the Check Condition status (QERR=1), and either retry the aborted SCSI commands or explicitly report the aborted SCSI commands to the router engine as aborted commands, if so. It is also the router engine's responsibility (while querying and configuring a device following its discovery) to determine the state of the router engine's QERR bit and to set the QERR bit to zero, if possible. The initiator driver is typically ignorant of this activity (even though the initiator driver is used by the router engine to send the Mode Sense and Mode Select commands) and so requests the state of a device's QERR bit from the router engine, when required. The router engine provides a function whose parameter is the initiator device number, and whose returned parameter is the state of that device's QERR bit.

Target drivers are responsible for managing the reporting of Check Condition status and its associated sense data using the given SCSI protocol used by the SCSI interface involved. This includes holding off the progress of any SCSI commands that should be blocked due to outstanding Contingent Allegiance or ACA conditions. Request Sense commands are typically not forwarded to the router engine. If the target driver has no saved sense data (or a Unit Attention condition) for the nexus, then the target driver returns "no sense".

Pending Unit Attention conditions are managed by the target driver without assistance from the router engine. Thus, a non-Inquiry command for a nexus with a Unit Attention condition reports Check Condition status to the host without sending the command to the router engine. In some cases (e.g., mode parameters changed), the router engine is responsible for notifying a target driver as to what Unit Attention conditions exist for which nexuses. This can be performed, for example, via a function call, from the router engine to the target driver, having three parameters:

1. a scalar code for the type of Unit Attention condition to be reported;
2. the target device number of the affected nexus; and
3. the initiator number of the affected nexus.

In most cases the router engine needs to make a series of such calls, creating Unit Attention conditions for multiple nexuses. In many cases, however, a target driver makes entries into its Unit Attention table on its own initiative (without benefit of a call from the router engine). In architectures not employing a queuing system, a priority ranking of Unit Attention conditions is defined, in order to prevent higher priority conditions from being overwritten by lower priority occurring thereafter.

Enough RAM should be allocated to IOCBs such that all available IOCBs are not consumed. However, in the event that such a situation occurs, a recovery strategy is required. If a target driver is unable to allocate an IOCB for a command, the target driver should respond with a "queue full" status. Queue full is also appropriate in the event that the router engine refuses to accept a CDB from the target driver. In all other cases, the inability to allocate an IOCB should cause a Check Condition status (aborted command sense data) to be reported upstream. The reservation of a separate set of router engine IOCBs for use by certain critical, internally generated processes can also be employed.

Initiator Driver Pro-Active Error Handling

SCSI commands rejected by a target device with a busy or queue full status are preferably retried by the initiator driver after an appropriate delay. This should occur without the assistance or knowledge of the router engine. Each initiator driver should also implement an algorithm to prevent its target devices from experiencing frequent queue full conditions.

A number of situations existing in which an initiator driver becomes aware that a SCSI command, issued by the initiator driver, has been aborted in the target device in response to something other than the initiator driver's explicit request. Examples include an SSA web walk, and a Check Condition status from a device whose QERR bit is 1. In the event that such an aborted command is a no-data-type command, or is a read- or write-type command but no data has yet been transferred, the initiator driver re-sends the command without the assistance or knowledge of the router engine. If more than one command needs to be re-sent to the same device, the original order is preserved. This implies that commands, as they are sent by an initiator driver, are moved from the queue of pending commands to one of outstanding commands.

If the command can not be retried by the initiator driver in a transparent manner, then the command must be reported to the router engine as having been aborted. The appropriate mechanism for doing this is to report Check Condition status with "aborted command, no additional sense information" sense data. In the event that the command is a write-type command and not all of the write data has been delivered, this must also be treated as an "early write status" exception case (see below).

When an initiator driver receives status for a write-type command before it has completed the transfer of the expected amount of write data, an "early write status" exception has occurred. If the case is that an early write status is never a "good" status, and that busy/queue full status always occurs before any write data has been transferred, improved efficiency of initiator drivers results.

Otherwise, checks must be made in initiator drivers to detect any early write status case which is not a Check Condition or a transparently retry-able busy/queue full status. Any such case detected is treated as though the status had been Check Condition with aborted command sense data.

Early Write Status Exception Handling

An example of the actions performed in recovering from an early write status exception appear below:

1. Any buffers of write data belonging to the early write status command which are being held by the initiator driver are freed.
2. Check Condition status (with sense data) are reported to the router engine. (As noted above, even if Check Condition was not received from the device, Check Condition is reported.)
3. Whenever a router engine write-type process completes unsuccessfully, the router engine scans its write buffer FIFO for any left-over buffers belonging to that IOCB. Any that are found are freed.
4. A target driver that receives Check Condition status from the router engine for a write-type command checks for early write status (and handles any thus identified). Any DMA in progress for that IOCB are allowed to complete, and the write data then discarded. No new DMA for the IOCB may be started.

Early write status can be handled by having the initiator driver hide the early write status from the rest of the system. The initiator driver waits to report status until the initiator driver has received and discarded the expected data. It will be noted that the change from this method to the one listed above may require greater intelligence in the logic that converts a buffer block into a set of shadow buffers for writing to a mirror group. Any drive in the mirror group which has reported early write status should not have any additional shadow buffers created for it while the effected write command is completing. It will be noted that this includes cases where the early write status drive has failed and the mirror is degraded. However, there are also cases where the drive has not failed, the mirror is not degraded, and Check Condition (aborted command) is reported to the host so that the host retries the command.

Clean Up Processes For Target Driver Associated With Abortion

Processing of requests received by a target driver from a host to abort one or more commands is more straightforward under the latter approach. The target driver is responsible for identifying the affected commands and repeats the same procedure once for each aborted command.

Any read or write DMA that is in progress when a command is aborted is aborted. Any buffer blocks belonging to the aborted command that are in the possession of the target driver are freed. The target driver's IOCB for the aborted command are also freed. Finally, a call is made to the router engine notifying the router engine of the abort situation. The one parameter of this function call is the router engine's IOCB number.

Clean Up Processes For Router Engine Associated With Abortion

The router engine is responsible for freeing the reported IOCB and any spawned IOCBs. This includes finding and removing IOCBs from any FIFO level in which the IOCBs are queued. For each aborted router engine IOCB, the write data FIFO is searched for buffers belonging to that IOCB. Any IOCB that are found are removed from the FIFO and freed. For each aborted router engine IOCB that has an active command on an initiator driver, a call is made to the initiator driver requesting the initiator driver to abort the command. One parameter of the call is the initiator driver's IOCB number.

Clean Up Processes For Initiator Driver Associated With Abortion

The initiator driver, in response to a request from the router engine to abort a command, takes the appropriate action on its interface to do so. The initiator driver also frees any buffers that the initiator driver is holding which belong to the aborted IOCB. Finally, the initiator driver frees its IOCB. Since the process of aborting a command on the interface can take a relatively long time, during which time other abort requests may arrive from the router engine, initiator drivers store commands waiting to be aborted.

Clear Queue Messages Handling

Clear Queue messages are also provided, and are handled by the receiving target driver. This message clears I/Os on the given device (Logical Unit Number (LUN)) regardless of which initiator issued the I/Os. Initiators other than the one issuing the Clear Queue are informed that their I/Os have been aborted via a Unit Attention report. If "host zoning" is not employed, the target driver simply searches its queue for outstanding I/Os directed to that target device number from any host and then aborts them. However, host zoning can cause the same logical router engine device to appear at different target device numbers, to different hosts. When host zoning is employed, this situation is taken into consideration by the target driver, both when deciding which I/Os to abort, and when deciding which nexuses to flag with Unit Attention. It will be noted that a router engine can have a similar problem when deciding for which nexuses to request Unit Attention conditions, when the router engine receives a Mode Select command.

On the other hand, it is undesirable for target drivers to be aware of router engines' mapping tables. This objective can be compromised slightly in order to handle the situation just outlined.

When a target driver receives a Clear Queue message, the target driver calls a function that requests the router engine to supply the needed information from its mapping tables. The function passes information through a global structure which holds multiple target device number/initiator number pairs. Prior to calling the function, the target driver fills in the first pair with the values from the Clear Queue message. The router engine, during execution of the function, fills in any additional pairs that map to the same logical device. A returned parameter is the total number of valid pairs in the structure (including the original one placed there by the target driver).

It will be noted that the target driver is unaware of the physical size of the structure, which is allocated by a router engine module of a size large enough to handle the maximum number of different zone maps that the router engine supports. A Bus Device Reset message sent to a parallel SCSI target driver presents the same problem, and can be handled by treating the Bus Device Reset message like a series of Clear Queue messages, one to each possible LUN (0-7) of the addressed target ID. Bus/Device Reset Message Handling Conditions and messages (e.g., parallel SCSI's bus reset and SSA's device reset) logically do more than just abort multiple commands (and create Unit Attention conditions). Such commands also reset mode select parameters and device reservations. In cases such as these, the target driver calls a single function requesting the router engine to reset both mode parameters and reservations. There are two forms of call to this function.

The first form passes an initiator number and a target device number as its two parameters. When this form is used, the function is typically called multiple times with the same initiator number and different target device numbers.

The second form is distinguished from the first by having a reserved value (e.g., 0xFFFF) in the target device number parameter. This form is called only once and requests that the logical devices visible to the specified initiator have their mode parameters and reservations reset. If the initiator number in this case is also reserved (e.g., 0xFF), then the logical devices visible to any initiator are reset.

Ordered Queue Tagged Messages Handling

Commands received by a target driver with ordered queue tags can present some issues. While it may be sufficient that any command sent by an initiator driver, which is the result of a command received with an ordered tag, is given an ordered tag, and that this is sufficient to guarantee correct order of execution, this does not guarantee that status is delivered to the host in the correct order.

For example, in the case of a write command followed by a read command to the same mirror group (both with ordered tags and the mirror group is made up of two simple drives, A and B), the write commands with ordered tags will be delivered to both A and B, followed by a read command with an ordered tag which is delivered only to A. It is possible that A finishes both the write and the read before B finishes the write. Without some additional mechanism, this results in status for the read being delivered to the host before status for the write. It will be noted that the problem is the same when the write has a simple tag and the read has an ordered tag.

In-order delivery of status for ordered tag commands can be guaranteed by forcing single threaded processing in the router engine. For example, a mechanism that involves a counter of commands in progress for each logical device provides the necessary functionality. Removing an IOCB from the level one FIFO causes the counter for the device at which the IOCB is directed to be incremented. When that same IOCB is freed, the counter is decremented. IOCBs with ordered tags are blocked in the first level FIFO, while the counter for their device is nonzero.

When an IOCB with an ordered tag is removed from the level one FIFO, such an IOCB is treated as a special blocking process, blocking further commands to the same device until that IOCB is completed. This guarantees that when an initiator driver sends a command to a target devices that is derived from a tagged command, the target device has only that command in its queue from the time the command is received until the command is completed. Thus, there is no need for the router engine to request that an initiator driver send a command with anything but a simple tag.

Head-of-queue tag commands can be treated the same as ordered tag commands except that they can be placed into the level one FIFO at the head, instead of the tail.

Device Mapping

A primary function of a storage router is the mapping of device addresses from the host computer's frame of reference to that of the attached devices. A single address in the host computer's device address space may map to zero, one or more than one physical devices currently connected to the router. The physical addressing scheme that the host computer uses to address its target devices depends on the type of hardware interface, and is often multi-dimensional. The same is also true for the scheme used by the initiator drivers to address attached devices. At present the interface logic block is responsible for understanding the addressing schemes of both the host side and device side interfaces, and mapping between them.

A more structured solution is to have each target driver be responsible for mapping target device addresses from its bus to a single-dimensioned target device number. Similarly each initiator driver is responsible for mapping from a single dimensioned initiator device number to whatever addressing scheme is used on its bus. The router engine's responsibility is to map each target device number to zero, one or more than one initiator device numbers using mapping algorithms which are independent of hardware interface types. It will be noted that, with two initiator drivers from which to choose, the router engine needs to keep track of the interface (device side or host side) in the router engine's mapping tables, in addition to initiator device numbers. A target driver module should also map hosts' physical addresses, if multi-dimensional or very large valued, into single-dimensioned and small-valued "initiator numbers". This is done for the benefit of both the target driver and the router engine.

The initiator driver's responsibility for mapping physical device addresses to initiator device numbers and router numbers, and the target driver's similar responsibility for mapping physical device addresses to target device numbers and initiator numbers, has been discussed to some degree. There are a number of further issues in this area, however.

As an initiator detects a target LUN during its discovery process, the initiator reports the target LUN to the router engine, which assigns an initiator device number. It is not reasonable to expect a fibre channel initiator driver (or its associated router engine) to maintain mapping tables for all the devices (LUNs) which could theoretically be discovered by a fibre channel initiator driver. (The maximum number of addressable target LUNs in a fibre channel network is on the order of $2^{88}$). Some practical limit is set (at compile time) for the largest permitted initiator device number. In the case of more devices present than can be managed, there needs to be a way for the router engine to tell the initiator driver that a device should be ignored, rather than be given an initiator device number. This is accomplished by the router engine returning a reserved value (e.g., 0xFFFF), instead of a valid initiator device number when the device is reported by the initiator driver.

The manner in which target drivers map addressing on the host side interface to target device numbers depends on the type of interface. Exemplary implementation details are now provided and are for purposes of illustration only.

For SSA, the target device number should be simply the LUN (0–127).

With fibre channel, LUN addresses are 8 bytes long and are formatted differently depending on the mode of operation (fibre channel 8-byte LUN addresses support in the target drivers of the present example consist of values of the form 0xNNNN000000000000, where NNNN is in the range from 0x4000 through 0x7FFF for array controller mode, and from 0x0000 through 0x3FFF for JBOD mode). In array controller mode, 0x0000000000000000 is also valid and addresses the array controller LUN. The mapping to a target device number can, for example, be NNNN & 0x3FFF, in either mode. In array controller mode, the array controller LUN (0x0 . . . 0) is an exception to this mapping, and maps to target device number 0xFFFF. Any command received for a LUN number which does not match the supported LUN template is mapped to target device number 0xFFFE.

For parallel SCSI, a target driver maintains information allowing the target driver to identify which target IDs are to respond to selection in order to properly program the interface controller chip.

(a) For LUN priority mode, the target driver maps LUNs 0 through 7 of the lowest enabled ID to target device numbers 0 through 7. LUNs 0 through 7 of the second lowest enabled ID map to target device numbers 8 through 15, and so on.

(b) The appropriate mapping for ID priority mode is LUN 0 together with IDs 0 through 15 to target device numbers 0 through 15. For additional target device numbers beyond that, the LUN will be incremented to 1, and the IDs will progress again 0 through to 15, continuing in this manner until there are no more target device numbers remaining.

A target driver, in general, translates from the physical address for received commands to a target device number and passes the command to the router engine. The target driver is unaware of whether the target device number is associated by the router engine with an active logical device. If not, it is the router engine's responsibility to report Check Condition (unsupported LUN) to the target driver via the normal status reporting function.

The manner in which the router engine maps (or doesn't map) target device numbers to logical devices depends on which initiator (host) has originated the command. Thus, the target driver passes an initiator number to the router engine along with each command. While that the target driver is responsible for assigning initiator numbers, a performance benefit is had at the cost of a small loss of structure by allowing the router engine to assign the initiator numbers. Prior to delivering the first command from any host to the router engine, the target driver calls a function to register that host with the router engine. The parameter of this function is the unique identification information for the host. The returned parameter is the router engine's choice of initiator number. In the event that a target driver becomes aware that a host which has been registered with the router engine is no longer present on its interface, the target driver notifies the router engine by calling a function whose parameter is the router engine assigned initiator number.

As with Request Sense, a target driver processes Report LUNs without passing the command to the router engine. However, in order to know the proper manner in which to respond, the target driver obtains current mapping information, specific to the requesting host, from the router engine. The router engine provides a function that the target driver can call to obtain a bit map of active target device numbers. The single parameter of this function is the initiator number. The target driver uses the returned information, along with its knowledge of the characteristics of its transport layer, to formulate an appropriate response. The function can use, for example, a global structure to pass the bit map. The structure is allocated by a router engine module based on the router engine's limit on the maximum number of logical devices the router engine supports in its mapping tables. The target driver is unaware of, prior to making its call, the size of the structure. The router engine returns the size of the bitmap as the returned parameter of the function.

When a router engine changes its mapping tables the router engine should, in at least some cases, ask the host side target driver to establish a Unit Attention condition for the affected target device number(s). In addition, if a new device has come online, the router engine should request the host side target driver to alert hosts and/or upstream routers regarding this event. The (host side) target driver provides a function for the router engine to call. No parameters are needed. How the target driver reacts to this function is dependent on the interface type and may also depend on configuration information specified by the customer. In some cases, the request may be discarded by the target driver with no action taken. Possible responses include Web Walk or Async Alert for SSA, LIP or State Change Notification for fibre channel, and SCSI Bus Reset for parallel SCSI.

Router-To-Router Communications

Router-to-router communication is a vital aspect of building a SAN from independent routers in a DSMP Architecture according to embodiments of the present invention. Communication between routers on the same physical interface can be accomplished using vendor-unique protocol (VUP), for example, using SCSI commands with vendor-unique operational codes (also referred to as opcodes). The number of different opcodes used is dependent upon the implementation, but preferably does not exceed three, in most cases. Command Descriptor Blocks (CDBs), each 16 bytes in length, are typically the means of conveyance.

Instead of conveying embedded destination path information, which is impractical due to the prohibitive size of the CDBs, the following technique is employed. Prior to sending the first command from router A to router B, a channel for this path is predefined and assigned to an available channel number (say N). Suppose that, to get from router A to router B, the command must travel through router X. The router A's router number for router X is placed in entry N of router A's channel table. Similarly, router X's number for router B is placed in entry N of router X's table. A reserved value is placed in entry N of router B's table. Arrangements are made so that router A knows to send its command to channel N. Router A constructs a vendor unique CDB and puts N in its channel field. Router A fetches the contents from location N of its channel table and requests its initiator driver to send the command to that router number. Router X receives the command, determines that entry N in its channel table is not the reserved value, and requests its initiator driver to send the unchanged CDB on to the router number from the table. Router B receives the command, determines that entry N in its channel table is the reserved value, and knows that the command is for router B.

In the event that a logical command is a read-type operation, but has more parameter information than will fit into a 16 byte CDB, a combination of a write-type command followed by a read-type command is used. The standard SCSI Send Diagnostic and Receive Diagnostic commands are analogous to the way in which this situation is dealt with.

It is the initiator driver's responsibility during device discovery to recognize other routers from a given vendor. Routers are reported to the router engine in the much the same manner as target LUNs, but using a different interface function. As with target LUNs, the router engine assigns a number to each discovered router and returns the number to the initiator driver. Initiator device numbers and router numbers are independent of each other in the sense that it is normal for an initiator driver to have a mapping table entry for initiator device number N as well as an entry for router number N. Existing interface logic block code instructs a router to use router number zero to self-refer. Typically, initiator drivers should simply consider router numbers to begin with number 1.

The initiator driver is responsible for determining whether that initiator driver is talking to the host-side or device-side target driver of a discovered router. (The method for discovering this depends on the specific interface type.) This information is included in the report to the router engine. If the device side driver is discovered, then no attempt to discover targets under the router should be made, because, typically, none would be found. If the host-side driver is discovered, then the host-side driver is probed for underlying target LUNs at the appropriate time.

When a router engine is to send a vendor-unique SCSI command to another router, the router engine calls the same function as is called to send a standard SCSI command to a target device. A Boolean parameter can be used to inform the initiator driver as to whether the device number parameter contains an initiator device number, or a router device number. This lets the initiator driver know which of its internal, private tables to access for the physical path information. Otherwise, the initiator driver does nothing differently than when sending a standard SCSI command to a normal target device.

Typically, when a target driver receives a router-to-router vendor-unique command, the target driver receives no indication that anything special is occurring. Preferably, the target driver handles all aspects of these commands in the same manner as a standard command from a conventional host. The router engine recognizes the command as a router-to-router command solely based on the command's vendor-unique opcode. The router engine can verify that the unique identifier associated with the originating initiator number matches that of a known vendor-specific router.

Router to Router Communications—Vendor Unique Protocols

Each of the different VUPs may fall into one of six categories, three of which are relevant in the context of router-to-router communications:

I. Commands (primarily channel write (but also read) commands) from a router to a member of an extended complex drive that it cannot reach directly;

II. Shared management commands/messages used to coordinate management of extended complex drives implemented by more than one router;

III. Commands/messages used by routers within a synchronized group to share information, Categories I & II use enumerated channel numbers in their CDBs and share the available entries in the same channel number table of each router involved. They differ in their use of channels only in the detail of whether the final endpoint of the channel is drive or a router.

Category III protocols always involve a direct (device-side) connection and therefore having developed without the channel concept, have no need for channels.

Responding to Inquiry

When responding to a received Inquiry command that is mapped to an active logical drive, the router engine supplies "appropriate" Inquiry data. When the drive is a complex drive, there is no underlying drive to which it would be reasonable to which this request could be passed. In such a case, a response is generated from information within the router engine.

The situation is less clear for a directly connected simple drive or for any drive connected to us through additional router layer(s). Proper treatment of such a request depends on the type of Inquiry data being requested, and whether the logical drive is simple or complex.

If the Inquiry page is not supported by the given router, the top-level router should respond. This is also true if the Inquiry page is supported, but contains only fixed data.

There are other pages supported which require information from a simple drive or from a lower-layer router which is responsible for implementing a complex drive. In these cases, the Inquiry command is passed to the layer which has the necessary information to respond. Vendor ID, product ID and serial number information are key examples of this category. Certain application programs (e.g., drive firmware update loaders) may malfunction, if there is unexpected data in these fields.

These fields, at least, should therefore be supplied by a simple drive. Complex drives are typically decomposed before their component physical drives have their firmware updated. These fields are also critical to operating systems that use this information to detect multiple paths to the same drive. When multiple paths to the same logical device exist, their Inquiry data should be the same. Moreover, multiple complex drives in the same network must not be mistaken for multiple paths to the same device.

When an Inquiry command is passed through to a simple drive, it is the responsibility of the lowest layer router to overwrite any fields of the Inquiry data which are not to be passed through to the host. The appropriate values for some supported Inquiry pages depend on the physical interconnect type. The router engine and host-side target driver cooperate in the solution to this problem. Prior to passing an Inquiry page of this sort to the host side target driver, the router engine calls a function provided by the host side target driver which overwrites the necessary fields with the appropriate values. As Inquiry data passes upward through multiple routers, this occurs once in each router.

When supplying Standard Inquiry Data for a complex drive, the router engine should fill in "Vicom" for the Vendor ID and some convention should be adopted for how to fill in the Product ID based on the type of complex drive. As noted above, when supplying serial number data it is necessary that it be generated in a way that is unique within the customer's environment.

Furthermore, it is necessary that two different routers responding to serial number inquiries for the same complex drive give the same serial number. Correspondingly, the serial number portion of the router's IEEE UID is part of the serial number, with another part being a sequence counter which is incremented each time the router engine creates a complex drive. (This information is stored, in binary form, in a data-base 2. It can be converted to ASCII during processing of the Inquiry command.)

DSMP Topology

The topology of a DSMP is defined by the topology of the DSMP's routers. Typically, the number of hosts or target devices connected to any particular router is irrelevant. From the perspective of one router that wishes to send a message to another router, there are typically four types of direct router-to-router connections in most implementations:

A device-side connection exists when the device-side interface is common to the two routers.

A host-side connection exists when the host-side interface is common to the two routers.

A downward connection exists when the device-side interface of the sending router is connected to the host-side interface of the receiving router.

An upward connection exists when the host-side interface of the sending router is connected to the device-side interface of the receiving router.

Device- and host-side connections are defined to be intra-layer connections. Upward and downward connections are defined to be inter-layer connections. In the event that two routers share both device-side and host-side connections, the device-side connection is used for communication between the two routers.

A group of routers that share a common device-side interface are defined to be a synchronized router group. The routers in a synchronized group are required to automatically share and keep synchronized their router engines' device mapping tables.

The term "local SAN" will be used with respect to a given router to mean the collection of any other routers in the synchronized router group, together with any target devices directly connected to that common device-side interface. From the point of view of a given router, any router or target device which is accessible through some path but which is not a member of that router's local SAN is termed a "remote router" or "remote target". A router which is a member of one local SAN and whose host-side interface connects to some other local SAN is referred to as a gateway router.

Defining Layers

Layer numbering meets with intuition—as a command enters a network from a host computer and moves from the device side interface of one router to the host side interface of another that it is moving downward through layers of the network, the layer numbering is increasing. Each router in a complex network is assigned to a layer:

A path from router A to router B is defined to be a series of interlayer and or intralayer connections leading from router A to B without passing through the same router twice.

The weight of a path is equal to the total number of downward connections minus the number of upward connections in the path. The weight of a path is positive, zero, or negative.

Multiple paths between the same pair of routers are permitted, and may even have different weights.

The router(s) in a network which have no path with negative weight to any other router in the network are defined to be on layer one.

The layer number of a router which is not on layer one is determined by the weight of the path from a layer one router with the largest weight (=weight+1).

DSMP Management

The DSMP configuration and management mostly relies on DSMP software, a utility typically installed to run on any host computer with which the code is compatible. Such a host computer can be described as a management host, and may be dedicated to such a role, or may additionally play a part in data I/O just like any of the other hosts upon which such software is not installed. Furthermore, such a management host can be indistinguishable from any of the other hosts attached to the SAN via a particular router, or such a host may be in some way physically segregated to allow isolation to access by unauthorized users.

Software-Based Management User Interface

Many DSMP configuration and management actions are performed automatically between routers, independently of any software residing on a host computer. However, in order to provide an interface for the administrative user to custom configure certain relationships between certain hosts and certain elements of the storage drive arrays/subsystems, as well as be able to gain feedback as to what events are occurring related to the communications taking place between storage router devices, as well as between such storage router devices and hosts or storage drive arrays/subsystems, such a software interface is provided as a facility of the DSMPA.

It is appreciated that the operations to be discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various exemplary modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule. Furthermore, those skilled in the art will recognize that the operations described in exemplary embodiment are for illustration only. Operations may be combined or the functionality of the operations may be distributed in additional operations in accordance with the invention.

Thus, in the methods to be described, the operations thereof and modules therefore may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Relations of Inter-router Communications With Host Based Management

Automatic discovery of routers and target devices typically does not extend beyond the immediate host- and device-side interfaces, with the exception of devices represented by another router connected through a direct downward connection. If a router needs to know about some more distant router or target device, then the router is told about such a more distant router or target device by the DSMP Manager.

Within a synchronized router group, the information that is synchronized typically concerns the ordering of target devices reported by the device-side initiator drivers, and information about complex drives made (sometimes exclusively) from those devices. Routers can implement complex drives that contain members connected anywhere else in the network. A complex drive implemented by a router that has a member not visible to the router's device-side initiator driver is known as an extended complex drive. Extended complex drives are typically created by DSMP software, as opposed to a technique involving the toggling of jumper switches provided with SVE storage router hardware. It should be noted that such a switch-based technique can be used to create complex drives (e.g., mirror drives or the like), without involving the DSMP software, but this requires operator intervention at each router device. In other words, extended complex drives, unlike the complex drives, are typically not created by setting one or more dip switches, which avoids operator interaction and centralizes control in the DSMP Manager.

Information about extended complex drives is typically not shared with other members of the synchronized router group. If a DSMP software is to configure any other router either within the same synchronized group or anywhere else in the network to implement the same extended complex drive, the DSMP software is preferably forced to explicitly configure that router to do so, normally. The concept of a channel for router-to-router communications is now described.

Most types of router-to-router commands need, in at least some situations, to be passed through one or more intervening routers in order to reach their final destination. Embedding the path to the destination in the command is impractical when the vendor-unique SCSI commands used for router-to-router communications are 16 bytes long. Instead, prior to sending the first command from router A to router B, a channel for this path is predefined and assigned to an available channel number (e.g., N). For example, it can be supposed that, in order to get from router A to router B, data must traverse router X. Router A's router number for router X is placed in entry N of router A's channel table. Similarly, router X's number for router B is placed in entry N of router X's table. Some reserved value (e.g., 0) is then placed in entry N of router B's table. Router A has the information required to send its command to channel N. Router A constructs a vendor-unique CDB and put N in its channel field. Router A retrieves the contents from location N of its channel table and request its initiator driver to send the command to that router number. Router X receives the command, see that entry N in its channel table is not the reserved value, and request its initiator driver to send the unchanged CDB on to the router number from the table. Router B receives the command, see that entry N in its channel table is the reserved value, and know that the command is for router B.

The number of different routers that need to talk to each other using a channel is quite manageable, even in a very large network. Preferably, channel numbers are therefore assigned globally, for the entire network.

Prior to the first use of a channel, which is assigned by DSMP software, the software is responsible for placing an entry in the channel table of each router along the path.

Each of the different VUPs relevant in the context of management host-to-router communications may fall into the three remaining of the six VUP categories, those being:

IV. Commands from the DSMP software used to point its dedicated channel at a specific router V. Commands from the DSMP software to a specific router (including requests for information)

VI. Asynchronous event notifications from routers to the DSMP Manager

Router Directed Management Software VUPs (Cat IV & V)

The following sections will discuss these category IV-type and V-type VUPs, which are important to DSMP software in order to send in-band commands beyond the directly connected log-in router, and then also to receive certain events notifications in return.

When DSMP software wishes to send a command to or read status from the directly attached router that the software is logged in with, the software does so using a protocol which is hidden inside certain forms of standard SCSI Read and Write commands. This method (known as SVE partition mode protocol) has many benefits, but in general these benefits do not apply for communication between the DSMP software and routers in the network other than with the login router. Therefore, when the DSMP software wishes to talk to a router other than the login router, the software should do so by sending a partition mode command to the login router which the login router can then reformat into a vendor unique SCSI command and send onward on its next hop toward the final destination router.

A single dedicated channel that is dynamically reconfigured to lead to the router of current interest is the most appropriate addressing scheme for these categories of vendor unique SCSI commands. This channel would not have any channel number and would therefore not be part of each router's main channel table. The use of this channel is implied by the sub-opcode of the vendor unique SCSI command (specific to DSMP software commands), conserving even more valuable space in the CDB. A single byte in each router's data base is sufficient as it need only point to immediately neighboring routers directly connected to the host or device-side interface.

SVE partition mode protocol is fundamentally single-threaded and sits in between the DSMP software and these vendor unique SCSI commands. The DSMP software, being single-threaded, only needs to send commands to one router at a time. Multiple outstanding commands (multi-threading) over the DSMP software is therefore not permissable.

When a router receives one of this class of vendor unique SCSI commands, the router looks at its DSMP software channel value and forwards the unmodified CDB to the router with that router number in its router data base. (Note the convention is maintained that router number zero means self-referral).

Use of this channel is implied by the sub-opcodes used for DSMP software commands and therefore no channel number is needed in the CDB. Whenever a DSMP command is received by a router, the DSMP software examines its channel value which contains a pointer to the next router in the channel. If the channel value points to a router, then the command is sent onward. If the channel value is a reserved value, then the command is for this router.

Configuring the dedicated channel of the DSMP software to point to the proper router can be involved. One solution is to use a command that includes a hop count. Initially, a SET CHANNEL command is sent to the logged-on router via service diagnostic utility (SDU) protocol. The hop count is set to zero and the router UID is set to a reserved value.

When a router receives the SET CHANNEL command the router will check the single byte hop count field in the CDB to see if the count is zero. If so, the command is for that router and executes the command. This involves loading a field from the CDB into the router's DSMP software channel value and initiating status back through the reverse path. If the hop count is not zero, the receiving router decrements the hop count field of the CDB by one and forwards the otherwise unmodified CDB to the router pointed to by its current channel variable value. (DSMP software is responsible for guaranteeing that this is a valid pointer.)

When the router parses this command and determines that the hop count is zero, the router knows that the command is for the router in question. The router removes the reserved value from the router UID field and stores that value in its CHANNEL variable. The DSMP software is now able to send any other command, and have that command be received and responded to by the given router. Assuming that the DSMP software already knows the topology of the network, the DSMP software now sends a command to the logged on router informing the router the UID of the next router in the channel path. The DSMP software accomplishes this using a SET CHANNEL command with a hop count of zero and a router UID value equal to the UID of the router the DSMP software wishes to be next in the channel path.

Once the DSMP software channel has been extended to reach the desired router, DSMP software can use any of its other vendor unique SCSI commands (without a hop count field) to converse with that router.

If the DSMP software wants to talk with this router, rather than just extending the channel onward to another router, the router sends a Set Channel command with a hop count of one and a reserved router UID. If the DSMP software only wishes to extend the channel farther, the DSMP software can immediately send another Set Channel command with a hop count of one and the router UID of the next router in the channel path. This process can be repeated as many times as necessary, until the desired router is reached.

When the DSMP software finishes talking with one router and wishes to begin talking with another, the DSMP software can either create a new channel path starting from the login router, or if the first part of the path is the same, the DSMP software may start with the router at the fork in the path, by sending a Set Channel command with the appropriate hop count.

Upon start-up, the DSMP software has no information regarding the topology of the network, so to overcome this, the DSMP software may use the VUPs just described to discover the network's topology by iteratively requesting each router respond with regard to which routers are the given router's neighbors, until the entire network has been explored.

Asynchronous Event Notification to Management Software—VUP (Cat. VI)

Certain types of asynchronous events within the network can also made 1 0 known to the DSMP software, if and when they occur. The most obvious of these is the addition of a router to, or the loss of a router from, the network. As with DSMP software commands, DSMP software alerts use a special, dedicated channel and a set of sub-opcodes that imply the use of this channel. When the DSMP software is configuring a network, one of the task the DSMP software should complete is the configuring of a asynchronous alert channel. To do this, the DSMP software traverses the network, communicating with each router. The DSMP software can use, for example, a vendor-unique command to inform each router as to whom that router should send or forward an alert to if the router generates or receives such an alert.

For purposes of avoiding single-point-of-failure situations, each router is given two (or more) forwarding addresses, so that if the first is offline, an alternate path to the DSMP software will be available. When a reserved value is given to a router for its alert channel forwarding address, this means that the router is a primary (or fail-over) DSMP software login router, and that the alert information should be buffered by this router for retrieval by DSMP software via a SVE partition mode protocol query command.

Extended Complex Drives—Special Case—Software-Instigated

As previously discussed, creation of extended complex drives requires the intervention of a DSMP Manager. When a DSMP software defines an extended complex drive for a router, it specifies a channel number for each component device that is not directly accessible to that router. Prior to activating the extended complex drive, each channel required for that drive's operation is first configured. This type of channel differs slightly from those discussed previously in that the target of the channel is a device connected to a router rather than a router. General use channel table structures and the DSMP software commands that configure the channel table structures should allow for this distinction.

Device Discovery

In general, each initiator driver is solely responsible for activities related to discovery of devices connected to its physical interface. This includes detection of other routers as well as discovery of LUNs underlying appropriate types of "nodes." The router engine, on the other hand, has responsibility for discovering the characteristics of the device (disk, tape, or the like), and preparing the device for normal operation (clear Unit Attention, spin up, and so on).

As devices are discovered by an initiator driver, those devices are reported to the router engine. Typically, one function call will be made for each router or LUN discovered. No history is kept by the initiator driver so that every time the initiator driver performs discovery, this driver reports everything that is found. When discovery is complete, a function is called to inform the router engine. At this time, the router engine is able to identify any routers or LUNs which were present, but are no longer. As previously stated, the initiator driver is responsible for assigning initiator device numbers. However, a performance benefit is had at the cost of a small loss of structure by allowing the router engine to assign the initiator device numbers and router numbers. When reporting a discovered router or LUN to the router engine, the parameter of the function is a unique identifier. The returned parameter is the initiator device number or router number that the router engine wishes to have assigned. As previously indicated, when the router engine makes a request to an initiator driver to send a command, the router engine references the initiator device number to identify the target of the command. Similarly, the router number is referenced when sending a command to another router.

Initiator drivers typically will perform discovery following power on, and again when triggered by certain link events which are specific to the particular transport layer of their interface. In general, any addition or removal of a router or target LUN precipitates a triggering event leading to new discovery. As previously noted, during discovery, an initiator driver reports on the devices the initiator driver detects. It is the router engine's responsibility to determine what is old, what is new, and what is missing.

As a result of the behavior of synchronized router groups, it is necessary for initiator drivers (especially the device-side initiator driver) to first discover and report other routers that are present, before reporting any target LUNs. After receiving the report on routers, the router engine exchanges information with any other routers thus found. Once this is complete, the router engine requests the initiator driver either to re-report other routers (so that the router engine can reassign router numbers), proceed with the discovery and reporting of target LUNs, or skip LUN discovery in the event that the synchronization group manager reports that there has been no change to the LUN map. It will be noted that at the start of discovery, an initiator driver suspends processing of in-progress or pending commands, and abort any such commands that are vendor-unique commands directed to other routers in the synchronized group. Following router reporting the initiator driver accepts and executes new router-to-router commands in order to support synchronization, but continue to suspend other commands. Once LUN discovery is complete, suspended commands for LUNs which are still present should be resumed. Any for LUNs no longer present should be reported to the router engine with Check Condition (unsupported LUN) status.

The following two tables are examples that describe, in greater detail, the actions performed by the initiator driver and router engine when engaged in such a discovery process, Table 1 for the master of the synchronized group, and Table 2 for a follower router.

TABLE 1

An example of actions performed by an initiator driver and a router engine of a master router when engaged in discovery.

| Initiator Driver | | Router Engine (master) | |
|---|---|---|---|
| Step | Action | Step | Action |
| 1 | Report starting discovery to router engine. | 1 | Assign router numbers to routers and report to initiator driver. |
| 2 | Report discovered routers to router engine one-by-one. | 2 | Synchronize with other routers to the point of determining that we are master (using the initiator driver to send and receive router-to-router commands). |
| 3 | Store path to router in table indexed by router number. | | |
| 4 | Report router discovery complete to router engine. | | |
| 5 | Report discovered LUNs to router engine one-by-one. | 3 | Tell initiator driver to proceed with LUN discovery and reporting. |
| 6 | Store path to LUN in table indexed by initiator device number. | 4 | Assign initiator device numbers to LUNs and report to initiator driver. |
| 7 | Report LUN discovery complete to router engine. | 5 | Complete synchronization with other routers (followers) by giving them our router number and initiator device number assignments (among other things). |

TABLE 2

An example of actions performed by an initiator driver and a router engine of a follower router when engaged in discovery.

| Initiator Driver | | Router Engine (follower) | |
|---|---|---|---|
| Step | Action | Step | Action |
| 1 | Report starting discovery to router engine. | 1 | Assign router numbers to routers and report |

TABLE 2-continued

An example of actions performed by an initiator driver and a router engine of a follower router when engaged in discovery.

| Initiator Driver | | Router Engine (follower) | |
|---|---|---|---|
| Step | Action | Step | Action |
| 2 | Report discovered routers to router engine one-by-one. | 2 | to initiator driver. Synchronize with other routers to determine who is master then obtain maps from master (using the initiator driver to send and receive router-to-router commands). |
| 3 | Store path to router in table indexed by router number | | |
| 4 | Report router discovery complete to router engine. | | |
| | | 3 | Tell initiator driver to re-report routers. |
| 5 | Report discovered routers to router engine one-by-one.. | 4 | Assign master's router numbers to routers and report to initiator driver. |
| 6 | Store path to router in table indexed by router number. | 5 | If the master told us that there are LUN changes then go to step 7. |
| 7 | Report router discovery complete to router engine. | 6 | Tell the initiator driver to skip LUN discovery and reporting, after which discovery is complete for both the router engine and the initiator driver. |
| 8 | Report discovered LUNs to router engine | | |
| 9 | Store path to LUN in table indexed by initiator device number. | | |
| 10 | Report LUN discovery complete to router engine. | 7 | Tell initiator driver to proceed with LUN discovery and reporting. |
| | | 8 | Assign master's initiator device numbers to LUNs and report to initiator driver. |

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. An distributed storage management comprising:
a storage virtualization engine (SVE).

2. The apparatus of claim 1, wherein
said SVE comprises a plurality of multi-port controllers.

3. The apparatus of claim 1, wherein
each of said multi-port controllers is a dual-port Fibre Channel controller having a first port and a second port.

4. The apparatus of claim 2, wherein
at least one of said multi-port controllers is configured to communicatively couple said SVE to another SVE.

5. The apparatus of claim 4, wherein
said at least one of said multi-port controllers is configured to be communicatively coupled to a multi-port controller of said another SVE.

6. The apparatus of claim 2, further comprising:
a storage subsystem, wherein
at least one of said multi-port controllers is coupled to said storage subsystem.

7. The apparatus of claim 2, further comprising:
a host computer, wherein
at least one of said multi-port controllers is coupled to said host computer.

8. The apparatus of claim 2, further comprising:
a plurality of SVEs, wherein said SVE is one of said SVEs.

9. The apparatus of claim 1, wherein
each of said multi-port controllers of each of said SVEs is a dual-port Fibre Channel controller having a first port and a second port, and
a second port of at least one multi-port controller of one of said SVEs is coupled to a second port of at least one multi-port controller of one other of said SVEs.

10. The apparatus of claim 8, wherein
at least one of said multi-port controllers of said SVE is communicatively coupled to a multi-port controller of one of said SVEs.

11. The apparatus of claim 8, further comprising:
a storage subsystem, wherein
at least one of said multi-port controllers of said SVE is coupled to said storage subsystem.

12. The apparatus of claim 11, further comprising:
a switch, wherein said switch is configured to couple said storage subsystem to said at least one of said multi-port controllers of said SVE.

13. The apparatus of claim 8, further comprising:
a host computer, wherein
at least one of said multi-port controllers of said SVE is coupled to said host computer.

14. The apparatus of claim 13, further comprising:
a switch, wherein said switch is configured to couple said host computer to said at least one of said multi-port controllers of said SVE.

15. The apparatus of claim 8, wherein
each of said SVEs is communicatively coupled to at least one other of said SVEs.

16. The apparatus of claim 15, wherein said each of said SVEs is communicatively coupled to said at least one other of said SVEs by virtue of at least one of said multi-port controllers of said each of said SVEs being communicatively coupled to a multi-port controller of said at least one other of said SVEs.

17. The apparatus of claim 15, further comprising:
a secondary network, wherein
at least one of said SVEs is communicatively coupled to said secondary network.

18. The apparatus of claim 17, wherein
a plurality of said SVEs are communicatively coupled to said secondary network, and
said plurality of said SVEs communicate with one another using said secondary network.

19. The apparatus of claim 15, wherein said SVEs are coupled to form a storage area network (SAN).

20. The apparatus of claim 19, wherein said multi-port controllers are coupled to form said SAN.

21. The apparatus of claim 19, wherein
a port of a first multi-port controller of a first one of said SVEs is coupled to a port of a second multi-port controller of a second of said SVEs, and
said first and said second ones of said SVEs are communicatively coupled to one another by said first multi-port controller and said second multi-port controller.

22. The apparatus of claim 19, further comprising:
a host computer; and
a storage subsystem, wherein
said multi-port controllers are coupled to form a storage area network, and said host computer and said storage subsystem are communicatively coupled to one another by said storage area network.

23. The apparatus of claim 22, wherein
a host-side switch, wherein said host-side switch is configured to couple said host computer to said at least one of said SVEs, and
a storage-side switch, wherein said storage-side switch is configured to couple said storage subsystem to said at least one of said SVEs.

24. The apparatus of claim 19, wherein, for each of said SVEs,
a host-side multi-port controller of said multi-port controllers of said each of said SVEs is dedicated to host-side connections, and
a storage-side multi-port controller of said multi-port controllers of said each of said SVEs is dedicated to storage-side connections.

25. The apparatus of claim 24, wherein each of said multi-port controllers is a dual port controller.

26. The apparatus of claim 24, wherein
a first storage-side multi-port controller is communicatively coupled to a second storage-side multi-port controller, wherein
a first one of said SVEs comprises said first storage-side multi-port controller,
a second one of said SVEs comprises said second storage-side multi-port controller, and
said first and said second storage-side multi-port controllers are ones of said storage-side multi-port controllers.

27. The apparatus of claim 26, wherein said first and said second storage-side multi-port controllers are communicatively coupled to one another via an in-band link.

28. The apparatus of claim 24, wherein
a first host-side multi-port controller is communicatively coupled to a second host-side multi-port controller, wherein
a first one of said SVEs comprises said first host-side multi-port controller,
a second one of said SVEs comprises said second host-side multi-port controller, and
said first and said second host-side multi-port controllers are ones of said host-side multi-port controllers.

29. The apparatus of claim 28, wherein said first and said second host-side multi-port controllers are communicatively coupled to one another via an in-band link.

30. The apparatus of claim 19, wherein
said SAN comprises a backbone,
said backbone is formed by a SCSI upper-layer protocol and a fibre channel lower-layer protocol.

31. The apparatus of claim 30, wherein each of said multi-port controllers is a dual port controller.

32. The apparatus of claim 30, wherein a first one and a second one of said SVEs are communicatively coupled to one another via an in-band link.

33. The apparatus of claim 32, wherein
said in-band link is one of a plurality of in-band links,
each of said SVEs is communicatively coupled to another of said SVEs by at least one of said links, and
said SVEs and said links are configured to support communication of SAN management information.

34. The apparatus of claim 32, wherein said first and said second ones of said SVEs are further communicatively coupled to a secondary network.

35. The apparatus of claim 34, wherein
said in-band link is one of a plurality of in-band links,
each of said SVEs is communicatively coupled to another of said SVEs by at least one of said links, and
said secondary network is independent of said in-band links.

36. The apparatus of claim 35, wherein
said SVEs are configured to communicate with one another via said secondary network concurrently with communicating with said one another via said in-band links.

37. The apparatus of claim 36, further comprising:
a host computer, communicatively coupled to said secondary network, wherein said SVEs are configured to communicate with said host computer via said secondary network.

38. The apparatus of claim 36, wherein
said SVEs are configured to communicate with one another via said secondary network, in an event of a failure of at least one of said in-band links.

* * * * *

UNITED STATES PATENT AND TRADEMARK OFFICE
CERTIFICATE OF CORRECTION

PATENT NO. : 6,877,044 B2
DATED : April 5, 2005
INVENTOR(S) : Horatio Lo et al.

It is certified that error appears in the above-identified patent and that said Letters Patent is hereby corrected as shown below:

<u>Column 61,</u>
Line 45, Claim 1 should read as follows:
-- 1.   An apparatus comprising:
   a storage virtualization engine (SVE), wherein
      said SVE comprises a plurality of multi-port controllers,
      at least one of said multi-port controllers comprises a plurality of ports
         and an interface controller,
      said interface controller is associated with one of said ports,
      said at least one of said multi-port controllers is configured to
         determine a state of said interface controller, wherein said
            interface controller is configured to receive a signal, and
         enable said port if said signal is valid. --.
Line 47, Claim 2 should read as follows:
-- 2.   The apparatus of claim 1, wherein
   said at least one of said multi-port controllers is configured to configure said one of
      said ports of said at least one of said multi-port controllers. --.
Line 49, please delete "claim 1" and insert -- claim 2 --.
Line 52, Claim 4 should read as follows:
-- 4.   The apparatus of claim 2, wherein
   said at least one of said multi-port controllers is configured to communicatively
      couple said SVE to another SVE. --.
Line 59, Claim 6 should read as follows:
-- 6.   The apparatus of claim 2, further comprising:
   a storage subsystem, wherein
      a multi-port controller of said multi-port controllers is coupled to said
      storage subsystem. --.
Line 63, Claim 7 should read as follows:
-- 7.   The apparatus of claim 2, further comprising:
   a host computer, wherein
      a multi-port controller of said multi-port controllers is coupled to said host
      computer. --.

UNITED STATES PATENT AND TRADEMARK OFFICE
CERTIFICATE OF CORRECTION

PATENT NO.    : 6,877,044 B2
DATED         : April 5, 2005
INVENTOR(S)   : Horatio Lo et al.

It is certified that error appears in the above-identified patent and that said Letters Patent is hereby corrected as shown below:

<u>Column 62,</u>
Line 4, please delete "claim 1" and insert -- claim 8 --.
Line 11, Claim 10 should read as follows:
    -- 10.    The apparatus of claim 8, wherein
   a multi-port controller of said multi-port controllers of said SVE is communicatively
        coupled to a multi-port controller of one of said SVEs. --.

Signed and Sealed this

Twenty-ninth Day of November, 2005

JON W. DUDAS
*Director of the United States Patent and Trademark Office*